US010078856B2

(12) United States Patent
Gharabegian

(10) Patent No.: US 10,078,856 B2
(45) Date of Patent: Sep. 18, 2018

(54) MOBILE COMPUTING DEVICE CONTROL OF SHADING OBJECT, INTELLIGENT UMBRELLA AND INTELLIGENT SHADING CHARGING SYSTEM

(71) Applicant: Shadecraft, LLC, Glendale, CA (US)

(72) Inventor: Armen Sevada Gharabegian, Glendale, CA (US)

(73) Assignee: Shadecraft, Inc., Pasadena, CA (US)

( * ) Notice: Subject to any disclaimer, the term of this patent is extended or adjusted under 35 U.S.C. 154(b) by 207 days.

(21) Appl. No.: 15/273,669

(22) Filed: Sep. 22, 2016

(65) Prior Publication Data

US 2017/0323356 A1 Nov. 9, 2017

Related U.S. Application Data

(63) Continuation-in-part of application No. 15/268,199, filed on Sep. 16, 2016, which is a continuation-in-part
(Continued)

(51) Int. Cl.
*G06F 3/048* (2013.01)
*G06Q 30/06* (2012.01)
(Continued)

(52) U.S. Cl.
CPC .......... *G06Q 30/0601* (2013.01); *A45B 3/02* (2013.01); *A45B 3/04* (2013.01); *A45B 17/00* (2013.01);
(Continued)

(58) Field of Classification Search
CPC . G06F 3/16; G06F 3/041; G06F 3/048; G06F 3/0481; G06F 3/0484;
(Continued)

(56) References Cited

U.S. PATENT DOCUMENTS

D138,774 S 6/1873 Whitcomb
2,070,045 A 2/1937 Gilpin
(Continued)

FOREIGN PATENT DOCUMENTS

CN 102258250 11/2011
CN 202974544 6/2013
(Continued)

OTHER PUBLICATIONS

International Search Report and Written Opinion of International Searching Authority, International Application No. PCT/US2017/045059, dated Jan. 25, 2018.
(Continued)

*Primary Examiner* — Xiomar Bautista

(57) ABSTRACT

A mobile computing device may comprise a user interface component configured to output stimuli and receive inputs, a wireless transceiver configured to communicate commands and/or messages to one or more wireless transceivers of the one or more electronic devices, and one or more processors coupled to the user interface component and the wireless transceiver. A computer-readable storage medium may contain computer-readable instructions, that, when executed by the one or more processors, cause the one or more processors to receive input corresponding to a selected azimuth movement/position of the intelligent umbrella and a selected tilting movement position, communicate messages and/or commands, based on the selected azimuth movement and the selected tilting movement to the intelligent umbrella to cause a support assembly to rotate with respect to a base about an azimuth axis and to cause an upper support assembly to tilt with respect to a lower assembly about an elevation axis.

20 Claims, 47 Drawing Sheets

Related U.S. Application Data of application No. 15/242,970, filed on Aug. 22, 2016, which is a continuation-in-part of application No. 15/225,838, filed on Aug. 2, 2016, which is a continuation-in-part of application No. 15/219,292, filed on Jul. 26, 2016, which is a continuation-in-part of application No. 15/214,471, filed on Jul. 20, 2016, which is a continuation-in-part of application No. 15/212,173, filed on Jul. 15, 2016, which is a continuation-in-part of application No. 15/160,856, filed on May 20, 2016, now Pat. No. 9,949,540, and a continuation of application No. 15/160,822, filed on May 20, 2016.

(60) Provisional application No. 62/333,822, filed on May 9, 2016.

(51) Int. Cl.

| | | |
|---|---|---|
| *G06F 3/0488* | (2013.01) | |
| *G06F 3/0484* | (2013.01) | |
| *H05B 37/02* | (2006.01) | |
| *A45B 23/00* | (2006.01) | |
| *A45B 17/00* | (2006.01) | |
| *A45B 25/14* | (2006.01) | |
| *H04N 7/18* | (2006.01) | |
| *A45B 3/02* | (2006.01) | |
| *A45B 3/04* | (2006.01) | |
| *A45B 25/10* | (2006.01) | |
| *A45B 25/18* | (2006.01) | |
| *G06K 9/00* | (2006.01) | |
| *G06F 3/16* | (2006.01) | |
| *A45B 25/00* | (2006.01) | |
| *G08B 21/18* | (2006.01) | |

(52) U.S. Cl.
CPC .............. *A45B 23/00* (2013.01); *A45B 25/10* (2013.01); *A45B 25/143* (2013.01); *A45B 25/18* (2013.01); *G06F 3/04847* (2013.01); *G06F 3/04883* (2013.01); *H04N 7/181* (2013.01); *H05B 37/0245* (2013.01); *A45B 2017/005* (2013.01); *A45B 2023/0012* (2013.01); *A45B 2025/003* (2013.01); *A45B 2200/1018* (2013.01); *A45B 2200/1027* (2013.01); *G06F 3/165* (2013.01); *G06F 3/167* (2013.01); *G06K 9/00288* (2013.01); *G08B 21/182* (2013.01)

(58) Field of Classification Search
CPC ....... G06F 3/0488; G06Q 30/06; A45B 25/00; A45B 25/14; G08B 21/18; H04N 7/18; H05B 37/02; G06K 9/00; G01S 3/78; G01S 3/782; G01S 3/784; G01S 3/785; G01S 3/786; G05B 15/00; G05B 15/02; G01J 1/42; E04H 15/28
See application file for complete search history.

(56) References Cited

U.S. PATENT DOCUMENTS

| | | | |
|---|---|---|---|
| 2,087,537 | A | 7/1937 | Finkel |
| 2,485,118 | A | 10/1949 | Simpson |
| 3,028,856 | A | 4/1959 | Deall |
| 2,960,094 | A | 11/1960 | Small |
| 3,917,942 | A | 11/1975 | McCay |
| 4,107,521 | A | 8/1978 | Winders |
| 4,174,532 | A | 11/1979 | Kelley |
| 4,215,410 | A | 7/1980 | Weslow et al. |
| 4,684,230 | A | 8/1987 | Smith |
| 4,787,019 | A | 11/1988 | Van den Broeke |
| 4,915,670 | A | 4/1990 | Nesbit |
| 5,002,082 | A | 3/1991 | Roder |
| 5,007,811 | A | 4/1991 | Hopkins |
| 5,029,239 | A | 7/1991 | Nesbit |
| 5,161,561 | A | 11/1992 | Jamieson |
| 5,213,122 | A | 5/1993 | Grady, II |
| 5,273,062 | A | 12/1993 | Mozdzanowski |
| 5,275,364 | A | 1/1994 | Burger et al. |
| 5,318,055 | A | 6/1994 | Olaniyan |
| 5,321,579 | A | 6/1994 | Brown et al. |
| 5,349,975 | A | 9/1994 | Valdner |
| 5,683,064 | A | 11/1997 | Copeland et al. |
| 5,979,793 | A | 11/1999 | Louis |
| 5,996,511 | A | 12/1999 | Swoger |
| 6,017,188 | A | 1/2000 | Benton |
| 6,027,309 | A | 2/2000 | Rawls et al. |
| 6,058,951 | A | 5/2000 | Wilson |
| 6,113,054 | A | 9/2000 | Ma |
| 6,134,103 | A | 10/2000 | Ghanma |
| 6,138,970 | A | 10/2000 | Sohrt et al. |
| 6,158,701 | A | 12/2000 | Deshler |
| 6,199,570 | B1 | 3/2001 | Patarra |
| 6,298,866 | B1 | 10/2001 | Molnar, IV |
| 6,302,560 | B1 | 10/2001 | Lai |
| 6,347,776 | B1 | 2/2002 | Chuang |
| 6,374,840 | B1 | 4/2002 | Ma |
| 6,397,869 | B1 | 6/2002 | Jennings |
| 6,405,742 | B1 | 6/2002 | Driscoll |
| 6,412,889 | B1 | 7/2002 | Hummell et al. |
| 6,439,249 | B1 | 8/2002 | Spatafora et al. |
| 6,446,650 | B1 | 9/2002 | Ma |
| 6,453,621 | B1 | 9/2002 | Bundy et al. |
| 6,488,254 | B2 | 12/2002 | Li |
| 6,511,033 | B2 | 1/2003 | Li |
| 6,519,144 | B1 | 2/2003 | Henrie et al. |
| 6,536,721 | B1 | 3/2003 | Kao |
| 6,554,012 | B2 | 4/2003 | Patarra |
| 6,565,060 | B2 | 5/2003 | Li |
| 6,575,183 | B2 | 6/2003 | Tung |
| 6,585,219 | B2 | 7/2003 | Li |
| 6,598,990 | B2 | 7/2003 | Li |
| 6,612,713 | B1 | 9/2003 | Kuelbs |
| 6,636,918 | B1 | 10/2003 | Aguilar et al. |
| 6,637,717 | B2 | 10/2003 | Li |
| 6,666,284 | B2 | 12/2003 | Stirm |
| 6,692,135 | B2 | 2/2004 | Li |
| 6,785,789 | B1 | 8/2004 | Kekre et al. |
| 6,830,058 | B2 | 11/2004 | Li |
| 6,837,255 | B2 | 1/2005 | Bunch |
| 6,840,657 | B2 | 1/2005 | Tung |
| 6,845,780 | B2 | 1/2005 | Bishirjian |
| 6,966,667 | B2 | 1/2005 | Li |
| 6,959,996 | B2 | 7/2005 | Ip |
| 6,923,193 | B2 | 8/2005 | Chen |
| 6,923,194 | B2 | 8/2005 | Li |
| 6,941,958 | B1 | 9/2005 | Sobek et al. |
| 6,945,263 | B2 | 9/2005 | Li |
| 6,961,237 | B2 | 11/2005 | Dickie |
| 7,003,217 | B2 | 2/2006 | Bachinski et al. |
| 7,013,903 | B2 | 3/2006 | Li |
| 7,017,598 | B2 | 3/2006 | Nipke |
| D518,629 | S | 4/2006 | Ma |
| 7,034,902 | B2 | 4/2006 | Tajima |
| 7,051,744 | B2 | 5/2006 | Hung |
| 7,108,388 | B2 | 9/2006 | Li |
| 7,111,954 | B1 | 9/2006 | Lai |
| 7,128,076 | B2 | 10/2006 | Freedman |
| 7,134,442 | B2 | 11/2006 | Ma |
| 7,134,762 | B2 | 11/2006 | Ma |
| 7,143,501 | B2 | 12/2006 | Bramson et al. |
| 7,163,042 | B2 | 1/2007 | Li |
| 7,188,633 | B2 | 3/2007 | Zerillo |
| D539,632 | S | 4/2007 | Ma |
| D558,444 | S | 1/2008 | Ma |
| 7,331,684 | B2 | 2/2008 | Tung |
| 7,407,178 | B2 | 8/2008 | Freedman |
| 7,412,985 | B2 | 8/2008 | Ma |
| 7,422,343 | B2 | 9/2008 | Li |

(56) References Cited

U.S. PATENT DOCUMENTS

| | | |
|---|---|---|
| 7,431,469 B2 | 10/2008 | Li |
| 7,481,547 B2 | 1/2009 | Li |
| 7,493,909 B2 | 2/2009 | Ma |
| 7,497,225 B1 | 3/2009 | Klein, Jr. et al. |
| 7,497,583 B2 | 3/2009 | Ma |
| 7,513,479 B2 | 4/2009 | Li |
| 7,533,680 B2 | 5/2009 | Ma |
| 7,559,520 B2 | 7/2009 | Quijano et al. |
| 7,562,667 B2 | 7/2009 | Li |
| 7,593,220 B2 | 9/2009 | Proctor et al. |
| 7,604,015 B2 | 10/2009 | Fraser |
| 7,628,164 B2 | 12/2009 | Joen-an Ma |
| 7,641,165 B2 | 1/2010 | Li |
| 7,650,230 B1 | 1/2010 | Laverick et al. |
| 7,703,464 B2 | 4/2010 | Ma |
| 7,708,022 B2 | 5/2010 | Joen-an Ma |
| 7,726,326 B2 | 6/2010 | O'Donnell |
| 7,740,022 B2 | 6/2010 | Li |
| 7,755,970 B2 | 7/2010 | Welker et al. |
| 7,778,624 B2 | 8/2010 | Li |
| 7,784,761 B2 | 8/2010 | Ma |
| 7,798,161 B2 | 9/2010 | Ma |
| D626,324 S | 11/2010 | Ma |
| 7,856,996 B2 | 12/2010 | Ma |
| 7,861,734 B2 | 1/2011 | Ma |
| 7,891,367 B2 | 2/2011 | Ma |
| 7,891,633 B2 | 2/2011 | Li |
| 7,900,643 B2 | 3/2011 | Ma |
| 7,926,496 B2 | 4/2011 | Young et al. |
| 7,926,497 B2 | 4/2011 | Young et al. |
| 7,938,132 B2 | 5/2011 | Li |
| 7,963,293 B2 | 6/2011 | Ma |
| 7,963,295 B2 | 6/2011 | Li |
| 7,975,711 B2 | 7/2011 | Li |
| 8,015,988 B2 | 9/2011 | Li |
| 8,020,572 B2 | 9/2011 | Ma |
| 8,025,071 B2 | 9/2011 | Ma |
| 8,061,374 B2 | 11/2011 | Li |
| 8,061,375 B2 | 11/2011 | Ma |
| 8,066,021 B2 | 11/2011 | Ma |
| 8,069,868 B2 | 12/2011 | Kuelbs |
| 8,082,935 B2 | 12/2011 | Ma |
| 8,104,491 B2 | 1/2012 | Li |
| 8,267,104 B2 | 1/2012 | Li |
| 8,116,497 B2 | 2/2012 | Li |
| 8,118,045 B2 | 2/2012 | Li |
| 8,118,046 B2 * | 2/2012 | Li .................... A45B 23/00 135/96 |
| D660,137 S | 5/2012 | Ma |
| 8,166,986 B2 | 5/2012 | Ma |
| 8,169,921 B2 | 5/2012 | Yang et al. |
| 8,205,656 B2 | 6/2012 | Ma |
| 8,251,078 B2 | 8/2012 | Ma |
| 8,291,923 B2 | 10/2012 | Young et al. |
| 8,297,294 B2 | 10/2012 | Li |
| 8,331,598 B2 | 12/2012 | Li |
| 8,345,889 B2 | 1/2013 | Li |
| 8,356,613 B2 | 1/2013 | Ma |
| 8,360,079 B2 | 1/2013 | Li |
| 8,387,641 B1 | 3/2013 | Ilan |
| 8,393,341 B2 | 3/2013 | Li |
| 8,413,671 B2 | 4/2013 | Li |
| 8,444,104 B2 | 5/2013 | Li |
| 8,453,659 B2 | 6/2013 | Li |
| 8,522,806 B2 | 9/2013 | Li |
| 8,555,905 B2 | 10/2013 | Ma |
| 8,555,906 B2 | 10/2013 | Ma |
| 8,616,226 B2 | 12/2013 | Ma et al. |
| D697,705 S | 1/2014 | Ma |
| 8,632,045 B2 | 1/2014 | Ma |
| 8,636,020 B2 | 1/2014 | Li |
| 8,657,246 B2 | 2/2014 | Ma |
| 8,672,287 B2 | 3/2014 | Li |
| 8,727,555 B2 | 5/2014 | Kuelbs |
| 8,740,170 B2 | 6/2014 | Li |
| 8,794,781 B2 | 8/2014 | Kuelbs |
| 8,851,093 B2 | 10/2014 | Li |
| D719,342 S | 12/2014 | Ma |
| D719,343 S | 12/2014 | Ma |
| 8,910,646 B2 | 12/2014 | Li |
| 8,919,361 B2 | 12/2014 | Ma |
| 8,919,722 B2 | 12/2014 | Ma |
| 8,960,625 B2 | 2/2015 | Ma |
| D724,309 S | 3/2015 | Ma |
| 9,030,829 B2 | 5/2015 | Ma |
| D731,166 S | 6/2015 | Ma |
| 9,078,497 B2 | 7/2015 | Ma |
| 9,113,683 B2 | 8/2015 | Ma |
| D738,609 S | 9/2015 | Ma |
| D738,610 S | 9/2015 | Ma |
| 9,125,462 B2 | 9/2015 | Akin |
| 9,192,215 B2 | 11/2015 | Ma |
| 9,220,325 B2 | 12/2015 | Ma |
| 9,222,693 B2 | 12/2015 | Gourlay et al. |
| 9,237,785 B2 | 1/2016 | Ma |
| 9,241,549 B2 | 1/2016 | Ma |
| 9,289,039 B2 | 3/2016 | Akin et al. |
| 9,345,295 B2 | 5/2016 | Li |
| 9,510,653 B2 | 12/2016 | Akin |
| 9,528,313 B1 * | 12/2016 | Arimilli .................. E04F 10/02 |
| 9,670,725 B2 * | 6/2017 | Gill .......................... E06B 9/68 |
| 2001/0001083 A1 | 5/2001 | Helot |
| 2002/0074027 A1 | 6/2002 | Maidment |
| 2002/0078985 A1 | 6/2002 | Farr |
| 2002/0144721 A1 | 10/2002 | Kronin et al. |
| 2002/0185582 A1 | 12/2002 | Li |
| 2003/0000557 A1 | 1/2003 | Lai |
| 2003/0000559 A1 | 1/2003 | Wu |
| 2003/0192579 A1 | 10/2003 | Llamas |
| 2004/0055627 A1 | 3/2004 | Moga |
| 2004/0103934 A1 | 6/2004 | Szumlic |
| 2004/0154653 A1 | 8/2004 | Brutsaert |
| 2004/0228118 A1 | 11/2004 | Peterson |
| 2004/0240167 A1 | 12/2004 | Ledbetter et al. |
| 2004/0261827 A1 | 12/2004 | Chen |
| 2005/0016571 A1 | 1/2005 | Wu |
| 2005/0072451 A1 | 4/2005 | Vivian et al. |
| 2005/0161067 A1 | 7/2005 | Hollins |
| 2005/0279396 A1 | 12/2005 | Choi |
| 2006/0016465 A1 | 1/2006 | Johannes van Loosbroek et al. |
| 2006/0016955 A1 | 1/2006 | Kao |
| 2006/0124122 A1 | 6/2006 | Young et al. |
| 2006/0127034 A1 | 6/2006 | Brooking et al. |
| 2006/0196532 A1 | 9/2006 | Tung |
| 2007/0040647 A1 | 2/2007 | Saenz et al. |
| 2007/0070588 A1 | 3/2007 | Lin |
| 2007/0126208 A1 * | 6/2007 | Freedman .............. A45B 11/00 280/647 |
| 2007/0127231 A1 | 6/2007 | Li |
| 2007/0151588 A1 | 7/2007 | Yul et al. |
| 2007/0211450 A1 | 9/2007 | You |
| 2007/0242450 A1 | 10/2007 | Blatecky |
| 2007/0279856 A1 | 12/2007 | Bragg |
| 2007/0283987 A1 | 12/2007 | Reyes et al. |
| 2008/0056898 A1 | 3/2008 | Li |
| 2008/0062128 A1 | 3/2008 | Brodersen et al. |
| 2008/0076379 A1 | 3/2008 | Li |
| 2008/0092440 A1 | 4/2008 | Johnson |
| 2008/0092936 A1 | 4/2008 | Carabillo |
| 2008/0262657 A1 | 10/2008 | Howell et al. |
| 2009/0056775 A1 | 3/2009 | Kuelbs |
| 2009/0058354 A1 | 3/2009 | Harrison |
| 2009/0071516 A1 | 3/2009 | Li |
| 2009/0193578 A1 | 8/2009 | Jang et al. |
| 2009/0196020 A1 | 8/2009 | Tsai |
| 2009/0250982 A1 | 10/2009 | Cohen |
| 2009/0277486 A1 | 11/2009 | Stepaniuk et al. |
| 2009/0320827 A1 | 12/2009 | Thompson et al. |
| 2010/0012164 A1 | 1/2010 | Stoelinga |
| 2010/0097441 A1 | 4/2010 | Trachtenberg et al. |
| 2010/0132751 A1 | 6/2010 | Li |
| 2010/0245032 A1 | 9/2010 | Li |
| 2010/0320819 A1 | 12/2010 | Cohen et al. |

(56) References Cited

U.S. PATENT DOCUMENTS

| | | | |
|---|---|---|---|
| 2011/0048478 A1* | 3/2011 | Wang | A45C 7/0031 135/16 |
| 2011/0088734 A1 | 4/2011 | Garcia | |
| 2011/0157801 A1 | 6/2011 | Satterfield | |
| 2013/0048829 A1 | 2/2013 | Herniak | |
| 2013/0162396 A1* | 6/2013 | Yang | B60L 15/20 340/5.81 |
| 2013/0306628 A1 | 11/2013 | Volin | |
| 2014/0041555 A1 | 2/2014 | Ramberg | |
| 2014/0317168 A1 | 10/2014 | Suresh | |
| 2015/0136944 A1 | 5/2015 | Segev | |
| 2015/0216273 A1 | 8/2015 | Akin | |
| 2015/0216274 A1 | 8/2015 | Akin | |
| 2015/0237975 A1 | 8/2015 | Ng | |
| 2015/0245691 A1 | 9/2015 | Fitgerald | |
| 2015/0374083 A1 | 12/2015 | Akin | |
| 2016/0095398 A1 | 4/2016 | Li | |
| 2016/0119699 A1 | 4/2016 | Caban | |
| 2016/0198818 A1 | 7/2016 | Akin | |
| 2016/0326765 A1 | 11/2016 | Barbret | |
| 2016/0338457 A1 | 11/2016 | Gharabegian | |
| 2017/0055653 A1 | 3/2017 | Gharabegian | |
| 2017/0071300 A1* | 3/2017 | Gharabegian | A45B 25/165 |
| 2017/0086545 A1 | 3/2017 | Gharabegian | |
| 2017/0086546 A1 | 3/2017 | Gharabegian | |
| 2017/0105497 A1 | 4/2017 | Gharabegian | |

FOREIGN PATENT DOCUMENTS

| | | |
|---|---|---|
| CN | CN203073199 | 7/2013 |
| CN | 103405009 | 11/2013 |
| CN | 104469162 | 3/2015 |
| CN | 104835334 | 8/2015 |
| CN | 105193034 | 12/2015 |
| CN | 201580588 | 4/2016 |
| CN | 106163041 | 11/2016 |
| ES | EP 1731055 | 12/2006 |
| FR | 2977457 A1 | 1/2013 |
| GR | 20060100244 | 11/2007 |
| RU | 2251066 | 4/2005 |
| RU | 47414 | 8/2005 |
| RU | 55549 | 8/2006 |
| WO | WO 03 073884 | 9/2003 |
| WO | WO 2004103113 | 12/2004 |
| WO | WO 2005092140 | 10/2005 |
| WO | WO 2006059334 | 6/2006 |
| WO | WO 2008102403 | 8/2008 |
| WO | WO 2009124384 | 10/2009 |
| WO | WO 2010/098735 | 9/2010 |
| WO | WO 2011140557 | 11/2011 |

OTHER PUBLICATIONS

Interntional Search Report and Written Opinion of International Searching Authority, International Application No. PCT/US2017/043789, dated Nov. 23, 2017.

International Search Report and Written Opinion of International Searching Authority Application No. PCT/US2017/052595, dated Feb. 21, 2018.

GPS Sun Tracking Solar Panel; Alyammahi et al., published May 7, 2015, accessed Jun. 21, 2017 from https:repository.lib.fit.edu/handle/11141/628?show=full.

Written Opinion of the International Searching Authority, International Application No. PCT/US2016/033331, Written Opinion Completed: Jul. 27, 2016.

International Search Report, PCT Application No. PCT/US2017/068771, dated May 10, 2018, Federal Institute of Industrial Property, Authorized Officer, A. Chekalkina.

* cited by examiner

Fig. 8

| | Hardware | | | Function |
|---|---|---|---|---|
| 805 | Telemetry Board With Slave Processor | GPS/GNSS | 806 | Provide Location and Orientation Information |
| | | Digital Compass | 807 | |
| 810 | Weather Variables Board With Slave Processor | Air Quality Sensor | 811 | Sense Weather Variables Surrounding the Shade. Detect High Winds and Close Shade's Arms |
| | | UV Radiation Sensor | 812 | |
| | | Digital Barometer | 813 | |
| | | Temperature | 814 | |
| | | Humidity | 816 | |
| | | Wind Speed | 817 | |
| 815 | Voice Recognition Board With Slave Processor | | | Enable Control Via Voice Commands. Provide Audible Warnings |
| 820 | Rechargable Battery | | | Store Electricity Collected Through Solar Panel/AC Charger. Provide Electricity for All Shade Components |
| 825 | Solar Panel | | | Generate Electricity To Charge the Battery |
| 830 | Power Tracking Solar Charger | | | Regulate and Balance the Charging Process. Provide Data Regarding Charging State |
| 835 | AC Adapter Input | | | Charge the Battery/Run System in Absence of Sun |
| 840 | Proximity Sensor | | | Identify the Location of A Person Relative to Moving Components |
| 845 | Motion Sensor | | | Detect Presence of Person Around Shade |
| 850 | Code Based Obstacle Detector | | | Detect Presence of Person/Object Within Shade's Path of Travel |
| 855 | Tilt Sensor | | | Detect movement/relocation of Shade and Reorient to Correct Position |
| 860 | Linux Based Computer With Integrated Wifi And 5xIP Cameras | | | Collect Video Feed along with Sensor data. Communicate Through Wifi. |
| 865 | Bluetooth | | | Provides Short Distance Communication for App Based Control, Audio Transmission, and Data Retrieval. |
| 870 | LED Lighting | | | Provides Light During Night Operation |
| 875 | Class D Stereo Amplifier With Speakers | | | Provides Audio Playback Through Mobile App or Wifi Stream |
| 880 | Azimuth Servo Motor With Controller | | | Rotates Shade to Predetermined Azimuth Angle |
| 885 | Elevation Servo Motor With Controller | | | Rotates Shade to Predetermined Elevation Angle |
| 890 | Actuator Servo Motor With Controller | | | Extend/Retract Shade Blades |
| 895 | Motion Control PCB | | | |
| 857 | Digital Cameras | | | |
| 866 | Wind Turbine | | | |
| 977 | USB Device | | | |

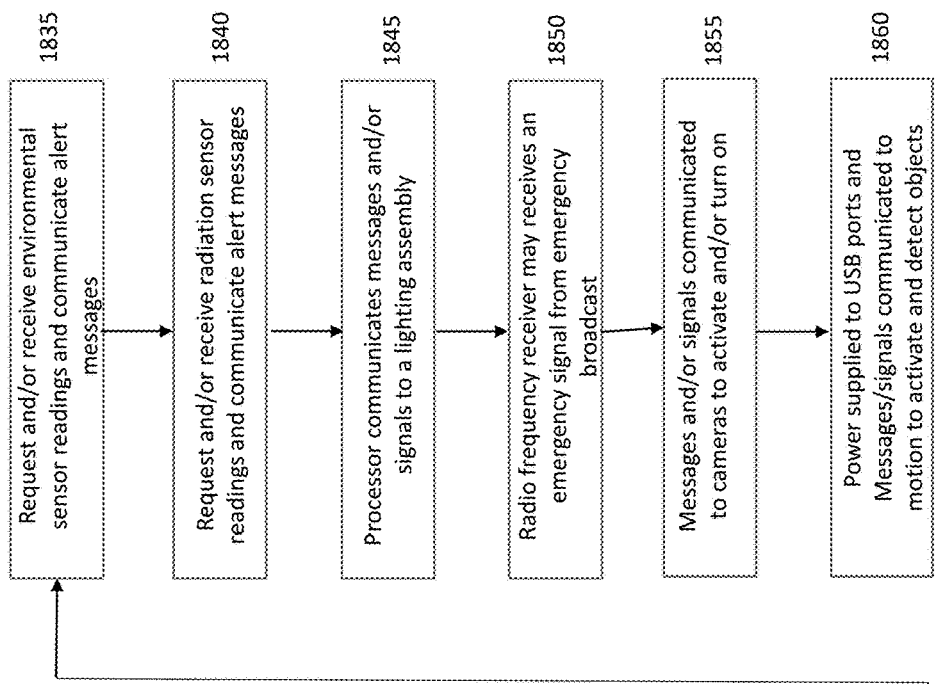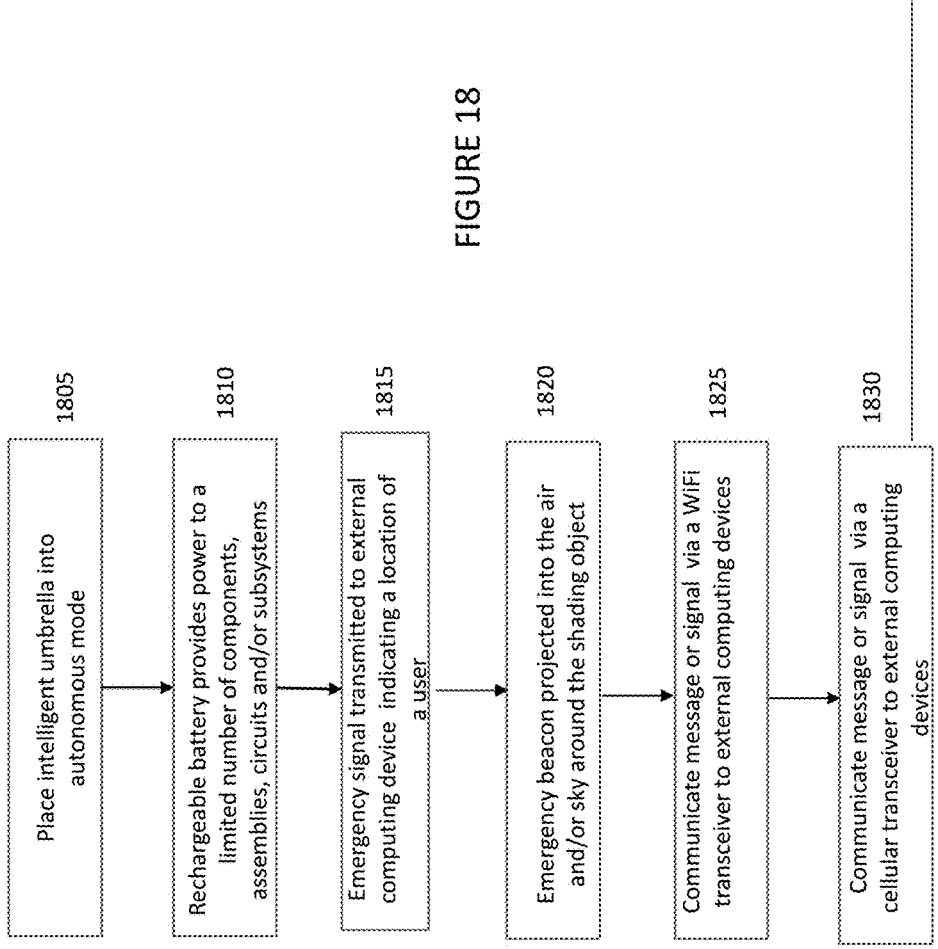
FIGURE 18

MOBILE COMPUTING DEVICE CONTROL OF SHADING OBJECT, INTELLIGENT UMBRELLA AND INTELLIGENT SHADING CHARGING SYSTEM

RELATED APPLICATIONS

This application is a continuation-in-part of U.S. non-provisional application Ser. No. 15/268,199, filed Sep. 16, 2016, entitled "Automatic Operation of Shading Object, Intelligent Umbrella and Intelligent Shading Charging System," which is a continuation-in-part of U.S. non-provisional application Ser. No. 15/242,970, filed Aug. 22, 2016, entitled "Shading Object, Intelligent Umbrella and Intelligent Shading Charging Security System and Method of Operation," which is a continuation-in-part of U.S. non-provisional application Ser. No. 15/225,838, filed Aug. 2, 2016, entitled "Remote Control of Shading Object and/or Intelligent Umbrella," which is a continuation-in-part of U.S. non-provisional patent application Ser. No. 15/219,292, filed Jul. 26, 2016, entitled "Shading Object, Intelligent Umbrella and Intelligent Shading Object Integrated Camera and Method of Operation," which is a continuation-in-part of U.S. non-provisional patent application Ser. No. 15/214,471, filed Jul. 20, 2016, entitled "Computer-Readable Instructions Executable by a Processor to Operate a Shading Object, Intelligent Umbrella and/or Intelligent Shading Charging System," which is a continuation-in-part of U.S. non-provisional patent application Ser. No. 15/212,173, filed Jul. 15, 2016, entitled "Intelligent Charging Shading Systems," which is a continuation-in-part of application of U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and is also a continuation-in-part of application of U.S. non-provisional patent application Ser. No. 15/160,822, filed May 20, 2016, entitled "Intelligent Shading Objects with Integrated Computing Device," both of which claim the benefit of U.S. provisional Patent Application Ser. No. 62/333,822, entitled "Automated Intelligent Shading Objects and Computer-Readable Instructions for Interfacing With, Communicating With and Controlling a Shading Object," filed May 9, 2016, the disclosures of which are all hereby incorporated by reference.

BACKGROUND

1. Field

The subject matter disclosed herein relates to mobile computing device control of a shading object, an intelligent umbrella and/or a shading charging system.

2. Information/Background of the Invention

Conventional sun shading devices usually are comprised of a supporting frame and an awning or fabric mounted on the supporting frame to cover a predefined area. For example, a conventional sun shading device may be an outdoor umbrella or an outdoor awning.

However, current sun shading devices do not appear to be flexible, modifiable or able to adapt to changing environmental conditions, or user's desires. Many of the current sun shading devices appear to require manual operation in order to change inclination angle of the frame to more fully protect an individual from the environment. Further, the current sun shading devices appear to have one (or a single) awning or fabric piece that is mounted to an interconnected unitary frame. An interconnected unitary frame may not be able to be opened or deployed in many situations. Accordingly, alternative embodiments may be desired. Further, current sun shading devices may not have automated assemblies to allow a shading object to track movement of a sun and/or adjust to other environmental conditions. In addition, current sun shading devices do not communicate with external shading object related systems. Further, individuals utilizing current sun shading devices are limited in interactions with users. In addition, sun shading devices generally do not have software stored therein which controls and/or operates the sun-shading device. Further, current sun shading devices do not interact with the environment in which they are installed and require manual intervention in order to operate and/or perform functions.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 8 illustrates a block diagram of a movement control PCB according to embodiments;

FIG. 18 illustrates operation of a shading object, intelligent umbrella and/or an intelligent shading charging system if no external power and/or solar power is available according to embodiments;

DETAILED DESCRIPTION

Figure 1A:
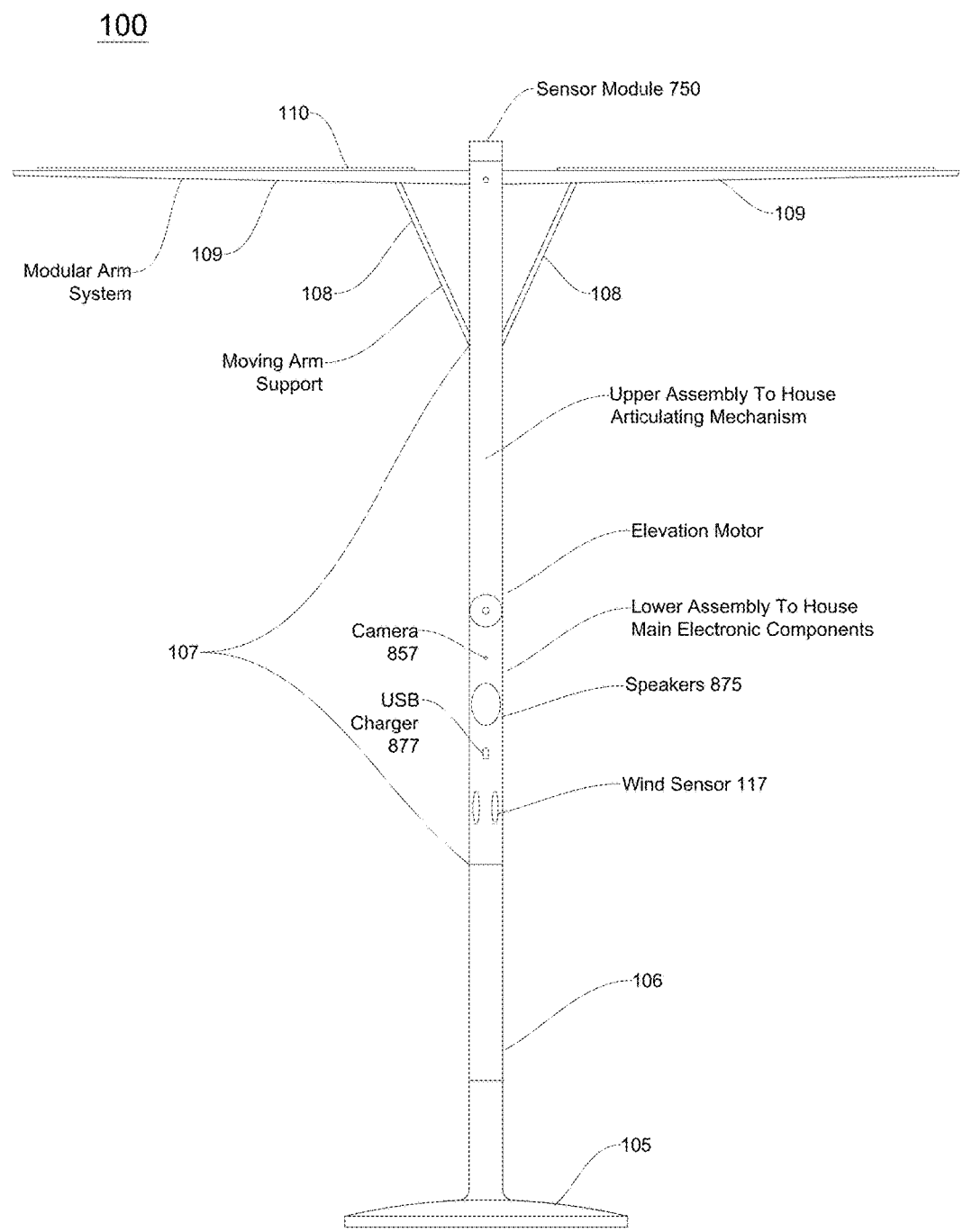
FIGS. 1A and 1B illustrates a shading object or shading object device according to embodiments.

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that claims are intended to cover any and all modifications and/or changes as fall within claimed subject matter.

References throughout this specification to one implementation, an implementation, implementations, examples, embodiments, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation and/or to any one particular implementation described. Furthermore, it is to be understood that particular features, structures, functions, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients or client devices, and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, for example, including between wireless devices coupled and/or connected via a wireless network.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, rack-mounted servers, desktop computers, cloud-based servers, laptop computers, set top boxes, tablets, netbooks, smart phones, wearable devices, integrated devices combining two or more features of the foregoing devices, the like, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases, database servers, and/or portions thereof, as appropriate.

It should be understood that for ease of description a network device and/or networking device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof.

Operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context. In a context of this application, if signals, instructions, and/or commands are transmitted from one component (e.g., a controller or processor) to another component (or assembly), it is understood that signals, instructions, and/or commands may be transmitted directly to a component, or may pass through a number of other components on a way to a destination component. For example, a signal transmitted from a motor controller and/or processor to a motor (or other driving assembly) may pass through glue logic, an amplifier, and/or another component. Similarly, a signal communicated through solar cells and/or arrays may pass through a solar charging assembly and/or an amplifier or converter or other component on the way to a rechargeable battery, and a signal communicated from any one or a number of sensors to a controller and/or processor may pass through a sensor module, a conditioning module, an analog-to-digital controller, and/or a comparison module.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements and/or improvements, including, for example, past, present and/or future mass storage, such as network attached storage (NAS), cloud storage, a storage area network (SAN), and/or other forms of computing and/or device readable media, for example. A network may include a portion of the Internet, one or more local area networks (LANs), one or more wide area networks (WANs), wire-line type connections, one or more personal area networks (PANs), wireless type connections, other network connections, or any combination thereof. Thus, a network may be worldwide in scope and/or extent.

The Internet and/or a global communications network may refer to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet may include local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices and/or computing devices may engage in an HTTP session through an exchange of appropriately compatible and/or compliant signal packets and/or frames. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. A content delivery server and/or the Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. HTML and/or XML are merely example languages provided as illustrations and intended to refer to any version, now known and/or developed at another time and claimed subject matter is not intended to be limited to examples provided as illustrations, of course.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. Claimed subject matter is intended to embrace meaningful, descriptive parameters in any format, so long as the one or more parameters comprise physical signals and/or states, which may include, as parameter examples, name of the collection of signals and/or states.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In embodiments, a shading object may comprise a shading object computing device installed and/or integrated within or as part of a shading object, intelligent umbrella and/or intelligent shading charging system. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated within a memory of a computing device within a shading object, umbrella and/or shading charging system.

It has proven convenient at times, principally for reasons of common usage, to refer to such signals as bits, data, values, elements, symbols, characters, terms, numbers, numerals or the like, and that these are conventional labels. Unless specifically stated otherwise, it is appreciated that throughout this specification discussions utilizing terms such as "processing," "computing," "calculating," "determining" or the like may refer to actions or processes of a specific apparatus, such as a special purpose computer or a similar special purpose electronic computing device (e.g., such as a shading object, umbrella and/or shading charging computing device). In the context of this specification, therefore, a special purpose computer or a similar special purpose electronic computing device (e.g., a shading object, umbrella and/or shading charging computing device) may be capable of manipulating or transforming signals (electronic and/or magnetic) in memories (or components thereof), other storage devices, transmission devices sound reproduction devices, and/or display devices.

In embodiments, a controller and/or a processor typically performs a series of instructions resulting in data manipulation. In embodiments, a microcontroller or microprocessor may be a compact microcomputer designed to govern the operation of embedded systems in electronic devices, e.g., an intelligent, automated shading object, umbrella, and/or shading charging systems, and various other electronic and mechanical devices coupled thereto or installed thereon. Microcontrollers may include processors, microprocessors, and other electronic components. Controller may be a commercially available processor such as an Intel Pentium, Motorola PowerPC, SGI MIPS, Sun UltraSPARC, or Hewlett-Packard PA-RISC processor, but may be any type of application-specific and/or specifically designed processor or controller. In embodiments, a processor and/or controller may be connected to other system elements, including one or more memory devices, by a bus. Usually, a processor or controller, may execute an operating system which may be, for example, a Windows-based operating system (Microsoft), a MAC OS System X operating system (Apple Computer), one of many Linux-based operating system distributions (e.g., an open source operating system) a Solaris operating system (Sun), a portable electronic device operating system (e.g., mobile phone operating systems), and/or a UNIX operating systems. Embodiments may not be limited to any particular implementation of a controller and/or processor, and/or operating system.

The specification may refer to a shading object as an apparatus that provides shade to a user from weather elements such as sun, wind, rain, hail, and/or other environmental conditions. In embodiments, a shading object may be referred to as an intelligent shading object, an intelligent umbrella, and/or intelligent shading charging system. In embodiments, a shading object may be referred to as automated shading object, automated umbrella, and/or automated shading charging system. The automated intelligent shading object may also be referred to as a parasol, intelligent umbrella, sun shade, outdoor shade furniture, sun screen, sun shelter, awning, sun cover, sun marquee, brolly and other similar names, which may all be utilized interchangeably in this application. Shading objects which also have electric vehicle charging capabilities may also be referred to as intelligent shading charging systems. These terms may be utilized interchangeably throughout the specification. In embodiments, many features, functions, and/or operations may occur automatically, without input from a user and/or operator. In embodiments, many features, functions, and/or operations may occur via voice control and/or via control via computer-readable instructions stored in a memory and executable by a processor in response to voice control. In embodiments, many features, functions and/or operations may occur via a remote and/or separate computing device having computer-readable instructions stored in a memory and executable by a processor that communicates with a shading object and/or shading charging system to control operations. The shading objects, intelligent umbrellas and shading charging systems described herein comprises many novel and non-obvious features, which are described in detail in U.S. non-provisional patent application Ser. No. 15/212,173, filed Jul. 15, 2016, entitled "Intelligent Charging Shading Systems," U.S. patent application Ser. No. 14/810,380, entitled "Intelligent Shading Objects", inventor Armen Sevada Gharabegian, filed Jul. 27, 2015, and U.S. Provisional Patent Application Ser. No. 62/165,869, filed May 22, 2015, the disclosures of which are hereby incorporated by reference.

FIG. 1A illustrates an intelligent shading object according to embodiments. In embodiments, an intelligent shading object and/or umbrella may comprise a base assembly 105, a stem assembly 106, a central support assembly 107 (including a lower assembly, a hinge assembly and/or gearbox, and/or an upper assembly), arm support assemblies 108, arms/blades 109, and/or a shading fabric 715. In embodiments, a stem assembly 106 (and a coupled central support assembly, arm support assemblies, and/or blades) may rotate within a base assembly around a vertical axis. In embodiments, an upper assembly of a center support assembly 107 may rotate up to a right angle with respect to a lower assembly of the center support assembly 107 via a gearbox or hinging mechanism, and a second motor. In embodiments, arm support assemblies 109 may deploy and/or extend from a center support assembly 107 to open a shading object. In embodiments, rotation of a stem assembly 106 may rotate automatically within a base assembly 105, an upper assembly may rotate automatically with respect to a lower assembly, and arm support assemblies 109 may automatically deploy and/or retract in response to commands initiated by a processor, controller and/or computing device. In embodiments, detachable arms/blades 109 may be attached or coupled to arm support assemblies 108. In embodiments, a detachable shading fabric 715 may be attached or coupled to arms/blades 109.

Figure 1B:
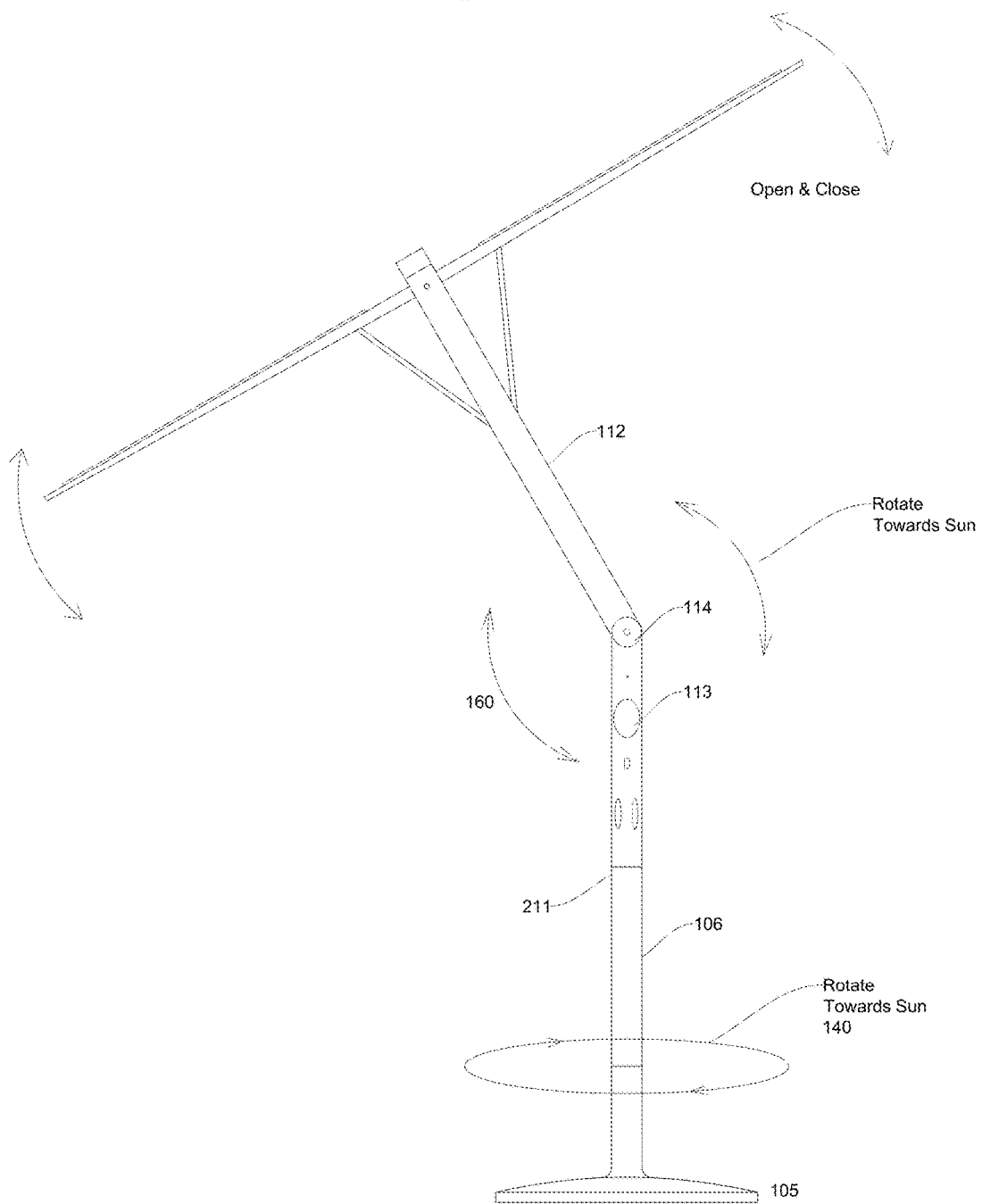

FIGS. 1A and 1B illustrates a shading object or shading object device according to embodiments. In embodiments, a shading object 100 may comprise a base assembly 105, a stem assembly 106, a center support assembly 107, one or more supporting arm assemblies 108, one or more arms/blades 109, solar panels and or a shading fabric (not shown). In embodiments, a stem assembly 106, a center support assembly 107, one or more supporting arm assemblies 108, and/or one or more arms/blades 109 may be referred to as an umbrella support assembly, a shading system body and/or shading subsystem. In embodiments, a central support assembly 107 may comprise an upper assembly 112, a lower assembly 113 and a hinging assembly and/or gearbox 114, where the hinging assembly and/or gearbox assembly 114 may connect and/or couple the upper assembly 112 to the lower assembly 113. In embodiments, a base assembly 105 may rest on a ground surface in an outdoor environment. A ground surface may be a floor, a patio, grass, sand, or other outdoor environments surfaces. In embodiments, a stem assembly 106 may be placed into a top portion of a base assembly 105.

Figure 3A:
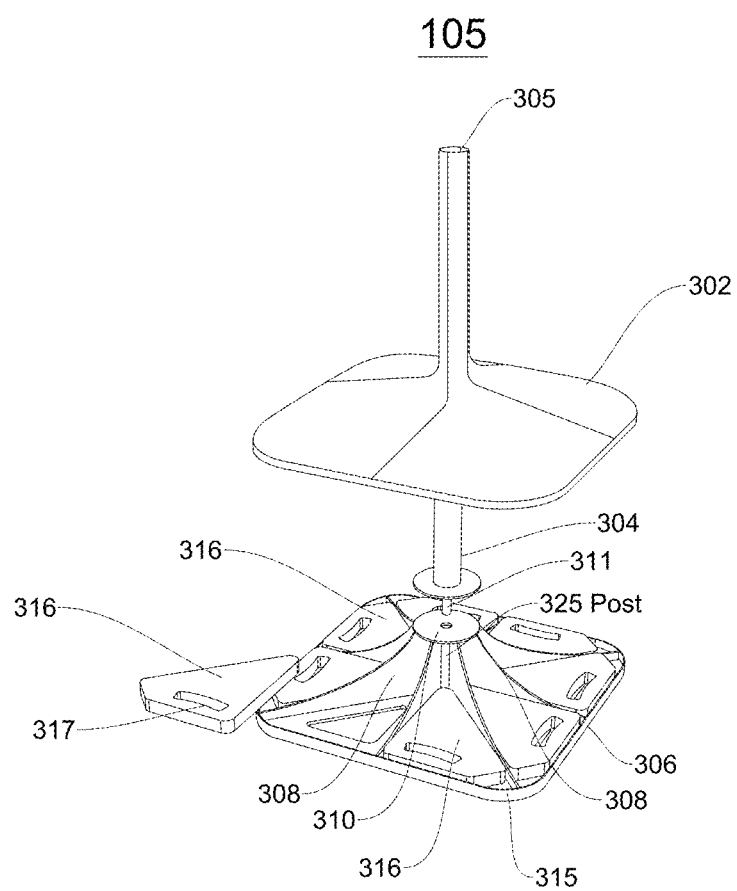
FIG. 3A illustrates a base assembly according to embodiments.

FIG. 3A illustrates a base assembly according to embodiments. A base assembly as illustrated in FIG. 3A and FIGS. 1A and 1B is described in detailed in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," the disclosures of which are both hereby incorporated by reference.

Figure 2:
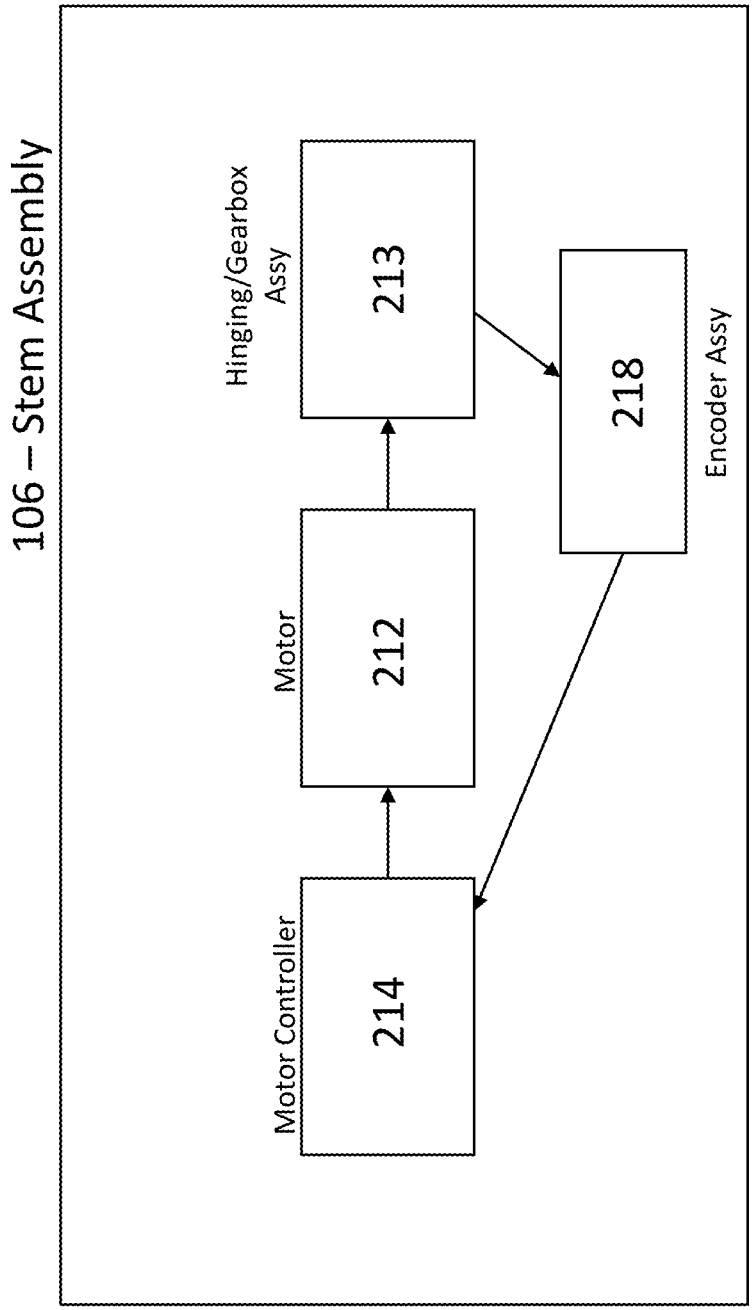
FIG. 2 illustrates a block diagram of a stem assembly according to embodiments.

In embodiments, a base assembly 105 may have an opening (e.g., a circular or oval opening) into which a stem assembly 106 may be placed. FIG. 2 illustrates a block diagram of a stem assembly according to embodiments. In embodiments, a stem assembly may be referred to as an automatic and/or motorized stem assembly. In embodiments, a stem assembly 106 may comprise a stem body 211 and a first motor assembly. In embodiments, a first motor assembly may comprise a first motor 212, a gear box assembly and/or hinging assembly 213, and/or a first motor controller 214. Although a gearbox assembly and/or hinging assembly is discussed, other connecting assemblies, gearing assemblies, actuators, etc., may be utilized. In embodiments, a first motor controller 214 may also be referred to as a motor driver and within this specification, terms "motor driver" and "motor controller" may be used interchangeably. In embodiments, a first motor controller 214 may receive commands, instructions and/or signals requesting movement of a shading system around an azimuth axis. In embodiments, a shading system body 211 may rotate (e.g., may rotate between 0 and 360 degrees about a vertical axis formed by a base assembly 105, a stem assembly 106, and/or a central support assembly 107). Reference number 140 (FIG. 1B) illustrates a rotation of a shading system body about a vertical axis according to embodiments. In embodiments, a shading object stem assembly 106 may rotate around a vertical axis, such as vertical axis 730 in FIG. 7. In embodiments, a shading object stem assembly may rotate 360 degrees about such a vertical axis. In embodiments, a shading object stem assembly 106 may rotate up to 270 degrees and/or 180 degrees about a vertical axis. In embodiments, a shading object stem assembly 106 may be limited by detents, stops and/or limiters in an opening of a base assembly 105. In embodiments, a stem assembly encoder 218 may provide location and/or position feedback to a first motor controller 214. In other words, an encoder 218 may verify that a certain distance and/or position has been moved by a base assembly 105 from an original position. In embodiments, encoders may be utilized in motor systems in order to feedback position and/or distance information to motor controllers and/or motors to verify a correct position has been turned. In embodiments, encoders (which may be utilized with motors or motor controllers) may have a number of positions and/or steps and may compare how much an output shaft and/or gearbox assembly has moved in order to feedback information to a motor controller. The embodiments described herein provide a benefit as compared to prior art umbrellas because the intelligent shading umbrella, due to its rotation (e.g., 360 degree rotation), may orient itself with respect to any position in a surrounding area. In embodiments, rotation may occur automatically in response to signals from a processor, controller and/or a component in a computing device (integrated within the umbrella and/or received from an external and/or separate computing device).

In embodiments, a first motor controller 214 may communicate commands and/or signals to a first motor 212 to cause movement of an umbrella support assembly or shading system body (e.g., a stem assembly 106, central support assembly 107, shading arm supports 108, and/or arms/blades 109) about an azimuth axis. In this illustrative embodiment, a base assembly 105 may remain stationary while the shading system boy rotates within the base assembly 105. In other words, a shading system body is placed in an opening of a base assembly 105 and rotates while the base assembly remains stationary. In embodiments, a first motor 212 may be coupled to a gearbox assembly 213. In embodiments, a gearbox assembly 213 may comprise a planetary gearbox assembly. A planetary gearbox assembly may be comprise a central sun gear, a planet carrier with one or more planet gears and an annulus (or outer ring). In embodiments, planet gears may mesh with a sun gear while outer rings teeth may mesh with planet gears. In embodiments, a planetary gearbox assembly may comprise a sun gear as an input, an annulus as an output and a planet carrier (one or more planet gears) remaining stationary. In embodiments, an input shaft may rotate a sun gear, planet gears may rotate on their own axes, and may simultaneously apply a torque to a rotating planet carrier that applies torque to an output shaft (which in this case is the annulus). In embodiments, a planetary gearbox assembly and a first motor 212 may be connected and/or adhered to a stem assembly 105. In embodiments, an output shaft from a gearbox assembly 213 may be connected to a base assembly 105 (e.g., an opening of a base assembly). In embodiments, because a base assembly 105 is stationary, torque on an output shaft of a gearbox assembly 213 may be initiated by a first motor 212 to cause a stem assembly 106 to rotate. In embodiments, other gearbox assemblies and/or hinging assemblies may also be utilized to utilize an output of a motor to cause a stem assembly 106 (and hence an umbrella support assembly) to rotate within a base assembly 105. In embodiments, a first motor 212 may comprise a pneumatic motor. In other embodiments, a first motor 212 may comprise a servo motor and/or a stepper motor.

In embodiments, a stem assembly 106 may be coupled and/or connected to a center support assembly 107. In embodiments, as mentioned above, a stem assembly 106 and a center support assembly 107 may both be part of an umbrella support assembly. In embodiments, a center support assembly 107 may comprise an upper assembly 112, a second gearbox assembly (or a linear actuator or hinging assembly) 114, a lower assembly 113, a second motor 121, and/or a second motor controller 122. In embodiments, a second motor assembly may comprise a second motor controller 122 and a second motor 121, and maybe a second gearbox assembly or linear actuator 114. In embodiments, a center support assembly 107 may also comprise a motor control PCB which may have a second motor controller 122 mounted and/or installed thereon. In embodiments, an upper assembly 112 may be coupled or connected to a lower assembly 113 of the center support assembly 107 via a second gearbox assembly 113. In embodiments, a second gearbox assembly 113 and a second motor 121 connected thereto, may be connected to a lower assembly 113. In embodiments, an output shaft of a second gearbox assembly 114 may be connected to an upper assembly 112. In embodiments, as a second motor 121 operates and/or rotates, a second gearbox assembly 114 rotates an output shaft which causes an upper assembly 112 to rotate (either upwards or downwards) at a right angle from, or with respect to, a lower assembly 113. In embodiments, rotation of an output shaft which causes an upper assembly 112 to rotate with respect to a lower assembly may occur automatically in response to signals from a processor, controller and/or a component in a computing device (integrated within the umbrella and/or received from an external and/or separate computing device).

In embodiments utilizing a linear actuator as a hinging assembly 114, a steel rod may be coupled to an upper assembly 112 and/or a lower assembly 113 which causes a free hinging between an upper assembly 112 and a lower assembly 113. In embodiments, a linear actuator 114 may be coupled, connected, and/or attached to an upper assembly 112 and/or a lower assembly 113. In embodiments, as a second motor 121 operates and/or rotates a steel rod, an upper assembly 112 moves in an upward or downward direction with respect to a hinged connection (or hinging assembly) 114. In embodiments, a direction of movement is illustrated by reference number 160 in FIG. 1B. In embodiments, a direction of movement may be limited to approximately a right angle (e.g., approximately 90 degrees). In embodiments, an upper assembly 112 may move from a position where it is an extension of a lower assembly 113 (e.g., forming a vertical center support assembly 107) to a position wherein an upper assembly 112 is at a right angle from a lower assembly 113 (and also approximately parallel to a ground surface). In embodiments, movement may be limited by a right angle gearbox or right angle gearbox assembly 114. In embodiments, an upper assembly 112 and a lower assembly 113 may be perpendicular to a ground surface in one position (as is shown in FIG. 1A), but may move (as is shown by reference number 160) to track a solar light source, e.g., sun, (depending on location and time of day) so that an upper assembly 112 moves from a perpendicular position with respect to a ground surface to an angular position with respect to a ground surface and/or an angular position with respect to a lower assembly 113. In embodiments, an upper assembly tracking sun movement between a vertical location (top of sky) and a horizontal location (horizon) may depend on time and location. Tracking of a solar light source provides a benefit, as compared to prior art umbrellas, of automatically orienting a shading object or umbrella to positions of a sun in the sky (e.g., directly overhead, on a horizon as during sunrise and/or sunset), which may occur automatically.

Figure 1C:
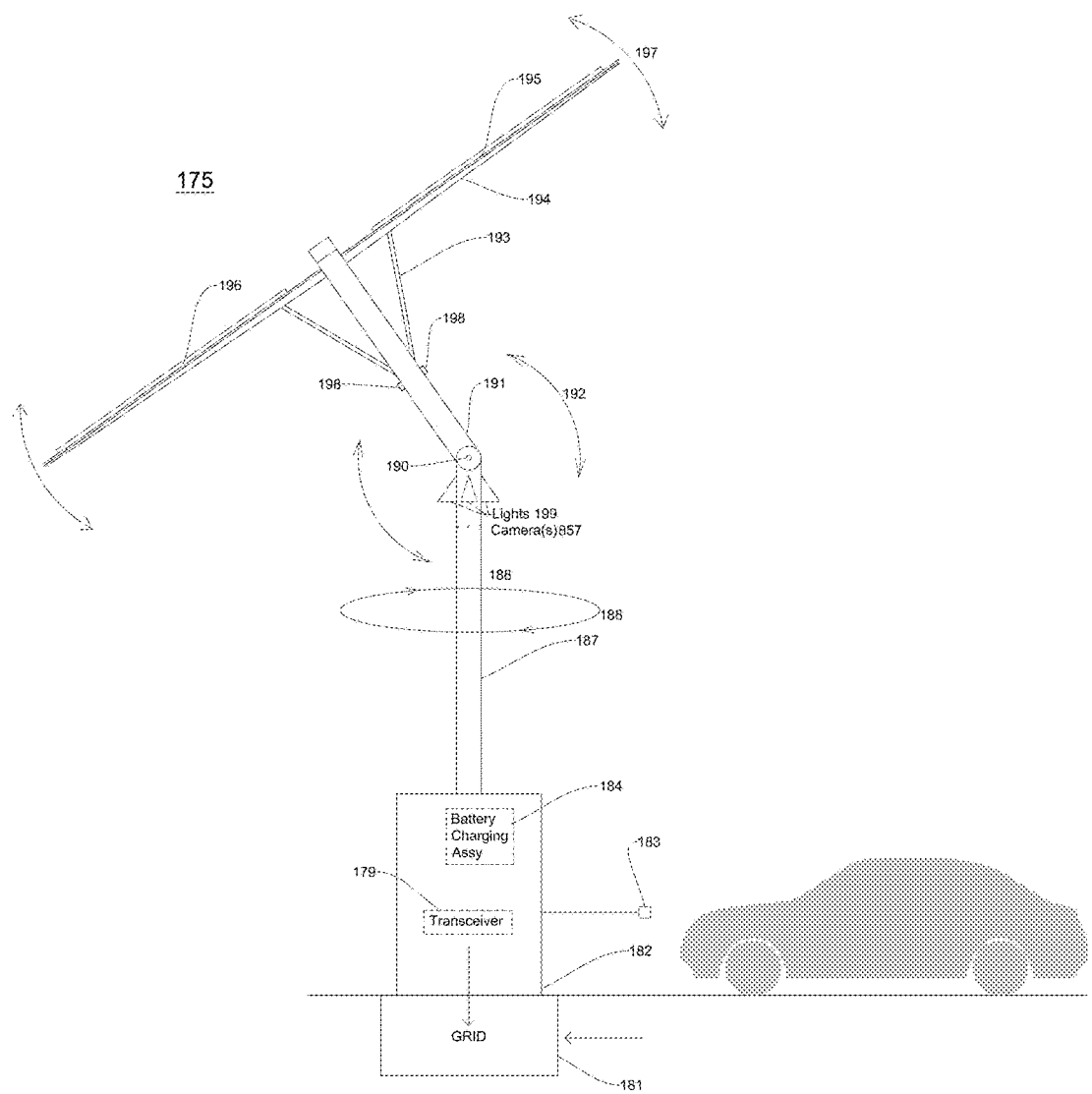
FIGS. 1C and 1D illustrate intelligent shading charging systems according to embodiments.

FIG. 1C illustrates an intelligent shading charging system according to embodiments. In embodiments, an intelligent shading charging system provides shade to a surrounding area, coverts solar energy to solar power, and charges a rechargeable battery, and/or provides power to a rechargeable power supply in an electric vehicle. In embodiments, an intelligent shading charging system 175 may comprise a rechargeable battery connection interface (not shown), a housing and/or enclosure 182 including a rechargeable battery 184 and/or a transceiver 179, a lower support assembly 187, cameras 857, which may be described in detail below, a hinging assembly or mechanism 190, and an upper support assembly 191. In embodiments, an intelligent shading charging system 175 further comprises a base assembly (not shown). In embodiments, an intelligent shading charging system 175 may comprise one or more arm support assemblies 193, one or more arms and/or blades 194 and a shading fabric 195. In embodiments, a shading fabric 195, arms 194, and/or arm support assemblies 193 may have one or more solar cells and/or arrays 196 attached thereto, integrated therein, and/or placed thereon. In embodiments, many movements of an intelligent shading charging system may be automated and/or occur automatically. In embodiments, an intelligent shading charging system 175 may be connected and/or coupled to a power delivery system (e.g., a power grid or a power mains) 181.

In embodiments, an automated intelligent shading charging assembly or system may comprise an interface assembly, a rechargeable apparatus (e.g., a rechargeable battery, a base assembly (not shown)) 184, a charging port and/or interface 183 for an electric vehicle, a lower support assembly 187, an upper support assembly 191, a hinging assembly and/or gearbox assembly 190, one or more arm support assemblies 193, one or more arms/blades 194, and/or a shading fabric 195. In embodiments, a lower support assembly 187 (and a coupled and/or connected hinging assembly 190, upper support assembly 193, one or more arm support assemblies 193, and/or arms/blades 194) may also rotate with respect to a housing and/or enclosure 182 around a vertical axis, as is illustrated by reference number 188 in FIG. 1C. In embodiments, an upper support assembly 191 may rotate up to a right angle (e.g., 90 degrees) with respect to a lower support assembly 187 of the center via a gearbox or hinging mechanism 190. In embodiments, one or more arm support assemblies 193 may deploy and/or extend from an upper support assembly 191 to open an intelligent shading charging system 175. In embodiments, one or more detachable arms/blades 194 may be attached or coupled to one or more arm support assemblies 193. In embodiments, a detachable shading fabric 195 may be attached or coupled to one or more arms/blades 194. In embodiments, a rotation of a lower support assembly 187 with respect to an enclosure 182 around a vertical axis, a rotation of an upper support assembly 191 with respect to a lower support assembly 187, and/or deployment/retraction of one or more arm support assemblies 193 may occur or be initiated in response to signals from a processor, controller and/or a component in a computing device (integrated within the umbrella and/or received from an external and/or separate computing device).

In embodiments, a housing/enclosure 182 may comprise rechargeable battery 184, an electric vehicle charging port 183, a transceiver 179, and/or a charging interface may rest or be inserted into a ground surface in an outdoor environment. In embodiments, a ground surface may be a floor, a patio, grass, sand, cement, an outdoor plaza, a parking garage surface, or other outdoor environment surfaces. In embodiments, a rechargeable battery interface may be integrated into a ground surface and a rechargeable battery 184 (or an enclosure or housing including a rechargeable battery) may rest on a ground surface.

In embodiments, a housing and/or enclosure 182 may comprise a rechargeable battery 183, a charging port 183, a wireless transceiver 179 and/or a base assembly. In embodiments, a rechargeable battery may be enclosed in a housing and/or enclosure 182. In embodiments, a base assembly may be enclosed in a housing and/or enclosure 182. In embodiments, a housing and/or enclosure 182 may be comprised of a cement, wood, metal, stainless steel, and/or hard plastic material.

In embodiments, a lower support assembly 187 may comprise one or more first lighting assemblies 199. In embodiments, one or more first light assemblies 199 may be integrated into a lower support assembly 187. In embodiments, one or more first light assemblies 199 may be connected, fastened, adhered, coupled, and/or attached to a lower support assembly 187. In embodiments, one or more light assemblies 199 may direct light downward towards a housing and/or enclosure 182 as well as an area surrounding an intelligent shading charging system 175. This feature allows an intelligent shading charging system to be utilized even at night or in a dark environment in a public environment and not utilize power from an electrical grid allowing electric vehicle users availability to recharge their batteries. In alternate embodiments, one or more first lighting assemblies 199 may be installed in an upper support assembly 191 and/or a shading fabric 196.

In embodiments, an intelligent shading charging system may comprise a second lighting subsystem 198. In embodiments, an intelligent shading charging system upper support assembly 191 may comprise a second lighting subsystem 198 integrated therein and/or installed and/or mounted thereon. In embodiments, a second lighting subsystem 198 may be connected, fastened, adhered, coupled, and/or attached to an upper support assembly 191. In embodiments, a second lighting subsystem 198 may comprise a plurality of LED lights. In embodiments, a second lighting subsystem 198 may be integrated into and/or attached to arm support assemblies 193. In embodiments, a second lighting subsystem 198 may direct light in a downward manner directly towards or at a certain angle to a ground surface, and/or where a charging electric vehicle is located. In embodiments, a second lighting subsystem 198 may direct light beams outward (e.g., in a horizontal direction) from an upper support assembly 191. In embodiments, for example, a second lighting subsystem 198 may direct light at a 90 degree angle from an upper support assembly 191 vertical axis. In embodiments, a second lighting subsystem 198 (e.g., one or more LED lights) may be installed in a swiveling assembly and the second lighting subsystem 198 may transmit and/or direct light (or light beams) at an angle of 5 to 185 degrees from an intelligent upper support vertical axis. In embodiments, one or more LED lights in a second lighting subsystem 198 may be directed to shine lines in an upward direction (e.g., more vertical direction) towards arms/blades 194 and/or a shading fabric 195 of an intelligent shading charging system. In embodiments, a bottom surface of a shading fabric 195, arms 194 and/or arm support assemblies 193, may reflect light beams from one or more LED lights of a second lighting subsystem 198 back to a surrounding area of an intelligent shading charging system. In an embodiment, a shading fabric 195, arms 194 and/or arm support assemblies 193 may have a reflective bottom surface to assist in reflecting light from the LED lights back to a shading area. In alternate embodiments, a second lighting subsystem 198 may be installed in or attached to a lower support assembly 187 and/or in a shading fabric 195. In embodiments, a first lighting subsystem 199 and a second lighting subsystem 198 may be controlled independently by a controller or processor in an intelligent shading object, umbrella and/or shading charging system. In embodiments, a controller and/or processor and/or a component in a computing device (integrated within the umbrella and/or received from an external and/or separate computing device) may automatically communicate a signal to a first lighting system 199 and/or a second lighting system and/or operation may be controlled automatically.

Figure 1D:
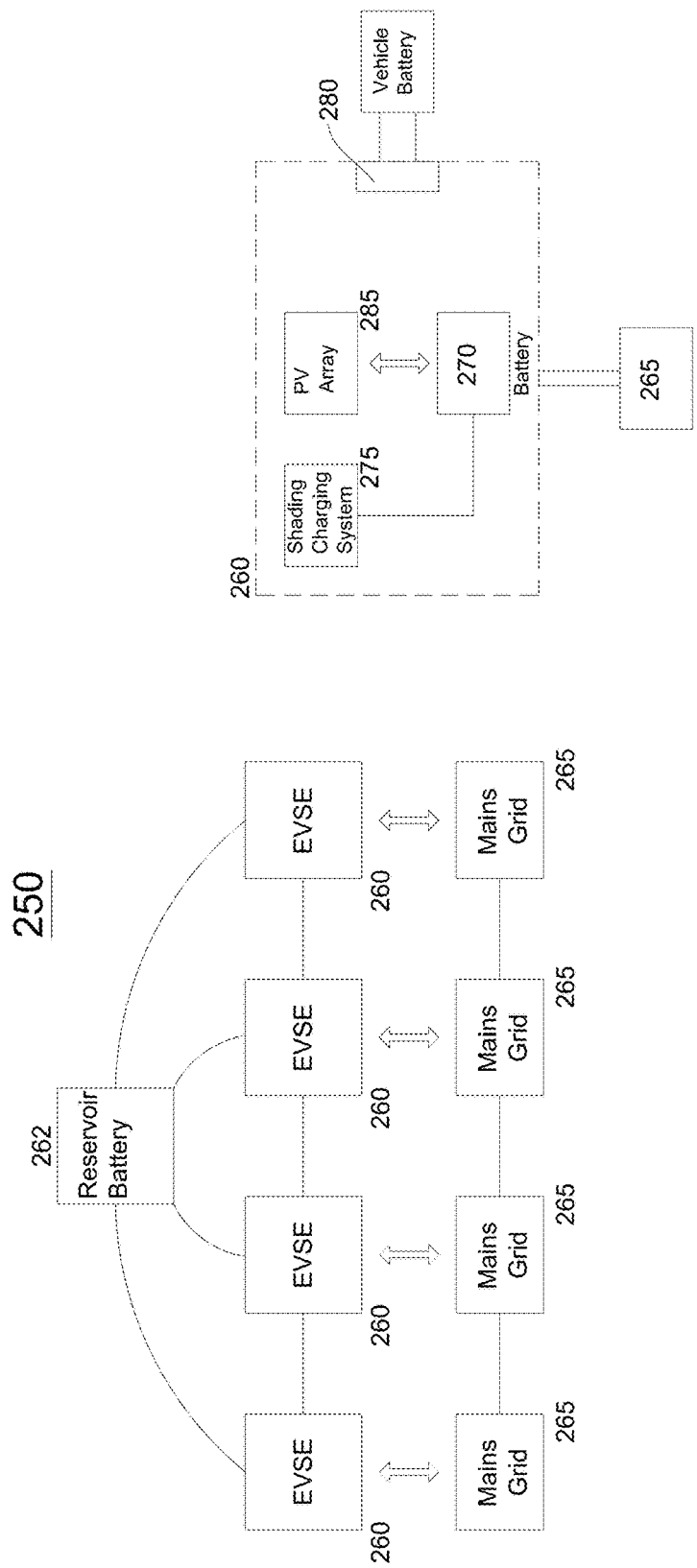

FIG. 1D illustrates a power charging station 250 comprising one or more automated intelligent shading charging systems installed in an outdoor or indoor environment according to embodiments. In embodiments, a power charging station 250 may comprise one or more intelligent shading charging systems 260 (or electric vehicle supply equipment (EVSE)) and one or more reservoir batteries 262 connected, attached and/or coupled to a power supply system 265 (e.g., a power mains grid). In embodiments, one or more intelligent shading charging systems 260 may comprise a rechargeable apparatus 270 (e.g., a rechargeable battery), an intelligent shading charging assembly or system 275 and a solar power system 285 (e.g., a photovoltaic (PV) array or a solar power array). In embodiments, an intelligent shading charging assembly or system 275 may be portable and/or detachable from an enclosure and/or housing 182 including a rechargeable apparatus 270 (e.g., rechargeable battery). In embodiments, an intelligent shading charging assembly or system 275 may be portable and/or detachable from a base assembly, which is coupled, connected, attached in a housing 182, which may also include a rechargeable apparatus 270 (battery).

As shown in FIG. 1D, an intelligent shading charging systems 260 may be coupled, connected and/or interfaced with a power supply system 265, such as an electricity mains grid 265. In embodiments, a power supply company may transfer, transmit or communicate power to an electricity mains grid 265. In embodiments, an intelligent shading charging system 260 may include a car charging interface 280. In embodiments, an electric vehicle charging interface 280 may be coupled and/or connected to vehicle battery (e.g., a rechargeable vehicle battery).

In embodiments, outdoor areas, such as a plaza, a parking garage, an open-air parking lot, an outdoor sports complex, a mall parking lot, a store parking lot, a school or university grounds and/or other large outdoor facilities may include one or more electric vehicle charging stations 250, where an electric vehicle charging station comprises a plurality of electric vehicle charging systems 260. FIG. 1D illustrates a station with four electrical vehicle charging systems connected to one another. In embodiments, an electric vehicle charging system may be referred to as an EVSE (electric vehicle supply equipment) and/or an intelligent shading charging system. In embodiments, a computing device or a plurality of computing devices may control operation of one or more intelligent shading charging systems at an electric vehicle charging station in an outdoor facility. In embodiments, the electric vehicle charging station (e.g., electric vehicle charging systems) may provide shade for electric vehicles and/or wireless communication capabilities (via wireless transceivers 179), which may be utilized to as interfaces to computing devices located in outdoor and/or indoor facilities having intelligent shading charging systems 260 and/or external computing devices.

In embodiments, for example, an operator of one or more intelligent shading charging systems 175 may charge users, electric vehicle users, or third parties for global communications network access (e.g., Internet usage access) as well as electric vehicle charging. In outdoor environments, e.g., as discussed above, this may provide an additional revenue source, (e.g., for a shopping mall). In addition, in embodiments, an intelligent shading charging system may comprise one or more cameras 857. In embodiments, cameras may provide images, videos and/or sounds of an outdoor area surrounding one or more intelligent shading charging systems. Therefore, an operator and/or user may also charge third parties for capturing and communicating images, videos, and/or sounds to third parties. Including such features on shading objects, intelligent umbrellas, and intelligent shading charging systems are a marked improvement for existing outdoor locations such as shopping parking lots, parking lots, outdoor sporting locations and event locations, which generally do not provide wireless communication capabilities, image/video/sound capture, and/or electric vehicle recharging capabilities alone and/or in combination.

In embodiments, an intelligent shading charging system 260, when offline (e.g., not providing power to an electric vehicle) may feed and/or transfer power to a power supply system, such as a mains power grid 265. In embodiments, an intelligent shading charging system may transfer up to 2, 4, 6 or 8 kilowatt hours of power to a mains power grid (e.g., becoming an energy source and/or provider). In embodiments, an electric vehicle charging station 250 may generate revenue by selling excess power back to the power company. In embodiments, current owners of outdoor facilities (e.g., parking lots, building plazas, athletic and/or event fields) having EVSEs have to pay a power company for power utilized to charge electric vehicle(s) (e.g., $100 a month/$1, 200 a year or $200 a month or $2,400 a year). However, because an intelligent shading charging system 260 may obtain power from a solar energy source, like the sun, (e.g., converts solar energy into solar power), recharging an electric vehicle's battery may not cost an owner of an intelligent shading charging system 260 and/or station 250 anything or a minimal amount because the power is self-generating and there is little or no need to obtain power from a mains power grid 265. Thus, the intelligent shading charging system 260 (and/or power station 250) may multiply revenue opportunities if an electric vehicle charging station owner has a plurality of intelligent shading charging systems at a location (any of the outdoor locations listed above).

In embodiments, an intelligent shading charging system may charge an electric vehicle in two, four and/or eight hours if an electric vehicle arrives with little or no charge/power in its rechargeable battery. In embodiments, if one intelligent shading charging system does not have enough power in its rechargeable battery 184 to charge an electric vehicle connected to its charging port 183, a rechargeable battery in another intelligent shading charging system 260 at the electric vehicle charging station 250 (such as the one illustrated in FIG. 1D) may provide power to the rechargeable battery in the initial intelligent shading charging system. In embodiments, in an electric vehicle charging station, one or more intelligent shading charging systems 260 (and thus one or more rechargeable batteries) may be connected in series with a capability of providing backup power for other intelligent shading charging systems to power electric vehicles connected to the intelligent shading charging systems. In embodiments, a reservoir battery (and/or reservoir charging assembly) 262 may be charged by and/or provide power to connected and/or coupled shading charging systems 260. In embodiments, a reservoir battery may be a rechargeable battery, a capacitor or similar rechargeable assemblies.

In embodiments, an intelligent shading charging system 260 may comprise a power conversion subsystem or a power converter. In embodiments, a power conversion subsystem may receive power from a power supply system 265 and may output DC power to a rechargeable battery 270. In embodiments, a power conversion subsystem may comprise an AC-to-DC converter, a DC-to-DC converter and/or regulator and a digital control system. In embodiments, an AC-to-DC converter may convert AC power from an electrical grid to DC power. In embodiments, converted power from the AC-to-DC converter may be regulated by a DC-to-DC converter. The power output from the DC-to-DC converter may be transferred or transmitted to a rechargeable battery 270. In embodiments, a digital control system may controls operations of a DC-to-DC converter and an AC-to-DC converter.

Figure 1E:
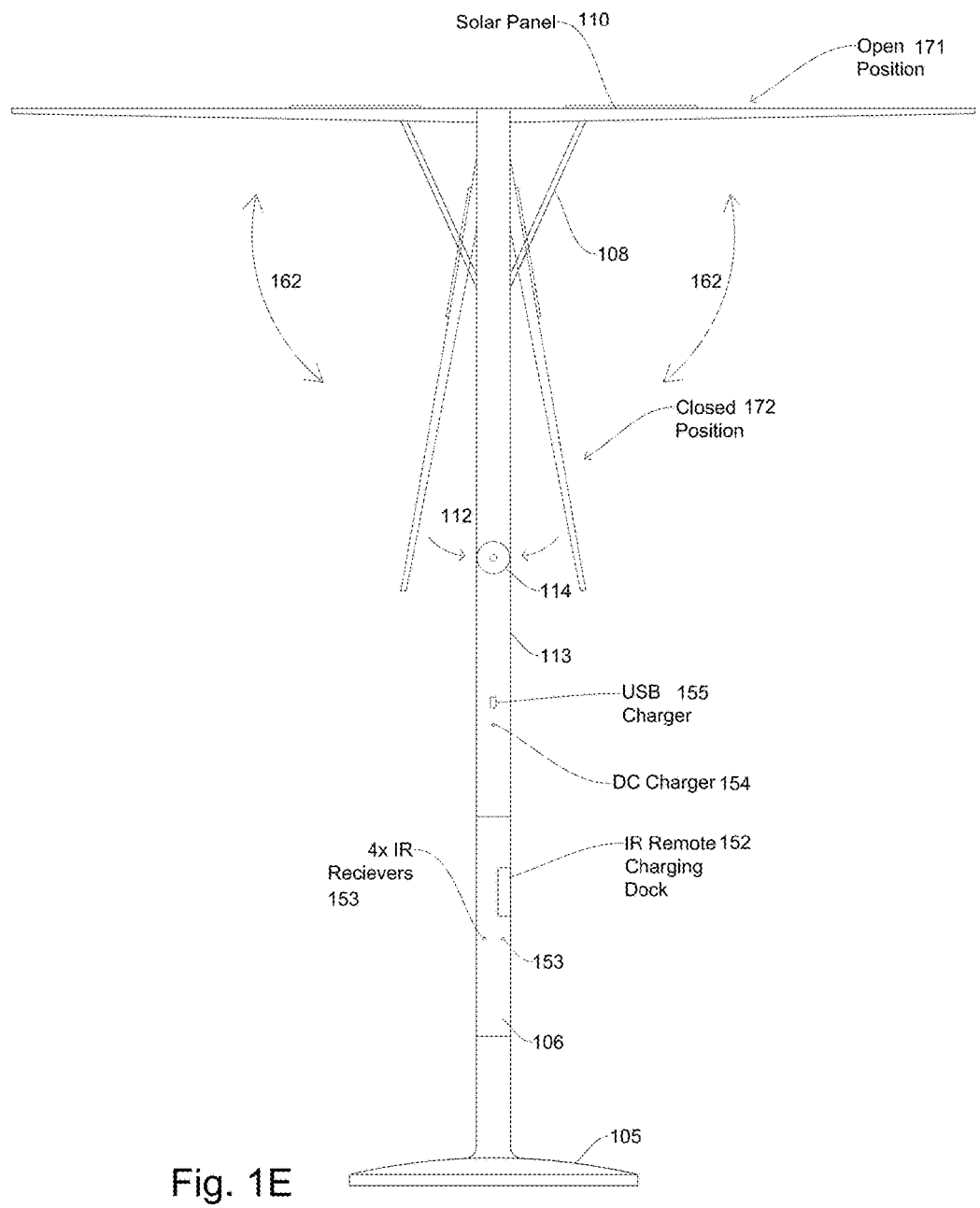
FIG. 1E illustrates a remote-controlled shading object or umbrella according to embodiments.

FIG. 1E illustrates a remote-controlled shading object or umbrella according to embodiments. In embodiments, a shading object or umbrella 151 comprises a base assembly 105, a stem assembly 106, a lower support assembly 113, an upper support assembly 112, a hinging assembly 114, one or more arm support assemblies 108, one or more arms 109, and/or one or more solar panels 110. In embodiments, shading object or umbrella 151 may comprise one or more infrared receivers 153, an infrared remote charging dock 152, a DC charger 155 and/or an universal serial bus (USB) charger 155.

Figure 1F:
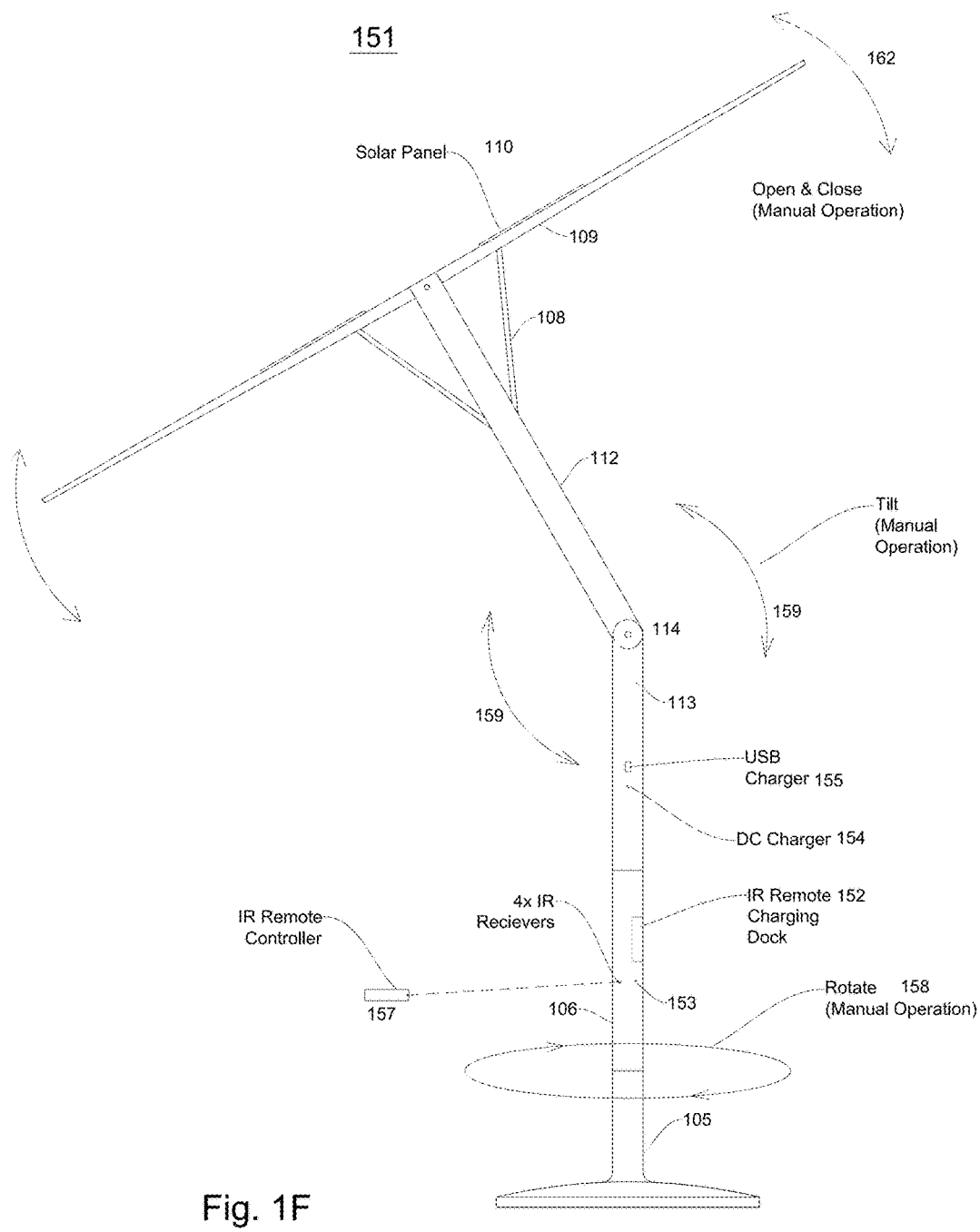
FIG. 1F illustrates a remote-controlled shading object or umbrella after an upper support assembly has moved according to embodiments.
Figure 1G:
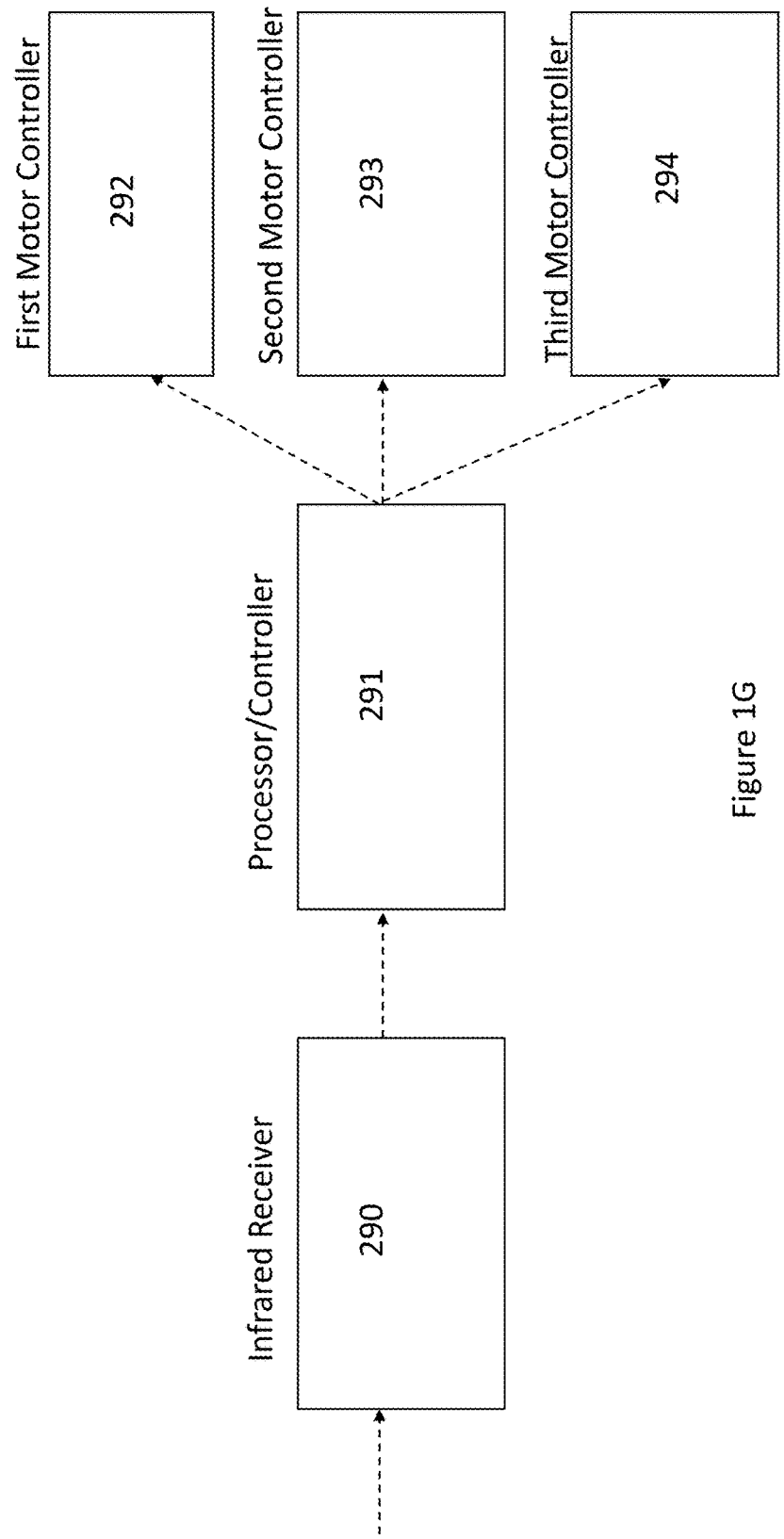
FIG. 1G illustrates a block diagram of signal control in a remote-controlled shading object according to embodiments.

FIG. 1E illustrates a remote-controlled shading object or umbrella according to embodiments. FIG. 1F illustrates a remote-controlled shading object or umbrella after an upper support assembly has moved according to embodiments. FIG. 1G illustrates a block diagram of remote control operation of a shading object or intelligent umbrella according to embodiments. In embodiments, a shading object or umbrella 151 comprises a base assembly 105, a stem assembly 106, a lower support assembly 113, an upper support assembly 112, a hinging assembly 114, one or more arm support assemblies 108, one or more arms 109, and/or one or more solar panels 110. In embodiments, a shading object or umbrella 151 may comprise one or more infrared receivers 153, an infrared remote charging dock 152, a DC charger 155 and/or a universal serial bus (USB) charger 155.

In embodiments, one or more receivers 153 (e.g., infrared receivers) may be positioned around, attached to and/or integrated into a stem assembly 106. In embodiments, one or more infrared receivers may be located and/or positioned elsewhere (e.g., a central support assembly, a base assembly 105, one or more arm support assemblies 108 and/or one or more arms/blades 109). In embodiments, a remote control 157 may transmit and/or communicate commands, messages, instructions and/or signals at infrared frequencies, which may need line of sight in order to be received. Accordingly, in embodiments, by having more than one receiver 153 and by positioning one or more receivers 153 at various locations around a shading object and/or automated, intelligent umbrella, remote device commands may be received from different positions and/or angles. In embodiments, a remote control and one or more receivers (e.g., infrared receivers) 153 may communicate utilize infrared frequencies utilizing a variety of protocols, either standardized and/or proprietary. However, in other embodiments, a remote control may communicate with one or more receivers 153 utilizing other frequencies and/or spectrums (e.g., ultraviolet, visible, microwave and/or radio) and/or utilizing a variety of wireless communication protocols (e.g., Zigbee, Bluetooth, RC-5, SIRCS, RC-6, R-Step, NTC101, etc.). Operation of a remote control device, a remote control receiver 153 and a shading object, intelligent umbrella and/or intelligent shading charging system may be described in detail in application Ser. No. 15/225,838, filed Aug. 2, 2016, entitled "Remote Control of Shading Object and/or Intelligent Umbrella, the disclosure of which is hereby incorporated by reference.

Figure 1H:
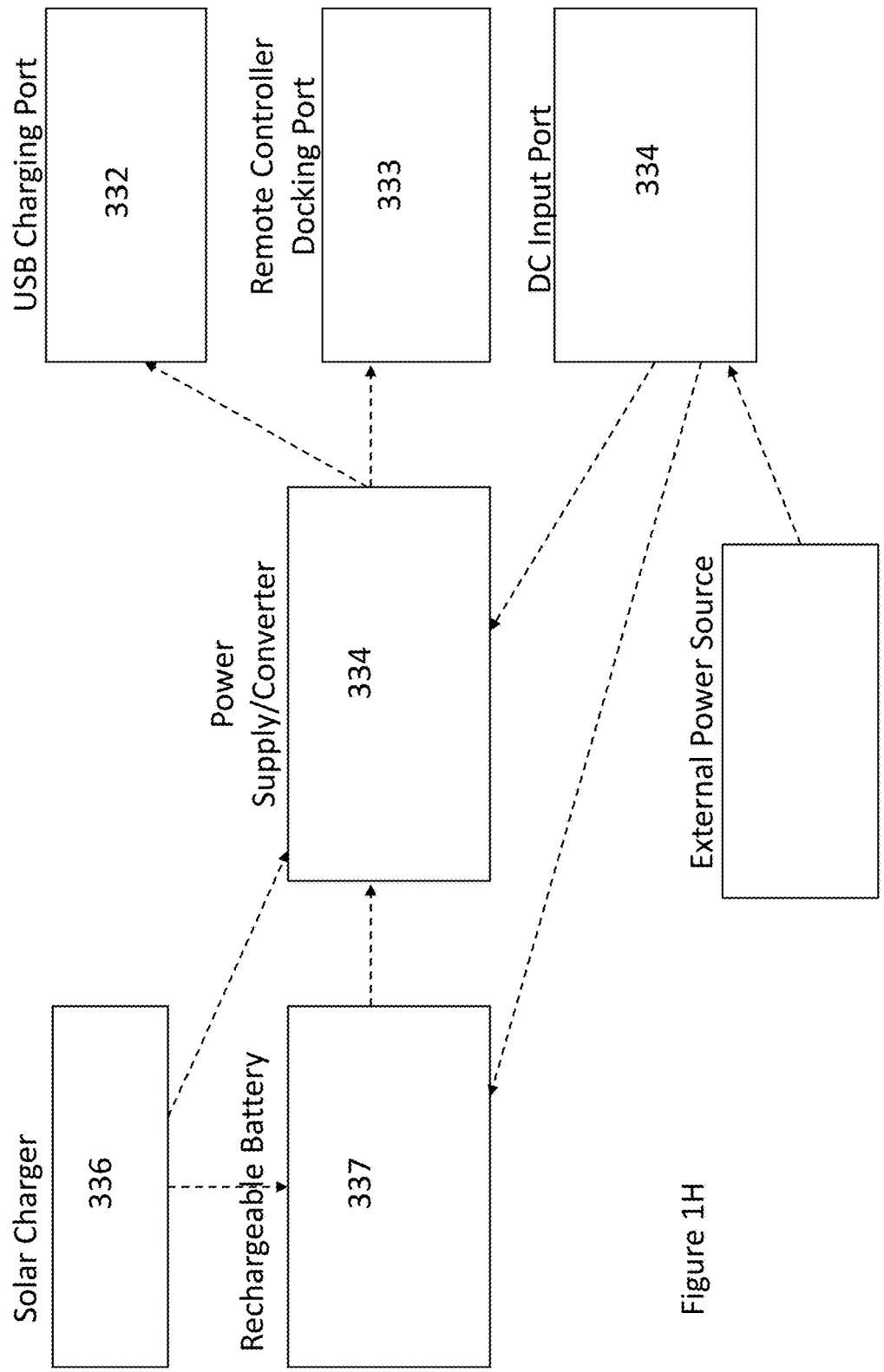
FIG. 1H illustrates a block diagram of power in a remote-controlled shading object according to embodiments.

In embodiments, a shading object and/or shading umbrella may comprise one or more charging ports and/or outlets. FIG. 1H illustrates an accessory power system for an intelligent umbrella and/or shading objects according to embodiments. In embodiments, for example, a shading object and/or shading umbrella may comprise a DC input port 331, a USB charging port 332 and/or a remote control docking port 333. In embodiments, a shading object and/or intelligent umbrella may comprise a power supply and/or converter 334 to supply power to a USB charging port 332 and/or a remote control docking port 333. For example, a solar power supply system 336 may support power to a power supply and/or converter 334. In embodiments, for example, a solar power supply 336 may comprise solar panels, a power converter, a solar power charger 336 and/or a rechargeable battery 337. In embodiments, a rechargeable battery 337 may supply and/or provide power to the power supply and/or converter 334. In embodiments, an external power source (e.g., an AC adapter, a power mains, a DC adapter) may also provide and/or supply power to the power supply and/or converter 334. In embodiments, the external power source may supply and/or provide power to a rechargeable battery and the rechargeable battery may provide power to the power supply and/or converter 334.

In embodiments, a remote device (e.g., remote control) may be a physically separate and unique device designed for operating shading objects and may include commands to operate features and functions of shading object and/or intelligent umbrella. In an embodiment, such a remote device (e.g., remote control) may have buttons or selectable items and/or icons for rotating a shading object and/or umbrella, elevating a shading object and/or umbrella, deploying and/or retracting arm support assemblies and arms, or placing an umbrella and/or shading object into an emergency shutdown mode. In embodiments, a remote device 157 (e.g., remote control) may also comprise buttons, selectable items and/or icons for operating an audio system of a shading object and/or intelligent umbrella 151. In embodiments, a remote device (e.g., remote control) may also comprise buttons, selectable items and/or icons for operating a computing device and/or one or more lighting systems (e.g., lighting assemblies and/or LED lights) of a shading object and/or intelligent umbrella 151. In embodiments, an existing remote device (e.g., remote control) may be programmed with codes and/or software to enable and/or allow control of a shading object and/or intelligent umbrella (such as the features and/or functions described above). For example, an existing satellite or cable television remote control, audio receiver remote control, wireless communication device, and/or portable computing device may be programmed with computer-readable instructions that are executed by a processor to create codes and/or signals that are communicated to a receiver/transceiver 153 in a shading object and/or intelligent umbrella 151 to perform specified features and/or functions. In embodiments, for example, a television remote control may be programmed to emit codes and/or signals to control and/or operating a shading object and/or intelligent umbrella. In embodiments, other computing devices (e.g., a cell phone, a wireless communication device, laptop computer, tablet computer, personal computer, desktop computer and/or other electronic devices (game consoles)) may have computer-readable instructions stored therein which are loaded into a memory of the computing device and executed by a processor to operate a shading object and/or intelligent umbrella. In embodiments, for example, a mobile application may be installed on mobile phone for remotely controlling a shading object and/or intelligent umbrella. In embodiments, for example, software may be installed on a laptop computer and/or desktop computer for remotely controlling a shading object and/or intelligent umbrella. In these embodiments, icons may be selected and/or voice commands may be processed by a software application to remotely control a shading object and/or intelligent umbrella 151.

Figure 3B:
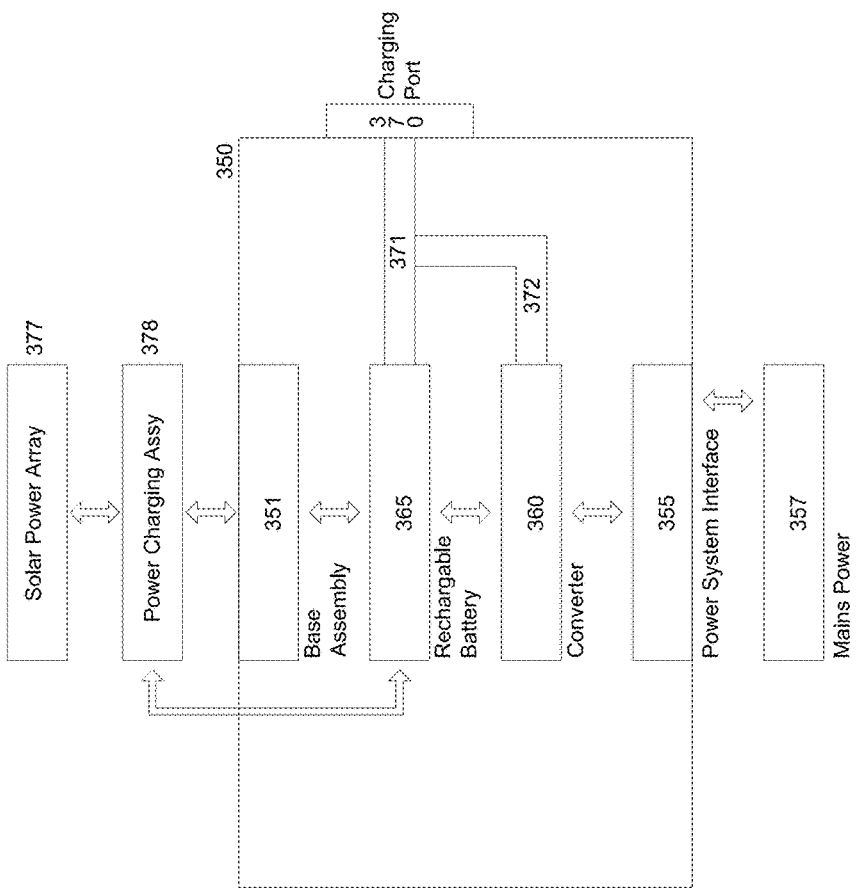
FIG. 3B illustrates a housing and/or enclosure according to embodiments.

FIG. 3B illustrates a housing and/or enclosure of an intelligent shading charging system according to embodiments. A housing and/or enclosure of an intelligent shading charging system is described in detail in non-provisional patent application Ser. No. 15/212,173, filed Jul. 15, 2016, entitled "Intelligent Charging Shading Systems," the disclosure of which is hereby incorporated by reference.

Figure 4A:
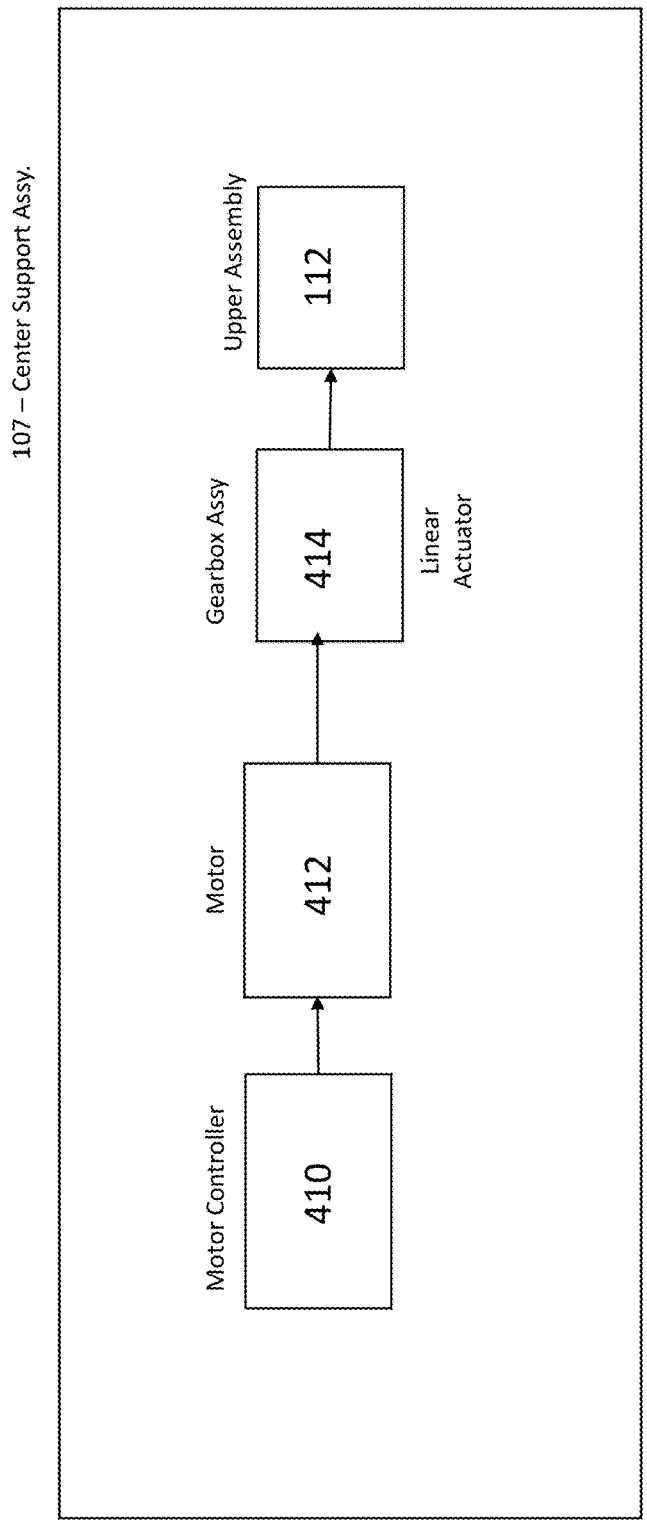
FIG. 4A illustrates a block diagram of a center support assembly motor control according to embodiments.

FIG. 4A illustrates a block diagram of a center support assembly motor control according to embodiments. A center support assembly 107 further comprises a second motor assembly, where a second motor assembly comprises a second motor controller 410 (which may or may not be installed on a shading object movement control PCB) and a second motor 412. In embodiments, a second controller 410 may receive commands, signals, and/or instructions from a shading object movement control PCB 895 (see FIG. 8), and/or a computing device, to control operation of a second motor 412. In embodiments, a second controller 410 may generate commands and/or signals causing a second motor 412 to drive its output shaft and engage a gearbox assembly 414 (or linear actuator), which in turn causes an upper assembly 112 of a center support assembly 107 to rotate and/or move with respect to a lower assembly 113. In embodiments, a second motor or actuator 412 may drive a hinging assembly 414 to move with respect to a stem assembly 106. In embodiments, an upper assembly 112 may move up to 90 degrees (or at a right angle) with respect to a lower assembly 113. In embodiments, a second motor or actuator 412 may comprise a pneumatic motor. In other embodiments, a second motor or actuator 412 may comprise a servo motor and/or a stepper motor. In embodiments, an encoder may be utilized for feedback of position information to a second motor controller or driver 410. In embodiments, an upper assembly 112 of a center support assembly 107 may further comprise and/or house an arm support assembly 108. In embodiments, arms and/or blades 109 may be connected, coupled and/or attached to a center support assembly 107.

Figure 4B:
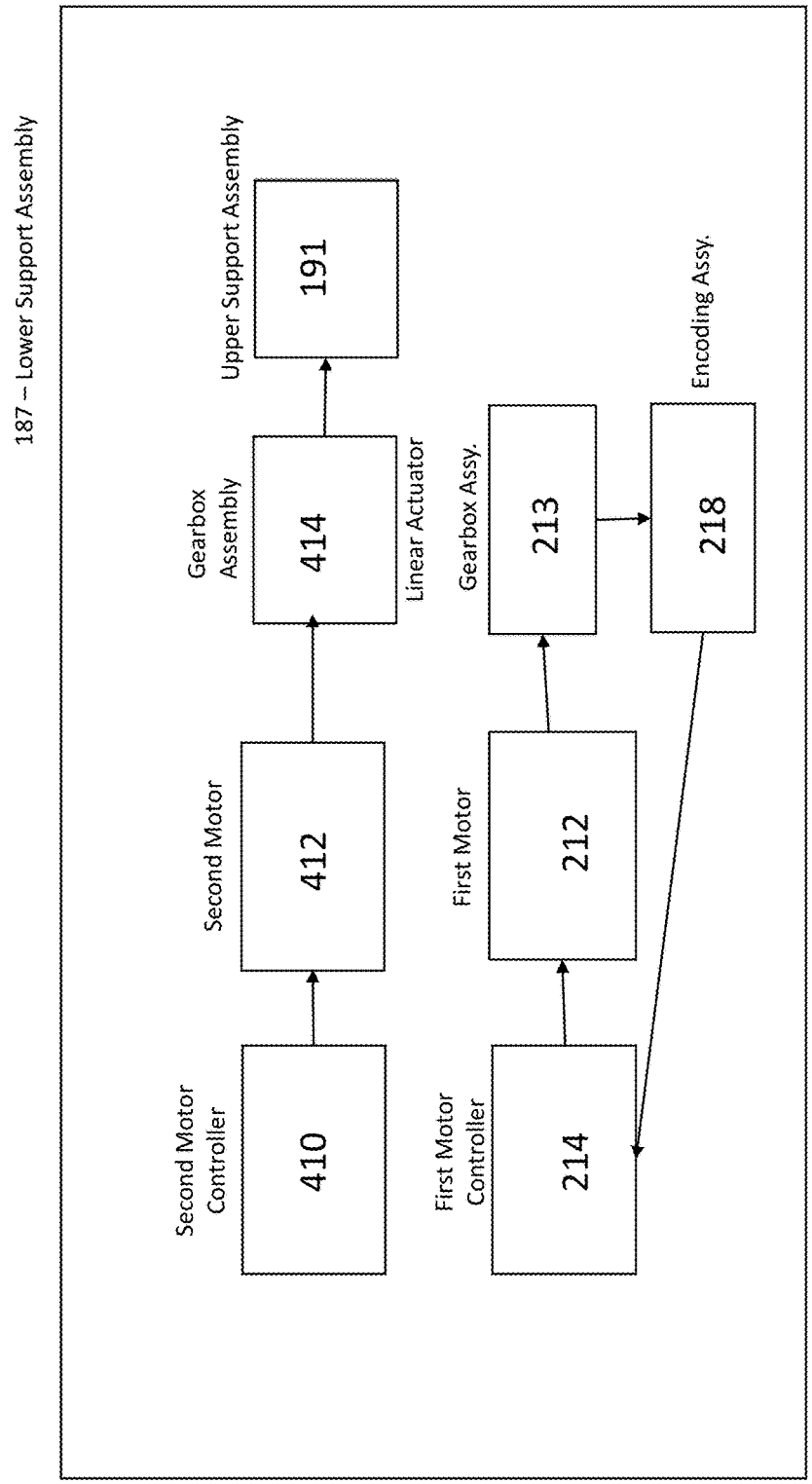
FIG. 4B illustrates a lower support motor assembly according to embodiments.

FIG. 4B illustrates a lower support motor assembly according to embodiments. In embodiments, such as illustrated in FIG. 1C, a lower 187 assembly may comprise a first motor assembly and/or a second motor assembly. In embodiments, a first motor assembly may comprise a first motor 212, a gear box assembly and/or hinging assembly 213, and/or a first motor controller 214. In embodiments, a second motor assembly may comprise a second motor 412, a second motor driver controller 410, an upper assembly 191, and a gearbox assembly 414. Operation of a first motor assembly and a second motor assembly may be initiated and/or occur automatically in response to signals from a processor, controller and/or a component in a computing device (integrated within the umbrella and/or received from an external and/or separate computing device). The first motor assembly and the second motor assembly for FIG. 1C and FIG. 4B is described in detail in non-provisional patent application Ser. No. 15/212,173, filed Jul. 15, 2016, entitled "Intelligent Charging Shading Systems," the disclosure of which is hereby incorporated by reference.

Figure 5A:
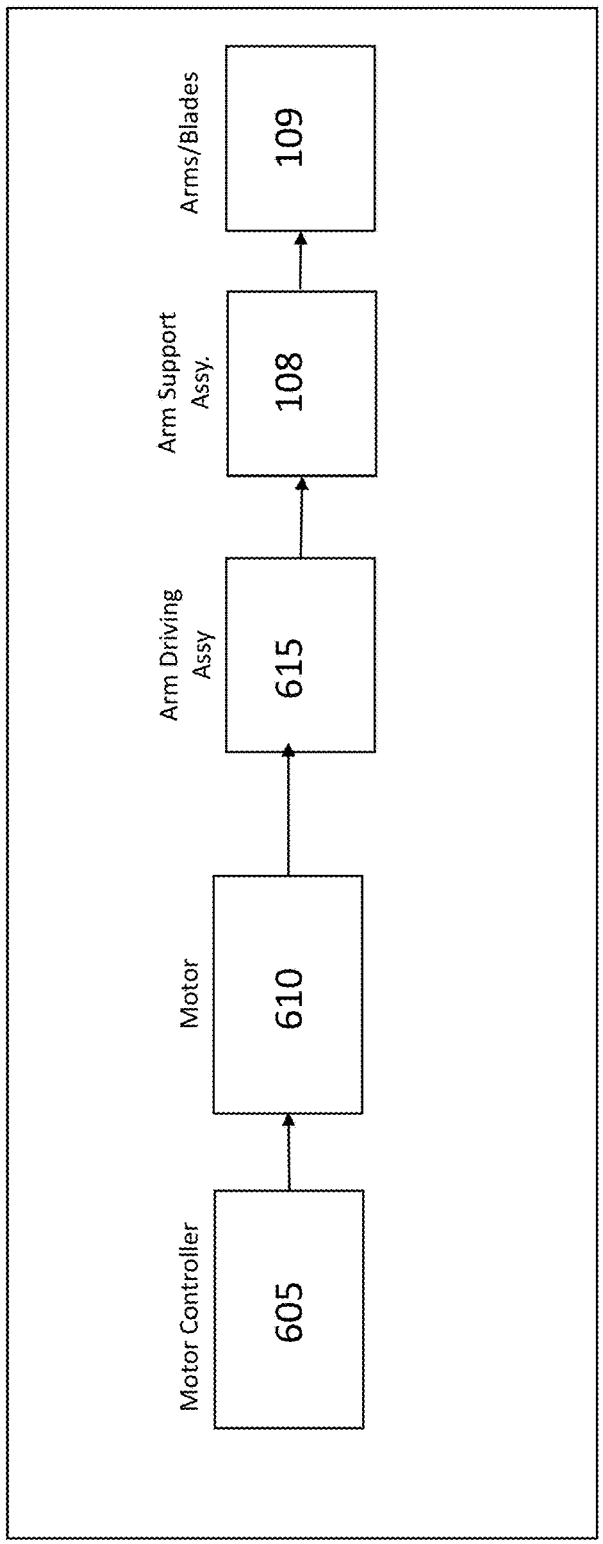
FIG. 5A illustrates a block diagram of an actuator or deployment motor in an intelligent umbrella or shading object according to embodiment.
Figure 6A:
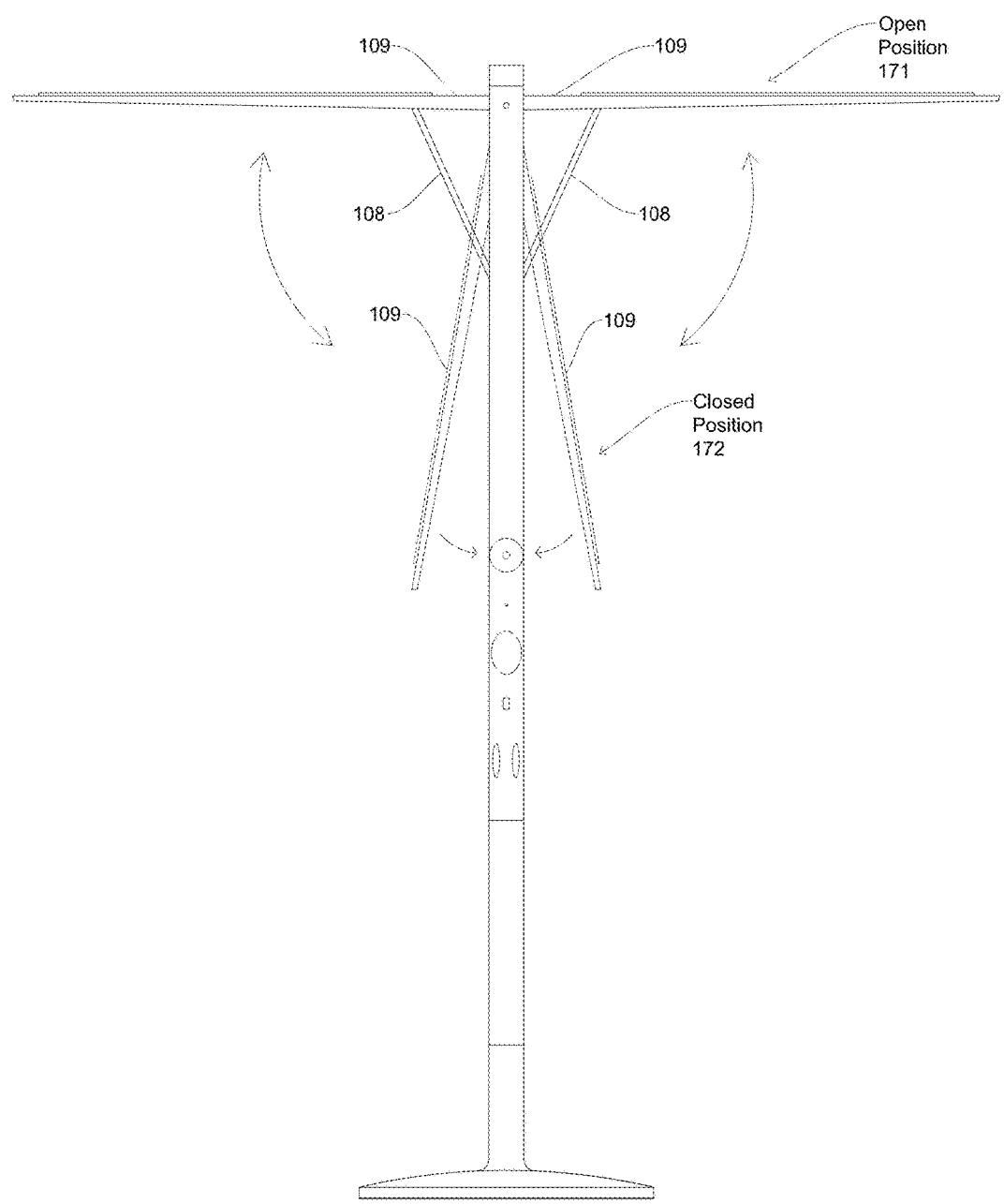
FIG. 6A illustrates a shading object or intelligent umbrella with arm support assemblies and arms/blades in an open position and a closed positions.
Figure 6B:
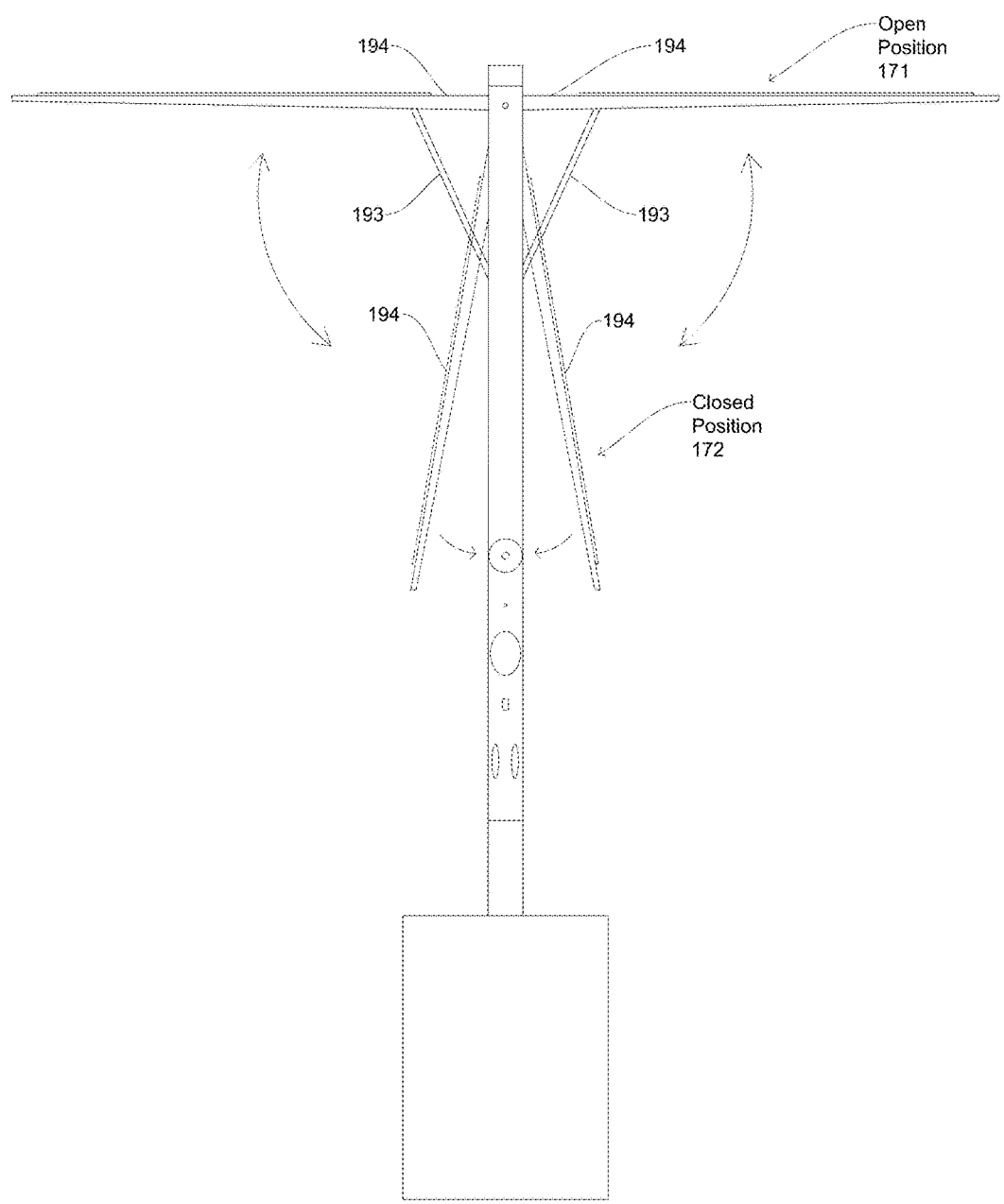
FIG. 6B illustrates an intelligent shading charging system with arm support assemblies and arms/blades in an open position and a closed position.

FIG. 5A illustrates a block diagram of shading object actuator or deployment assembly according to embodiments. In embodiments, an upper assembly 112 of a center support assembly 107 may further comprise a third motor assembly, an arm driving assembly, an arm support assembly 108 and/or arms/blades 109. In embodiments, a third motor assembly may comprise a third motor controller 605, a third motor 610, and an arm driving assembly 615. FIG. 6A illustrates a shading object with arm support assemblies 108 and arms/blades in an open position 171 and a closed position 172. FIG. 6B illustrates an intelligent shading charging system with arm support assemblies 193 and arms/blades 194 in an open position 171 and a closed position 172.

Figure 7:
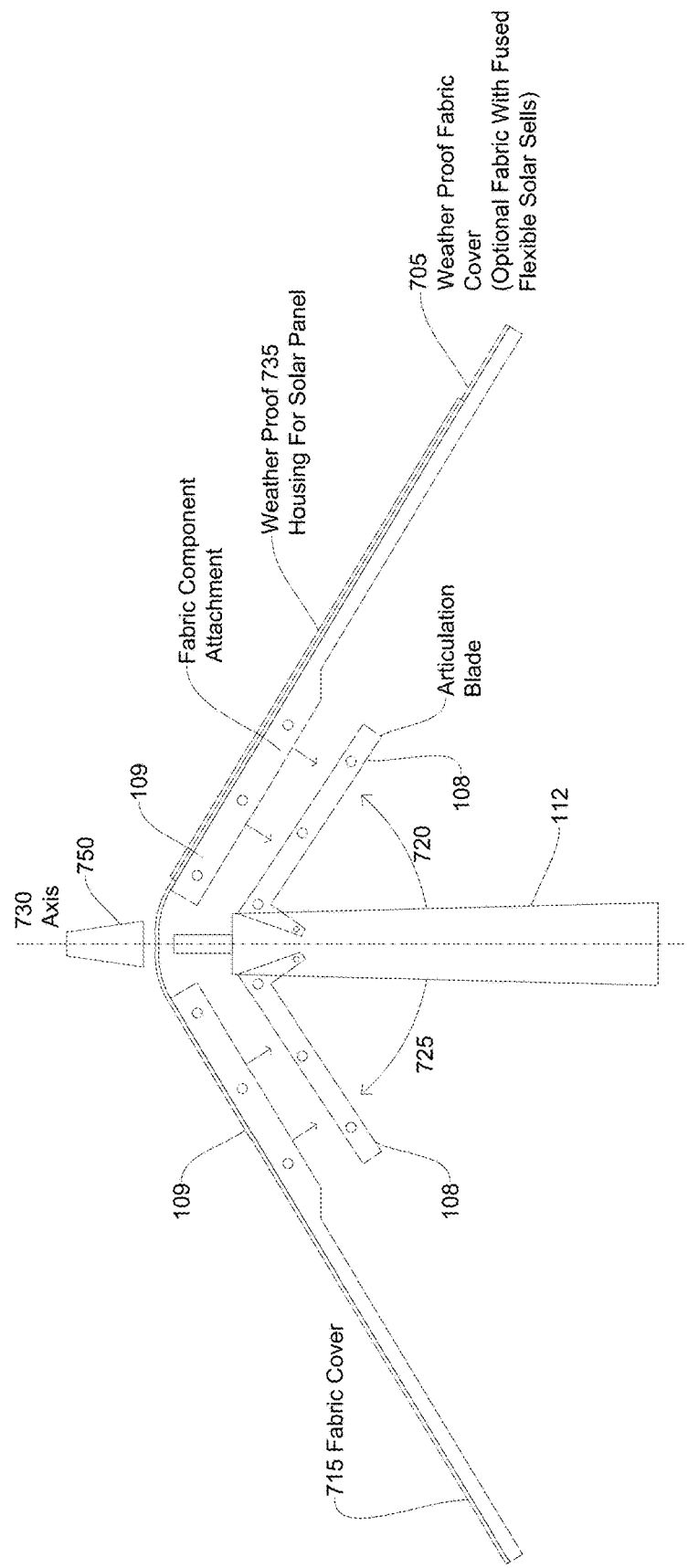
FIG. 7 illustrates assemblies to deploy arms and/or blades according to embodiments.

In embodiments, some of these assemblies may be housed in a lower assembly 113. In embodiments, a third motor controller 605, a third motor 610, an arm supporting assembly 108 and/or arm/blade 109 may be housed and/or positioned in an upper assembly 112, which may be positioned above a lower assembly 113 of a center support assembly 107. In embodiments, a third motor 610 may comprise a stator, rotor and shaft/spindle. In embodiments, a shaft/spindle may be coupled and/or connected to a rod (e.g., a threaded rod). In embodiments, an arm driving assembly 615 may comprise at least a threaded rod and a collar. In embodiments, a threaded rod may be coupled and/or connected to a collar, and a collar may have a number of slots to which linked arm supports (e.g., arm support assembly 108) are linked, coupled or connected. In embodiments, a linear actuator may be coupled in between a third motor controller 605 and arm supporting assembly 108. FIG. 7 illustrates assemblies to deploy arms and/or blades according to embodiments. In embodiments, arm supports and/or arm supporting assemblies 108 may be coupled to arms, blades or other similar devices. In embodiments, arms, blades, and/or other similar devices 109 may be detachably attached to an arm driving assembly. A shading fabric may be detachably attached to arms/blade 109 and/or arm supporting assembly 108. In an embodiment illustrated in FIG. 7, a shading object and/or umbrella may comprise an upper assembly 112 of a center support assembly 107, one or more arm support assemblies 108, one or more arms/blades 109, on or more solar panels (not shown), and a shading fabric cover 705. In embodiments, a shading fabric cover 705 may include fabric fused with flexible solar cells. In embodiments, arm support assemblies 108 (or articulating blades) may be in a rest position inside an upper assembly 112 of a center support assembly 108 (e.g., a recess or a recessed channel in an upper assembly 112). As is illustrated in FIG. 7, arm support assemblies 108 may be connected to a top end 710 (or upper section) of an upper assembly 112 of a center support assembly 107. In embodiments, arms/blades 109 may be attached, adhered, fastened, and/or connected to arm support assemblies 108 (e.g., articulation blades). As illustrated in FIG. 7, arm support assemblies 108 and/or arms/blades 109 may have holes or openings and a fastener or connector may be used to attach and/or fasten the arm support assemblies 108 to the arms/blades 109. In embodiments, arm support assemblies 108 and/or arms/blades 109 made be adhered together, fastened together, welded together, or may be snapped together to fit. In embodiments, a fabric cover 715 may be connected, adhered, and/or fastened to arms/blades 109. In embodiments, a fabric cover 715 may include integrated flexible solar panels. In embodiments, integrated flexible solar panels may be placed in a weather proof housing 735 in a fabric cover 715 and/or in a weather proof housing in arms/blades 109. In embodiments, when arm support assemblies are deployed to an open position, the arm support assemblies 108 may move in a direction as shown by reference number 720 and 725. In other words, arm support assemblies 108 (and thus the attached arms/blades 109) move at an angle with respect to a vertical axis coming out of a center support assembly 107. In embodiments, as illustrated in FIG. 7, a vertical axis is represented by reference number 730.

In embodiments, a third motor controller (or motor driver) 605 may receive commands, signals, and/or instructions from a shading object movement control PCB 895 (and/or a shading object computing device 860) to control operation of a third motor 610. In embodiments, a third motor controller 605 may generate commands and/or signals causing a third motor 610 to drive its outside shaft and engage a gearbox assembly 615 (or linear actuator or gearing assembly), which in turn causes movement of a linked arm support assemblies 108. In embodiments, a linear actuator may incorporate a motor. In embodiments, a potentiometer may act as a control device to limit how much arm support assemblies 108 deploy or move away from an upper assembly 112 of a center support assembly 107. In embodiments, for example, a potentiometer may feedback how far and/or much arm support assemblies 108 have been deployed and/or may stop deployment or movement when a predefined distance is reached (or when a full deployment distance is reached). In embodiments, a third motor 610 may comprise a pneumatic motor. In other embodiments, a third motor 610 may comprise a servo motor and/or a stepper motor.

In embodiments, a rotation of a shaft/spindle of a third motor 610 may be transmitted to a threaded rod. In embodiments, a rotation may be transmitted accordingly to a gearing ratio in order to reduce speed transferred to a threaded rod. In embodiments, a gearbox assembly (or linear actuator) may be located between an output shaft of a third motor 610 and may establish a gearing ratio in order to generate necessary torque. In embodiments, a threaded rod is rotated about its own axis and is coupled to a collar via a nut or other fastener. In embodiments, a threaded rod's rotation may cause a collar (or vertical movement assembly) to rotate and/or move in a vertical direction (e.g., in an up or down direction). A movement of a collar in a vertical direction may cause one or more linked arm support assemblies 108 to be moved outward from a shaft of a center support assembly 107 in order to deploy one or more linked arm support assemblies 108 in an open position (extend outwards and away from an upper assembly 112. Once one or more linked arm supports are extended and/or deployed, a shading fabric may be attached to arms/blades 109 and/or linked arm supports 108 of the shading system. In embodiments, a shading fabric 715 may be connected to arms/blades 109 and/or linked arm supports (support assemblies 108) before linked arm supports are deployed and/or extended. In this illustrative embodiment, deployment of one or more linked arm assemblies 108 results in stretching of a shading fabric 715 between one or more arms/blades 109 and/or linked arm support assemblies 108. In embodiments, a shading object may be ready for use to provide shade for a user in an outdoor environment. Operation of a third motor assembly may be initiated and/or occur automatically in response to signals from a processor, controller and/or a component in a computing device (integrated within the umbrella and/or received from an external and/or separate computing device).

Similarly, if a shading object is to be placed in a rest or closed position, in embodiments, a third motor 610 output shaft may be rotated in an opposite direction. In embodiments, a threaded rod may be rotated in an opposite direction (e.g., counterclockwise), and a collar (or vertical movement assembly), which may be coupled and/or connected to the threaded rod, may move in a downward direction. One or more linked arm support assemblies 108, which are linked, coupled, and/or connected to the collar on one end and blades/arms 109 on another end, will drop and/or move from an extended position to an at rest position. In embodiments, a shading object or umbrella may have a plurality of vertical movement assemblies (e.g., collars) linked separately to a plurality of arm support assembles. In embodiments, linked arms supports may not need to be extended and/or moved together. In embodiments, a separate motor may be connected to one or more linear actuators, which in turn may be linked to a corresponding arm support assembly, so that each of corresponding arm support assemblies may be moved independently.

In embodiments, the linked arm supports (or support assemblies) 108 may come to rest inside a center support assembly 107 of a shading object. In other words, the linked arm supports or linked arm support assemblies 108 may contract or come to rest into and/or inside channels of a center support assembly 107 of the shading object. In embodiments, one or more linked arm support assemblies 108 may rest or be housed in channels of an upper assembly 112 or a center support assembly 107, which provides for convenient storage of arm support assemblies. In embodiments, a shading object may comprise between one and 20 linked arm support assemblies 107 and/or arms/blades 108.

In embodiments, a shading object central support may comprise one or more shading object arm support assemblies 108 that are deployed outward from a shading object central support 107. In embodiments, shading object arms 109 may be attached and/or connected, respectively, to a shading object central support arm assembly 107. In embodiments, shading object arms/blades 109 may be detachably connected to a shading object arm support assembly 108. In embodiments, a detachable coupling may occur after shading object arms support assemblies 108 have been opened and/or deployed. In embodiments, shading object arms or blades 109 may be coupled and/or connected to shading arm support assemblies 108 and rest inside a shading object central support assembly 107 until deployment. In embodiments, shading object arms/blades may comprise any shape (e.g., rectangular, triangular, circular). In embodiments, shading object arms/blades may have openings in a shape (e.g., rectangle and/or triangle) rather than being a solid price of material. In embodiments, shading arms/blades may form a frame onto which a shading object is attached. In embodiments, a shading object central support may comprise between 1-10 shading object arm supports and 1-20 shading object blades/arms). In embodiments, one or more shading object arms may comprise fasteners and/or connectors. In embodiments, a shading fabric may be connected and/or attached to shading arm connectors and/or fasteners. In embodiments, a shading fabric 715 may be connected and/or attached to shading arms after deployment of shading arm supports. In embodiments, a shading fabric 715 may be connected and/or attached to shading arms before shading arms are connected to the shading arm support assemblies.

Figure 5B:
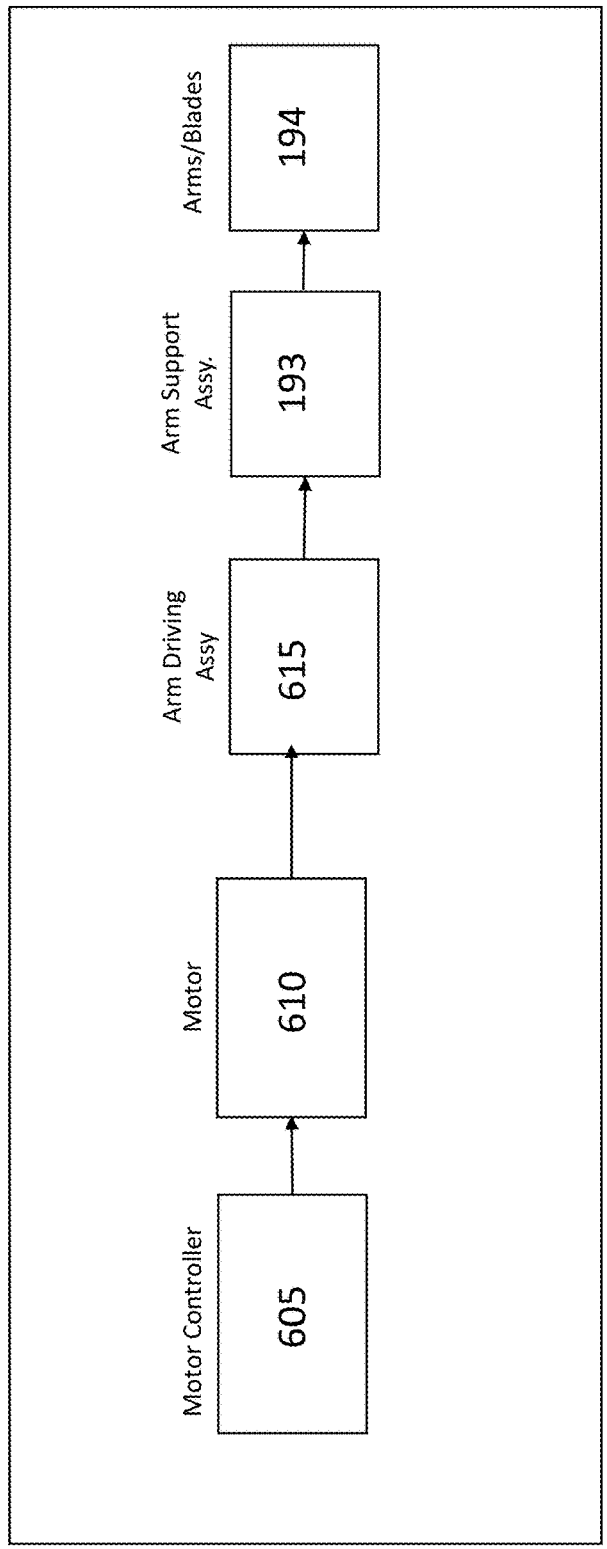
FIG. 5B illustrates a block diagram of an actuator or deployment motor in an intelligent shading charging system according to embodiments.

FIG. 5B illustrates a block diagram of shading object actuator or deployment assembly according to embodiments. In embodiments, such as illustrated in FIG. 1C, an upper support assembly 191 of an intelligent shading charging system may further comprise a third motor assembly, one or more arm support assemblies 193 and/or one or more arms/blades 194. In embodiments, a third motor assembly may comprise a third motor controller 605, a third motor 610, and an arm driving assembly 615. In embodiments, an intelligent shading charging system actuator or deployment assembly, and/or a third motor assembly is described in detail in non-provisional patent application Ser. No. 15/212, 173, filed Jul. 15, 2016, entitled "Intelligent Charging Shading Systems," the disclosure of which is hereby incorporated by reference.

Discussions herein may describe intelligent shading objects and/or intelligent umbrellas with a base assembly 105, a stem assembly 106, a center support assembly including an upper support assembly and a lower support assembly). The discussions presented herein also are applicable to the intelligent shading charging systems illustrated and/or described in the FIGS. 1C and 1D. Detailed discussions of such subject matter is in non-provisional patent application Ser. No. 15/212,173, filed Jul. 15, 2016, entitled "Intelligent Charging Shading Systems," the disclosure of which is hereby incorporated by reference.

FIG. 8 illustrates a block diagram of hardware and/or combined hardware/software assemblies in a shading object according to embodiments. In embodiments, a shading object or umbrella may not have one, more than one, or all of listed shading object components and/or assemblies. In embodiments, as is illustrated in FIG. 8, a shading object, intelligent umbrella, and/or intelligent shading charging system may comprise a telemetry printed circuit board (PCB) comprising a processor 805, a weather variable PCB comprising a processor 810, a voice recognition PCB and/or engine 815, a rechargeable battery 820, and one or more solar panels and/or solar panel arrays 825. In embodiments, a shading object, umbrella and/or shading charging system may comprise a power tracking solar charger 830, a power input or power source (e.g., AC adapter assembly) 835, a lighting assembly 870, an audio system 875 and/or a computing device 860. In embodiments, a shading object, umbrella and/or shading charging system may include an obstacle detection module 855, a motion sensor 845, a proximity sensor 840, a tilt sensor 855, a personal area network communications module or transceiver 865, a first motor controller and motor (azimuth motor and controller) 880, a second motor controller and motor (elevation motor and controller) 885, and a third motor controller and motor (an actuator motor and controller) 890. In embodiments, a weather variable PCB 810 may be coupled and/or connected to one or more air quality sensors 811, UV radiation sensors 812, a digital barometer sensor 813, a temperature sensor 814, a humidity sensor 816, and/or a wind speed sensor 817. In embodiments, a wind sensor 817 may be a thermistor. In embodiments, a telemetry PCB 805 may be coupled and/or connected to a GPS/GNSS sensor 807 and/or a digital compass 808. Although at times a shading object, intelligent umbrella and/or a shading charging system may singularly be mentioned, the disclosure herein may be implemented in any of the above-mentioned devices and/or apparatus.

In embodiments, a shading object, intelligent umbrella and/or shading charging system may comprise a telemetry printed circuit board (PCB) comprising a processor 805 and a telemetry PCB may provide potential location and orientation information. In embodiments, a weather variable PCB comprising a processor 810 may provide sensor weather variables surrounding a shading object and/or umbrella. In embodiments, a wind sensor 817 may detect a high wind conditions, generate signals, and an umbrella movement control PCB 895 may generate signals and/or commands causing arm support assemblies to close or move to a closed position. In embodiments, a voice recognition engine or module 815 may enable control of a shading object via voice commands and/or a microphone by receiving voice commands, recognizing commands and generating commands in response to the voice commands. In embodiments, a voice recognition engine or module 815 may generate voice responses and/or audible warnings. In embodiments, a rechargeable battery 820 may be charged or powered by an AC adapter, a DC adapter, and/or an array of solar cells 825, which provide power (e.g., current and/or voltage) to a power tracking solar charger 830 and other assemblies and/or components. In embodiments, a power tracking solar charger 830 may regulate and balance a charging process. In addition, a power tracking solar charger 830 may provide data and/or information regarding a charging state. In embodiments, an AC adapter 835 and/or a DC adapter may plug into a power source (e.g., a wall outlet and/or a generator).

In embodiments, a proximity sensor 840 may identify location of a person relative to moving components of a shading object, umbrella and/or shading charging system. In embodiments, a motion sensor 845 may detect and/or identify a presence of an individual in an area around a shading object or umbrella. In embodiments, an obstacle detector 850 may detect presence of a person and/or object in a shading object's path of travel. In embodiments, a tilt sensor 855 may detect movement and/or relocation of a component or of a shading object, umbrella, and/or shading charging system with respect to a correct position. In embodiments, a personal area network (PAN) (e.g., Bluetooth) module 865 and/or transceiver may provide short distance communication for application based control, audio sound transmission and/or data processing and/or retrieval. In embodiments, a lighting assembly 870 may provide and/or project light for a shading object and/or an area around a shading object. In embodiments, an audio system 875 may provide or generate audio playback through a mobile application of WiFi stream or through a PAN (e.g., Bluetooth) transceiver 865.

In embodiments, a shading object, umbrella and/or shading charging system may comprise one or more printed circuit boards. Although a description may reference a specific printed circuit board, many of features or functions of a shading object, umbrella and/or shading charging system may be implemented utilizing components mounted on a single circuit boards or one or more circuit boards. In addition, one or more components may be mounted on printed circuit boards, which results in a large number of circuit boards within a shading object, umbrella and/or shading charging system. In other words, a number of circuit boards may be utilized to provide features and/or functions of a shading object and/or umbrella although embodiments described herein may only describe a specific number. Although the term "circuit board" or "printed circuit board" is utilized, any electronic device allowing installation on and communicate with components may be utilized along with circuit board. As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards. In embodiments, flexible PCBs or meshes may also electrically connect electronic components.

In embodiments, for example, such as FIG. 8, a shading object or umbrella 800 may comprise a movement control PCB 895, a shading object computing device or computing device PCB 860, a first motor PCB (azimuth control) 880, a second motor PCB (elevation control) 885, a third motor PCB (actuation/deployment control) 890, a telemetry PCB (location and orientation data/information collection) 805, and/or a weather variable PCB (environmental sensor data/information collection) 810. In embodiments, operation of components, sensors, assemblies or circuits of printed circuit boards may be automatically initiated, started or operated in response to signals from a processor, controller and/or a component in a computing device (integrated within the umbrella and/or received from an external and/or separate computing device). Further, operation of components, assemblies or circuits of PCBs may be automatically initiated, started, and/or operated in response to signals, commands or instructions generated after computer-readable instructions are retrieved from a memory and executed by a processor or controller within a shading object, umbrella or shading charging system and/or a remote computing device.

In embodiments, a telemetry PCB 805 comprises a processor, a memory, a GPS receiver and/or transceiver and/or a compass (e.g. a digital) compass). The GPS receiver and/or compass may provide location and orientation information and/or measurements which may be transferred to a memory utilizing a processor. In embodiments, a telemetry PCB processes and conditions the communicated information and/or measurements. In embodiments, a telemetry PCB 805 communicates measurements and/or additional information (e.g., in some cases, measurements are conditioned and processed and in some cases, measurements are raw data) to a shading object movement control PCB 895 which analyzes the received location, orientation information and/or measurements.

In embodiments, a weather variable PCB 810 comprises a processor, a memory, an air quality sensor, a UV radiation sensor, a barometer, a temperature sensor, a humidity sensor, and/or a wind speed sensor. One or more of the listed sensors may generate environmental and/or weather measurements and/or information, which may be transferred to a memory utilizing a processor. In embodiments, a weather variable PCB 810 processes and conditions information and measurements from the one or more sensors. In embodiments, a weather variable PCB 810 communicates received environmental and/or weather sensor measurements (e.g., in some cases conditioned and processed and in some cases raw data) to a shading object movement control PCB 895 which analyzes the received location and/or orientation information and measurements.

In embodiments, a center support assembly 107 may comprise an umbrella movement control PCB 895, as well as an integrated computing device PCB 860. In embodiments, a movement control PCB 895 may also be located in a stem assembly 106 and/or a base assembly 105. In embodiments, an umbrella movement control PCB 895 may consume a low amount of power and may be referred to as a low-power PCB. In embodiments, a low power PCB may prove to be a benefit as compared to prior-art umbrellas which had circuit boards utilizing a large amount of power (and thus needed to have power from an external power source to maintain operation). In embodiments, a solar array may provide enough provide power to power components on an umbrella movement control PCB 895 due to a lower power consumption. In this case, for example, components and associated activities controlled by an umbrella movement circuit PCB 895 may not consumer large amounts of power because these activities do not require continuous operation and may only receive information or measurements on a periodic basis. As an example, an intelligent shading object 800 may not be rotating and/or tilting frequently. Thus, in embodiments, therefore, sensors providing these measurements (e.g., a tilt sensor or sunlight sensor), and a movement control PCB communicating these measurements may not need to be in an active state at all times, which results in significant power usage savings for a shading object and/or umbrella. In embodiments, a motion control PCB 895 may comprise a processor 896, a non-volatile memory 897, a volatile memory, and many other components described above and below. In embodiments, for example, computer-readable instructions may be fetched from a non-volatile memory 897, loaded into a volatile memory 898, and executed by a processor 896 to perform actions assigned to, controlled and/or commanded a motion control PCB 895. In embodiments, non-volatile memory may be flash memory, ASIC, ROMs, PROMs, EEPROMs, solid state memory, CD, DVD, persistent optical storage or magnetic storage media.

In embodiments, as a further example, shading object motors, e.g., a first motor (azimuth movement motor), a second motor (elevation movement motor), and/or a third motor (articulation or actuator movement motor) may not be utilized frequently, so there does not need to be a large amount of power utilized by these motors within a shading object. In embodiments, when motors and/or motor assemblies are operating, the motors may require 2 to 3 amps. If system is idle and for example, the shading computer is not operating, an intelligent shading object may only require 180 milliamps. If an audio system is operating, e.g., music is playing and the amplifier and speakers are being utilized, only 400-500 milliamps, In addition, motor controllers may not be utilized frequently since the motor controllers may not be driving and/or sending commands, instructions, and/ or signals to motors frequently. Thus, usage of a low power movement control PCB 895 may provide a shading object owner with power usage savings and efficiency.

In embodiments, readings and/or measurements from sensors may cause a movement control PCB 895 to transmit commands, instructions, and/or signals to either a first motor control PCB 880 (azimuth movement), a second motor control PCB 885 (elevation movement), and/or a third motor control PCB 890 (actuation movement), in order to cause specific movements of different assemblies of a shading object or umbrella. In embodiments, communication of measurements may be automatically initiated. For example, in embodiments, a GPS transceiver 806 may receive GPS signals and communicate GPS measurements (e.g., values representative of a longitude, latitude, and/or an altitude reading) to a movement control PCB 895. In embodiments, a movement control PCB 895 may analyze the GPS measurements and determine that a shading object, umbrella, and/or shading charging system should be moved to a specific elevation. In other words, in embodiments, a movement control PCB 895 may utilize GPS generated measurements to direct a second motor assembly to move to a proper elevation (and this may occur automatically). In embodiments, GPS measurements (coordinates and time) identify a proper elevation of the sun based on a geographic location. In embodiments, after center support assembly 107 is moved to a position identified by GPS measurements, arm support assemblies 108 may be extended and the arms/blades 109 may be fully deployed (which may occur automatically). In embodiments, a movement control PCB 896 may communicate commands, instructions, and/or signals to a second motor control PCB 885 to cause an upper assembly 112 of a center support assembly 107 to rotate or move approximately 45 degrees in a downward direction with respect to a lower assembly 113 of the center support assembly. In embodiments, a movement control PCB 895 may communicate commands, instructions, and/or signals to a third motor control PCB to fully extend arm support assemblies 108 (e.g. articulating blades/assemblies) and also arms/ blades 109.

In embodiments, a digital compass 807 may generate a heading and/or orientation measurement and a telemetry PCB 805 may communicate a heading and/or orientation measurement to a movement control PCB 895. In embodiments, a movement control PCB 895 may analyze a heading measurement and generate and/or communicate commands, instructions, and/or signals to a first control PCB 880 to rotate a stem assembly 106 and a center support assembly 107 (e.g., an umbrella support assembly) to face or move the shading object towards a light source (e.g., a sun). In embodiments, digital compass measurements may be utilized as directional input for an azimuth (or first motor). In embodiments, a movement control PCB 895 may calculate counts and/or limits for motors to properly orient an intelligent shading object based on GPS measurements and/or digital compass measurements. Continuing with this embodiment, a movement control PCB 895 may generate and/or communicate commands, instructions, and/or signals to a third motor controller PCB 890 to cause arm support assemblies 108 to be extended or deployed along with arms/blades 109. The capturing of measurement data, communicating of measurement data and communication of commands, instructions and/or signals may be initiated automatically.

In embodiments, a wind speed sensor 817 may generate measurements and a variable weather PCB 810 may communicate measurements to a shading object movement control PCB 895. In embodiments, a movement control PCB 895 may analyze and/or compare communicated measurements to a threshold in order to determine if unsafe conditions are present. In embodiments, for example, if a wind speed threshold is reached or exceeded, identifying an unsafe condition, a movement control PCB 895 may communicate commands, instructions, and/or signals to move shading object assemblies to a rest position. Continuing with this illustrative example, a movement control PCB 895 may communicate commands or instructions or signals to a second movement control PCB to cause an upper assembly 112 to move to an original position (e.g., at rest position). In embodiments, for example, a movement control PCB 895 may communicate instructions, commands and/or signals to a third motor control PCB 890 to move arm support assemblies 108 back into an upper assembly and/or retract arm support assemblies 108 into channels of an upper assembly 112. In embodiments, a movement control PCB 895 may communicate commands, instructions and/or signals to a sound reproduction system 875 and/or a display device to warn a user of unsafe wind conditions. Although the description above corresponds to the intelligent umbrella of FIGS. 1A and 1B, the description applies to similar components in the intelligent shading charging system of FIG. 1C.

In embodiments, a first motor control PCB 880, a second motor control PCB 885, a third motor control PCB 890 and a movement control PCB 895 may be connected to each other via wires and/or traces and instructions may, commands and/or signals may be communicated via wires and/or traces. In embodiments, the motor control PCBs 880, 885 and 890 may communicate with a movement control PCB 895 via a personal area network communications protocol, e.g., Bluetooth, Zigbee or other PAN communication protocols. In embodiments, a weather variable PCB 810 and/or a telemetry PCB 805 may communicate with a movement control PCB 895 via wires, traces, integrated circuits, and/or interfaces and communicate instructions, commands or signals. In embodiments, a weather variable PCB 810 and a telemetry PCB 805 may communicate with a movement control PCB 895 via personal area network protocols (utilizing a PAN transceiver—e.g., a Bluetooth transceiver). In embodiments, motor control PCBs 880 885 890 may communicate directly (either via wires or a wireless communication protocol) with a weather variable PCB 810 and/or a telemetry PCB 805 without utilizing an integrated computing device 860 and/or a movement control PCB 895.

In embodiments, as described above, a shading object, intelligent umbrella and/or shading charging system may comprise a computing device PCB, which may comprise a computing device 860 in a shading object, intelligent umbrella and/or shading charging system. In embodiments, a computing device 860 is not a controller, motor controller, movement control PCB, weather variable PCB and/or telemetry PCB. In embodiments, a shading object, intelligent umbrella and/or shading charging system may comprise a computing device 860 which is not installed and/or mounted on a computing device PCB. In embodiments, a computing device 860 and/or a computing device PCB may consume a larger amount of power (with respect to movement control PCB 895) due to activities it is responsible for executing being performed more frequently and/or with a higher data throughput. In embodiments, an integrated computing device 860 may be responsible for camera control, video and/image processing, external Wi-Fi communication, e.g., such as operating as a hot spot, as well as running various software applications associated with the intelligent shading object, umbrella and/or intelligent shading charging system.

The computing device 860, because of operating and being responsible for more data intensive features and/or functions, may require more processing power due to extended operation and continuous data throughput. In embodiments, a computing device may be integrated into a center support assembly 107. In embodiments, a computing device may be integrated into a base assembly and/or a stem assembly of FIGS. 1A and 1B. In embodiments, a computing device may be incorporated into a housing and/or enclosure 182, a lower support assembly 187 and/or an upper support assembly 191 in an intelligent shading charging system.

Figure 9:
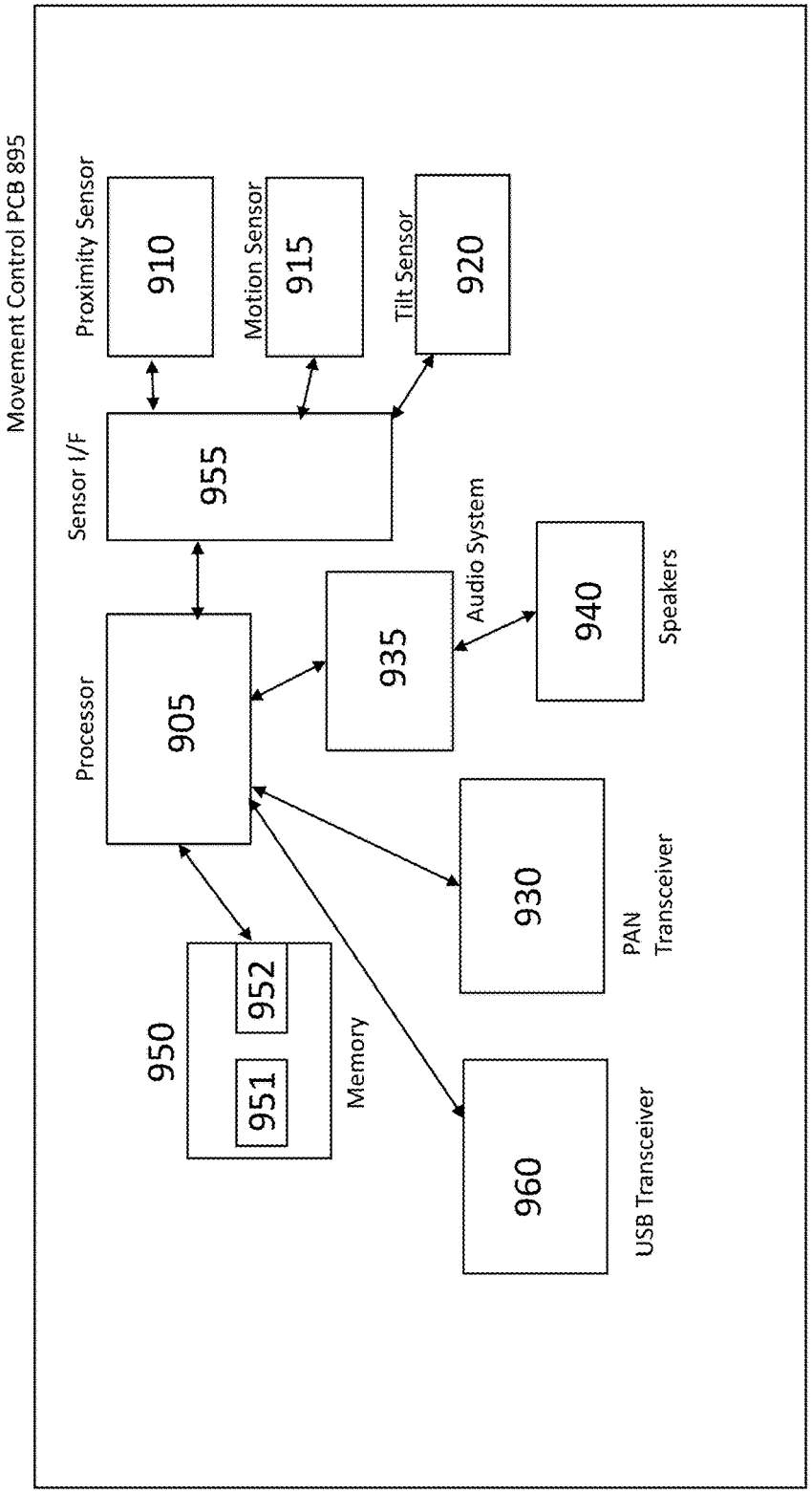
FIG. 9 illustrates a block diagram with data and command flow of a movement control PCB according to embodiments.

FIG. 9 illustrates a block diagram of a movement control PCB according to embodiments. Returning back to discussion of a movement control PCB, in embodiments, a movement control PCB 895 may comprise a processor/controller 905, a proximity sensor 910, a motion sensor 915, a tilt sensor 920, a personal area network transceiver 930, an audio receiver 935 (optional), one or more speakers 940, and/or a memory 950 having umbrella, shading object and/or shading charging system control software (e.g., executable instructions stored in a non-volatile memory 951 and executable by a processor 905). In embodiments, an umbrella movement control PCB 895 may comprise a USB transceiver 960. In embodiments, an umbrella movement control PCB 895 may comprise sensor interface subsystem 955 for communicating sensor measurements to an umbrella movement control PCB 895 and communicate commands and/or signals from and two to external sensors. In embodiments, a sensor interface subsystem 955 may be located on a movement control PCB 895, or may also be located on a telemetry PCB 805, a weather variable PCB 810, and/or motor control PCBs 880, 885, and 890. For example, in embodiments, an intelligent shading object, umbrella and/or shading charging system may also include a signal conditioning subsystem which may also be referred to as a sensor interface system, the terms being utilized interchangeably throughout the specification. In embodiments, an intelligent shading object, umbrella and/or shading charging system (and the signal conditioning subsystem) may further comprise one or more reference signal modules, one or more signal conditioning modules, and one or more analog-to-digital converters.

In embodiments, one or more sensors (e.g., air quality sensor 811, UV radiation sensor 812, wind speed sensor 817, motion sensor 845, and/or tilt sensor 855) may receive communicated analog signals and may transmit analog signals to signal conditioning modules 955. In embodiments, a signal conditioning module 955 may process and/or condition communicated analog sensor signals. Although signals are described as being analog, the description herein equally applies to digital signals. In embodiments, one or more signal conditioning modules may communicate and/or transfer processed and/or conditioned signals to one or more A-to-D converters. In embodiments, one or more signal reference modules may be a non-volatile memory, or other storage device, that stores and/or retrieves signal values that the communicated signal values may be compared to in order to determine if threshold conditions may be met. In embodiments, a comparison of communicated signal values to reference signal values may allow the signal conditioning system to understand if normal conditions are being experienced by an intelligent shading object, umbrella, and/or shading charging system or if an intelligent shading object, umbrella, and/or shading charging system may be experiencing abnormal conditions, (e.g., high humidity, high movement, high wind, and/or bad air quality).

In embodiments, an umbrella movement control PCB 895 may comprise a proximity sensor 840. In embodiments, a proximity sensor 840 may be able to detect a presence of nearby objects, (e.g., people or other physical objects) without any physical contact between a sensor and an object. In embodiments, a proximity sensor 840 may be located on and/or mounted on a movement control PCB 895. In embodiments, a proximity sensor 840 may be located on and/or mounted on other PCBS or may be a standalone component. In embodiments, a proximity sensor 840 may be located within a center support assembly 107. In embodiments, a proximity sensor 840 may generate measurements and/or signals, which may be communicated to a processor/controller 905 in a movement control PCB 895. In embodiments, an umbrella movement control board 905 may store communicated measurements and/or signals, which has instructions stored thereon. In embodiments, proximity sensor software instructions, which are fetched from memory 950 and executed by a processor 905, may perform and/or execute a proximity process or method. In embodiments, for example, a proximity process may comprise receiving measurements and/or signals from a proximity sensor 840 indicating an object and/or person may be located in an area of interest. For example, if an individual is located in an area where arm support assemblies may be deployed and/or extended, a proximity sensor 840 may transmit a signal or measurement indicating an object may be an obstruction to, for example, a movement control PCB 895. In embodiments, a processor/controller 905 in a movement control PCB may receive and/or analyze a proximity measurement and determine an object is an obstacle. In embodiments, a proximity signal and/or command may also identify a location of an object (e.g., obstacle) in relation to a proximity sensor 840 and/or some reference location. In embodiments, a processor of a movement control PCB may generate and/or communicate a driving signal, command, and/or instruction that instructs a shading object not to deploy and/or open arm support assemblies. In embodiments, for example, a processor/controller 905 may communicate a signal and/or commands to a third motor controller to cause the third motor to stop moving the arm support assembly 108 due to an obstacle detection. In embodiments, for example, a movement control PCB 895 may communicate a signal and/or commands to a second motor controller a second motor to cause a second motor to stop moving an gearbox assembly and/or actuator and prevent an upper assembly 112 of a center support assembly from moving into an area where an obstacle is detected. In embodiments, this may also work in the opposite direction, where if a proximity sensor 840 does not determine that an object is within a shading object area, then a proximity sensor signal may not be communicated to the processor/controller 905 in a movement control PCB 895.

In embodiments, an umbrella movement control PCB 895 may comprise a motion sensor 845. In embodiments, a motion sensor 845 may generate a signal and/or measurement indicating that an individual, a living organism, or an object is within and moving within an area covered or being monitored by a motion sensor 845. For example, a motion sensor 845 may generate a signal if an individual and/or object is approaching a shading object and/or umbrella, is within 5 or 10 feet of an umbrella, and/or is moving within a shading area. In embodiments, a motion sensor 845 may be located on and/or mounted on other PCBs or may be a standalone component. In embodiments, a motion sensor 845 may be located within a center support assembly 107. In embodiments, a motion sensor 845 may generate measurements and/or signals, which may be communicated to a processor/controller 905 in a movement control PCB 895. In embodiments, an umbrella movement control board 905 may store communicated measurements and/or signals, in a memory 950. In embodiments, motion sensor software instructions, may be fetched from memory 950 and executed by a processor 905, and may cause a processor 905 to perform and/or execute a motion detection process or method. Although the description above corresponds to the intelligent umbrella of FIGS. 1A and 1B, the description applies to similar components in the intelligent shading charging system of FIG. 1C.

In embodiments, for example, a motion detection process may comprise receiving measurements and/or signals from a motion sensor 845 indicating an object and/or person may be moving in an area where a shading object and/or umbrella is deployed, near where a shading object is located, and/or where a component of a shading object may be moving. In embodiments, if an individual's or object's movement is detected by a motion sensor, a processor 905 may generate a signal instructing or commanding certain shading object components to be activated, deployed, and/or retracted. For example, if an individual's movement is detected during a night or darkness period, a processor may generate signals, instructions, or commands, to shading object components in reaction to the movement (e.g., commands, instructions, and/or signals may be transmitted to a lighting system or assembly 870 to turn on lights of a shading object lighting system; commands may be transmitted to an audio system 875 to activate and/or turn on an audio receiver and/or audio system and transmit a warning that an individual is near a shading object; and/or commands may be transmitted to a third motor controller 890 to cause a motor to open one or more of the arm support assembles 109. Further, in embodiments, one or more commands may be communicated to one or more cameras 857 to activate one or more cameras to capture images of an area around a shading object. In embodiments, if a motion sensor 845 detects movement away from a shading object, a motion sensor 845 may communicate commands, signals, and/or instructions to a controller/processor 905 in a movement control PCB 895, which in turn may turn off components and/or retract assemblies of a shading object. Operation of a motion detector may be initiated automatically by movement of an object or individual or occur automatically in response to signals from a processor, controller and/or a component in a computing device (integrated within the umbrella and/or received from an external and/or separate computing device).

In embodiments, an umbrella movement control PCB 895 may comprise one or more tilt sensors 855. In embodiments, a tilt sensor 855 can measure a tilting in one or more axes of a reference plane. In embodiments, for example, a tilt sensor 855 may comprise an accelerometer to measure tilt angle with reference to an earth's ground plane. In embodiments, a tilt sensor 855 may be placed on a center support assembly 107 of a shading object (either an upper assembly 112 and/or a lower assembly 113), may be placed on a fabric shading 715, or may be placed on arms/blades 109. In embodiments, a tilt sensor 855 may measure an angle of incident from a reference axis and/or a ground plane. In embodiments, a reference axis may be an axis of a shading object at rest, a deployment angle (e.g., if a shading object is deployed at a 45 degree angle and thus components are at 45 degrees also, a tilt sensor 855 may be configured to determine it a title sensor 855 moves past a specific angle). In embodiments, a tilt sensor 855 may communicate measurements to a processor/controller 905 in a movement control PCB 895. In embodiments, an umbrella movement control board 895 may store communicated measurements and/or signals, in a memory 950. In embodiments, tilt sensor software instructions, may be fetched from memory 950 and executed by a processor 905, and may cause a processor 905 to perform and/or execute a tilt detection process or method. In embodiments, for example, a tilt detection process may comprise receiving tilt sensor measurements and compare the communicated tilt sensor measurements to reference measurements. If received tilt sensor measurements are greater than a reference measurement threshold, then a processor 905 may generate a signal, command or instruction and communicate the signal, command or instruction to an assembly and/or component to adjust an orientation and/or deployment of shading object. For example, if a tilt sensor 855 indicates that a shading fabric is deployed at a 50 degree angle from a reference axis, but that a maximum shading fabric deployment is 45 degrees from a reference axis, then a processor 905 may generate an adjustment signal, command and/or instruction to cause an elevation and/or second motor or a actuator and/or third motor to move a shading object to a correct position.

In embodiments, an umbrella movement control PCB 895 may comprise an audio/video transceiver 865, a stereo amplifier 875, and/or one or more sound reproducers (e.g., speakers) 875. In embodiments, an audio/video transceiver 865 may be a Bluetooth Audio MP3 transceiver. In embodiments, an audio/video transceiver 875 may receive wirelessly transmitted audio and/or video signals from an audio source such as a portable electronic device, a cellular phone, an iPod, an audio player, and/or a personal computer. In embodiments, a wireless transmission protocol may be a Bluetooth protocol for transmitting audio/video, although other protocols (e.g., public and/or proprietary protocols) may be utilized. In embodiments, a portable electronic device may establish a communications channel by pairing with an audio/video transceiver, e.g., utilizing a Bluetooth protocol, in a shading object. In embodiments, an audio/video transceiver 865 may be located in a central support assembly 107. In embodiments, an audio/video transceiver 865 may be placed on or mounted on a motion control PCB 895 although it may be placed anywhere within a shading object and/or as a separate unit. In embodiments, a shading object computing device 860 may also comprise an audio/video transceiver 865. In embodiments, an audio/video transceiver 865 may be located within a shading object computing device 860 because this activity and/or feature requires more energy and/or use than other components located on a movement control PCB. In embodiments, where users may be streaming audio/video for a long period of time, locating an audio/video transceiver on a computing device 860 may be more efficient. In embodiments, an audio/video transceiver 865 may communicate a received audio signal to one or more speakers 875 for reproduction of sound. In embodiments, an audio/video transceiver 865 may communicate a received audio signal to a stereo amplifier 875 and an amplified audio signal may be transmitted to one or more speakers 875 for reproduction of sound. Although the description above corresponds to a shading object or intelligent umbrella of FIGS. 1A and 1B, the description applies to similar components in the intelligent shading charging system of FIG. 1C. In embodiments, a portable computing device may automatically interface with the audio/video transceiver and automatically generate and communicate streaming audio (e.g., a playlist) to an audio/video transceiver 865 via a PAN transceiver or another wireless communication protocol.

In embodiments, computer-readable instructions installed in a non-volatile memory of a shading object, may be loaded into a memory of a shading object, intelligent umbrella and/or intelligent shading object and executed by a processor to automatically and/or autonomously initiate operation of a shading object, intelligent umbrella and/or intelligent shading object to perform one or more actions. For example, in embodiments, computer-readable instructions may be executed automatically based on pre-determined settings and/or parameters. For example, at specific times of a day and/or on specific days, an umbrella, shading object, and/or shading charging system may automatically and/or autonomously move to certain positions (e.g., rotate about an azimuth axis, move to a certain elevation and deploy arms to a specific angle as discussed above). In addition, in embodiments, a shading object, umbrella and/or shading charging system may automatically and/or autonomously capture measurements from one or more of a temperature sensor, a wind speed sensor, a humidity sensor, a radiation sensor, a methane sensor, and/or a carbon dioxide sensor, and/or an air quality sensor, communicate the captured sensor measurements, analyze the captured sensor measurement, and automatically and/or autonomously generate instructions to activate certain assemblies on a shading object, umbrella and/or shading charging system and in some cases move the shading object, umbrella and/or shading charging system to positions in response to the captured sensor measurements. In embodiments, for example, movements may result in rotation, elevation, deployment and/or retraction of assemblies of a shading object, intelligent umbrella and/or shading charging system. In embodiments, for example, computer-readable instructions may be executed by a processor at certain times of a day and/or certain days of the week to activate a sound reproduction system and selected stored music may be played over the shading object, intelligent umbrella and/or shading charging system's sound system (e.g., speakers). In embodiments, a shading object, umbrella and/or shading charging system may communicate a command and/or signal to a wireless communication device (e.g., phone) to begin and/or initiate streaming of music, which may then be communicated to the object's, umbrella's and/or sound reproduction system. In embodiments, computer-readable instructions may be executed by a processor to automatically and autonomously activate one or more lighting elements and/or assemblies in the shading object, umbrella and/or shading charging system. In embodiments, computer-readable instructions may be executed by a processor to automatically and autonomously coordinate and/or synchronize activation of lighting elements and/or assemblies with playing of music (e.g., synch the lighting to the music).

In embodiments, the computer-readable instructions may be stored in non-volatile memory, an ASIC, a ROM, flash memory, volatile memory, RAM, and/or other combinations of hardware and/or software. In embodiments, the computer-readable and executable instructions in a shading object, may also be activated, initiated and/or controlled by an external computing device, (e.g., a third party computing device, a laptop, a wireless communications device, a tablet, a personal computing device). In embodiments, for example, a smart phone may communication instructions and/or commands to set positions of azimuth, elevation, deployment and/or retraction of a shading object, umbrella and/or intelligent shading charging system and the shading object, umbrella and/or intelligent shading charging system may receive the commands, generate commands, signals and/or instructions to be communicated to assemblies to move to the selected azimuth, elevation and/or deployment/retraction.

As another illustrative example of automatic and/or autonomous operation and/or initiation, computer-readable instructions may be executed by a processor and a shading object, intelligent umbrella and/or shading charging system may automatically and/or autonomously activate and/or receive measurements from one or more sensors such as a motion detector, proximity sensor, obstacle detector, infrared detector, tilt sensor and/or thermal sensor. In embodiments, a shading object, intelligent umbrella and/or shading charging system may automatically and/or autonomously communicate the captured sensor and/or detector measurements, analyze the captured sensor measurement, and automatically and/or autonomously generate instructions to activate certain assemblies on a shading object, umbrella and/or shading charging system. In embodiments, for example, the instructions, commands and/or signals may cause motors and/or assemblies to move the shading object, umbrella and/or shading charging system to positions in response to the captured sensor and/or detector measurements. In embodiments, for example, the instructions, commands and/or signals may cause automatic activation of one or more cameras, a lighting system and/or a sound reproduction system. In embodiments, for example, the instructions commands and signals may cause activation of transceivers (e.g., cellular, WiFi, wireless, and/or radio transceivers) which may result in transceivers automatically and autonomously communicating messages, images, sound, video and/or data to other third party computing devices. movements may result in rotation, elevation, deployment and/or retraction of assemblies of a shading object, intelligent umbrella and/or shading charging system.

Figure 11:
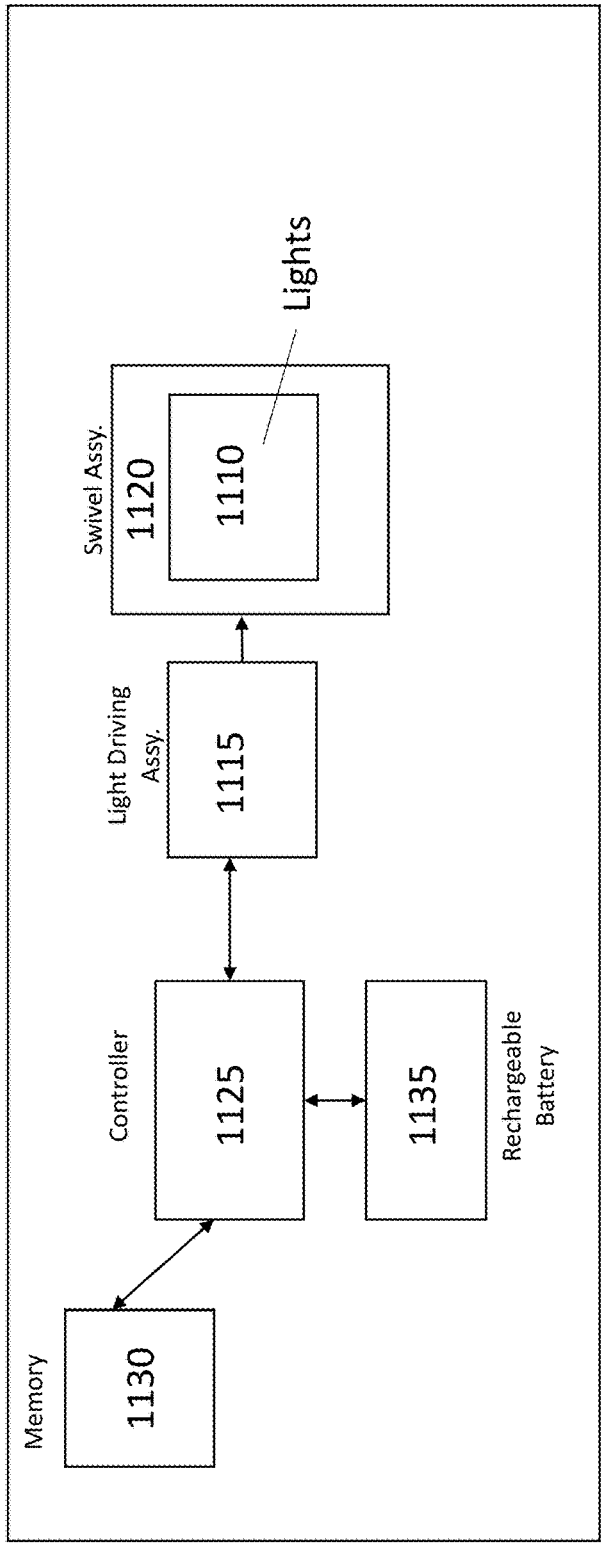
FIG. 11 illustrates a lighting subsystem according to embodiments.

FIG. 11 illustrates a lighting subsystem according to embodiments. In embodiments, a shading object may comprising a lighting subsystem 870. A lighting subsystem is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," both of which are hereby incorporated by reference.

FIG. 11 also illustrates one or more first lighting assemblies 199 and/or a second lighting subsystem 198 according to embodiments. In embodiments, one or more first lighting assemblies 199 and/or a second lighting subsystem 198 may comprise a processor or microcontroller 1125, a lighting driver 1115, a memory 1130, and/or one or more LED lights 1110 (or other lighting elements) FIG. 11B illustrates a wireless charging assembly according to embodiments. A first lighting assembly and a second lighting subsystem are described in detail in non-provisional patent application Ser. No. 15/212,173, filed Jul. 15, 2016, entitled "Intelligent Charging Shading Systems," which is hereby incorporated by reference. In embodiments, a processor, controller or component in a computing device (integrated within a shading object, umbrella and/or shading charging system) may communicate signals to automatically initiate operation of first lighting assemblies 199 and/or a second lighting subsystem 198

In embodiments, an umbrella movement control PCB 895 may comprise a USB transceiver 877. A USB transceiver is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and also in U.S. non-provisional patent application Ser. No. 15/160,822, filed May 20, 2016, entitled "Intelligent Shading Objects with Integrated Computing Device," the disclosure of both of which are hereby incorporated by reference.

In embodiments, a shading object may comprise a shading fabric 715 and solar cells 110. In embodiments, one or more strips and/or arrays of solar cells 110 may be placed on a top surface of a shading fabric 715. In embodiments, one or more strips of solar cells may be integrated into (or woven into or be a part of) a shading fabric 715. In embodiments, solar cells 110 may be comprised of a flexible material. In embodiments, a shading fabric 715 may be coupled, connected and/or attached to a frame or support assembly (e.g., arm support assemblies 108) and one or more strips of solar cells 110 may be placed on and/or attached to a top surface of an arm support assembly 108. In embodiments, arm support assemblies 108 may comprise a recess or a channel where solar cells 110 may be placed and/or inserted. In embodiments, a shading fabric 715 may have one or more strips of solar cells 110 integrated therein and/or woven into. In embodiments, one or more strips of solar cells 110 may form a pattern on a top surface of a shading object. Continuing with this illustrative embodiment, by forming solar cells in specific patterns, one or more strips of solar cells 110 may be capture sunlight and/or other ultraviolet light from a number of directions and/or thus, intensities. Although the description above corresponds to the intelligent umbrella of FIGS. 1A and 1B, the description applies to similar components in the intelligent shading charging system of FIG. 1C.

Figure 12:
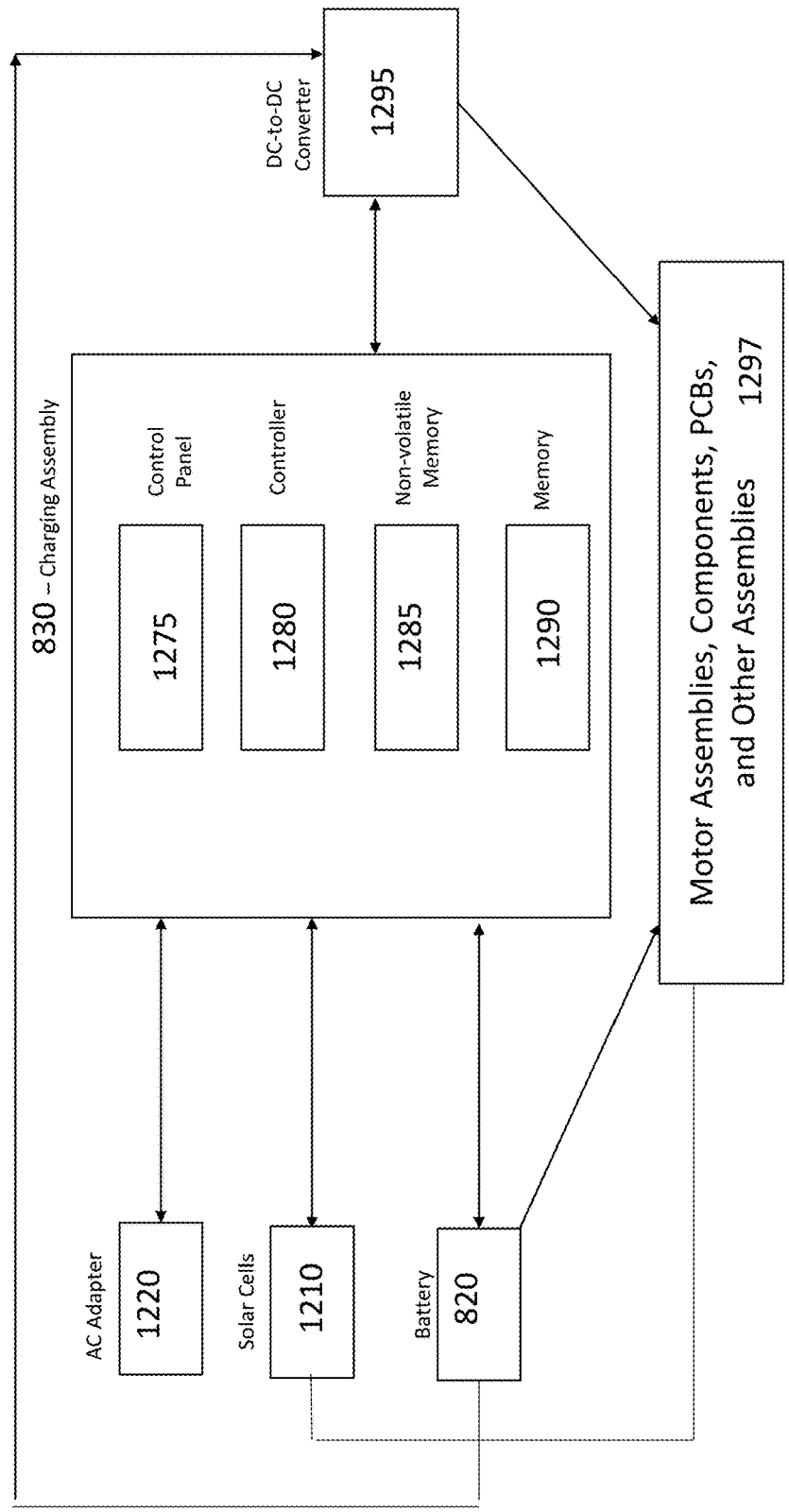
FIG. 12 illustrates a power subsystem according to embodiments.

FIG. 12 illustrates a power subsystem according to embodiments. In embodiments, a shading object may comprise a power tracking solar charger 830. In embodiments, a center support assembly 107 of a shading object may comprise and/or house a power tracking solar charger 830. Continuing with this illustrative embodiment, a power tracking solar charger 830 may be located in and/or on an upper assembly 112, or alternatively in or on a bottom assembly 114. In embodiments, a power tracking solar charger 830 may be connected to one or more solar cells 1210, a rechargeable battery 820, and/or an AC adapter 835 or 1220. In embodiments, a photovoltaic (PV) cell, or "solar cell" may be a smallest semiconductor element that converts sunlight into electricity. In embodiments, a semiconductor silicon may be treated so that silicon generates a flow of electricity when a light shines on it. In embodiments, a PV array or cells may be an interconnected system of PV cells that may function as a single electricity-producing unit. In embodiments, a PV array 1210 or 110 may comprise one of more of the strips of solar cells. In embodiments, a PV array 1210 or 110 may comprise one solar cell strip. In embodiments, one or more solar cells 1210 (e.g., a PV array 1210) may provide power directly to a power tracking solar charger 830 and/or a rechargeable battery 820. In embodiments, one or more solar cells 1210 (or solar arrays) may provide power to motor assemblies, components, printed circuit boards, and/or other assemblies 1297 in an intelligent shading object. Although the description above corresponds to the intelligent umbrella of FIGS. 1A and 1B, the description applies to similar components in the intelligent shading charging system of FIG. 1C.

In embodiments, a power tracking solar charger 830 may be coupled and/or connected to a rechargeable battery 820.

In embodiments, a power tracking solar charger 830 may be coupled and/or connected to an AC adapter 835 (or DC power adapter), which is coupled and/or connected to a power source. In embodiments, a charging assembly 830 may be coupled to one or more solar cells 1210 or solar arrays. In embodiments, a power tracking solar charger 830 may include a control panel 1275, a controller 1280, a non-volatile memory 1285 and a volatile memory 1290, the non-volatile memory 1285 comprising computer-readable and computer-executable instructions, which are fetched and loaded into volatile memory 1290 for execution by a controller or processor 1280 to perform a power monitoring, tracking and distribution process. In embodiments, a power monitoring, tracking and/or distribution process may monitor power levels and/or power conditions of different components of a shading object (e.g., a motion control PCB 895, arrays of solar cells 110 1210, a rechargeable battery 820). In embodiments, a power tracking and monitoring process may communicate information regarding power levels and/or power conditions of a solar charger 830 (and other shading object components) to a control panel 1275 and/or to a portable electronic device to display to a user and/or owner.

In embodiments, a power tracking solar charger 830 may transfer incoming power (e.g., voltage and/or current) generated by the solar cells to one or more converters (e.g., a DC-to-DC converters) 1295. In embodiments, a rechargeable battery 820 may provide power (e.g., voltage and/or current) to a DC-to-DC converter 1295. In embodiments, one or more DC-to-DC converters 1295 may transfer voltage and/or current to one or more PCBs, components, motor assemblies, and/or other assemblies of a shading object. In embodiments, a DC-to-DC converter 1295 may be utilized to provide lower operating voltages, e.g., 3.3 VDC or 5.0 VDC or other voltages, to components, boards and/or assemblies 1297 operating on a lower DC voltage. In embodiments, rechargeable battery 820 may transfer incoming power (e.g., voltage and/or current) to one or more converters 1295, and a power charger 830 may monitor power distribution and power levels. In embodiments, a rechargeable battery 820 may provide power to shading object or umbrella motor assemblies, PCBs, components, and/or assemblies 1297. If high power requirements are existing due to operating conditions (e.g., motors running), a rechargeable battery 820 and solar cells or solar cell arrays may both provide power to one or more PCBs, components, motor assemblies, and/or other assemblies of a shading object.

In embodiments, a shading object may comprise a voice recognition engine 815. In embodiments, a shading object motion control PCB 895 may have a voice recognition engine 815 mounted and/or located thereon. A voice recognition engine is described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device, the disclosure of both applications being hereby incorporated by reference.

In embodiments, a shading object central support assembly 107 may also comprise one or more microphones. In embodiments, one or more microphones may also be attached to and/or integrated into a stem assembly 106, a base assembly 105, shading fabric 715, arms/blades 109, and/or arm support assemblies 108. In embodiments, for example, a voice recognition process and/or method may be automatically initiated when a user in a physical vicinity of a shading object may speak. In embodiments, a microphone may capture a user's voice and generate an analog voice signal. In embodiments, an analog-to-digital converter (ADC) may convert a voice to a digital voice signal and may transfer and/or communicate a voice digital signal to a voice recognition engine 815. In embodiments, a voice recognition engine 815 may analyze the received digital voice, extract commands and/or information, and communicate the extracted commands and/or information to a motion control PCB 895 and/or a shading object computing device to cause actions requested verbally by a user or individual to be implemented and/or completed (e.g., in some cases automatically). In embodiments, the voice recognition engine 815 may generate commands, instructions, or signals instructions to other PCBs, subsystems, assemblies and/or components of the shading object in order to comply with and/or react to voice instructions. For example, a voice recognition engine 815 may extract from a received voice signal, a command to obtain sensor measurements, (e.g., sunlight intensity, ozone, and/or wind measurements or reading) from a sensor module 750. The voice recognition engine 815 may communicate the extracted command to a motion control PCB 895 (or alternatively a shading object computing device 860) to communicate with a weather variable PCB and/or a sensor module 750 (e.g., through wireless transceivers, wires, and/or circuit traces). In embodiments, a movement control PCB 895 may communicate to a weather variables PCB to obtain sensor measurements from sensors in a sensor module 750 coupled to and/or connected to a weather variables PCB. In embodiments, sensors (e.g., sensors 811-814, 816, 817) may obtain measurements and may communicate these measurements to a weather variables PCB 810, a shading object movement control PCB 895, and/or to a shading object computing device 860. In embodiments, obtained measurements may be stored (for later use and/or analyzation), may be communicated via a sound system to a user, or may be displayed on a monitor, and/or may be utilized in a mobile software application. Although the description above corresponds to the intelligent umbrella of FIGS. 1A and 1B, the description applies to similar components in the intelligent shading charging system of FIG. 1C.

In embodiments, a movement control PCB 895 or other PCB or circuit may comprise a personal area network transceiver 865. In embodiments, a PAN transceiver 865 may be located on a separate PCB or on other PCBs within a shading object, intelligent umbrella and/or intelligent shading charging system. In embodiments, a PAN transceiver 865 located on a movement control PCB 895 may be a master transceiver. In embodiments, which are illustrative, but not limiting, PAN transceivers, may be an INSTEON transceiver, an IrDA transceiver, a Wireless USB transceiver, a Bluetooth transceiver, a Z-Wave transceiver, a ZigBee transceiver, and/or a body area network transceiver. In embodiments, additional PCBs and/or components may also comprise PAN transceivers. In embodiments, a transceiver 865 on a movement control PCB 895 may communicate instructions, commands, and/or signals to one or more PAN transceivers located in other areas of the intelligent shading object (e.g., PAN transceivers in a first PCB (e.g., a PCB controlling azimuth movement), a computing device (e.g., a Linux computer), a second PCB (e.g., a PCB controlling elevation movement), a third PCB (e.g., a PCB controlling extension or linear actuation movement), a telemetry PCB, and/or a weather variable PCB). By utilizing PAN transceivers and PAN communication protocols in an intelligent shading object, use of wires, flexible circuit boards, and/or other interfaces may be minimized and more physical space may be present in interior spaces and/or printed circuit boards of a shading object, umbrella and/or shading charging system. This is a benefit in that a shading object, intelligent umbrella, and/or intelligent shading charging system may be able to house and/or incorporate many more features and/or components. In addition, potential hindrances to movements of a shading object (e.g., rotation about a vertical axis of a central support assembly and/or deployment of a shading object support arms and/or blades), may be minimized with fewer wires and/or components allowing free movement of these assemblies. In embodiments, PAN transceivers may be utilized in all communications between PCBs and/or between PCBs and/or components of a shading object, intelligent umbrella and/or intelligent shading charging system. In embodiments, PAN transceivers may be utilized for communications of shorter durations and/or lower data throughput. In embodiments, for example, communications from a movement control PCB 895 to a first motor controller 880 may utilize a PAN communication protocol (e.g., PAN transceivers in each device) due to short duration and/or a low data throughput. In embodiments, for example, communications from a movement control PCB 895 to a weather variable PCB 810 may utilize a PAN communication protocol. In embodiments, communications with some external computing devices may occur through a PAN transceiver (e.g., transceiver 865).

In embodiments, wearable computing devices (e.g., watches, glasses, other clothing articles) may also incorporate PAN technology to communicate with nearby computing devices and exchange digital data and information using an electrical conductivity of a human body as a data network. Wearable computing devices are described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device, the disclosure of both which are hereby incorporated by reference.

In embodiments, an intelligent shading object or umbrella may further comprise a sensor module 750. In embodiments, a sensor module 750 may be connected to a top end of a center support assembly 107. As illustrated in FIG. 7, a sensor module 750 may connect, couple or fasten to a post or other structure on top of an upper assembly 112 of a center support assembly 107. In embodiments, a sensor module 750 may be located (and/or attached and/or integrated) on other portions of a shading object, e.g., a shading fabric 715, arms/blades 109, a center support assembly 107, a stem assembly 106, and/or a base assembly 106. In embodiments, a sensor module 750 may screw into a recess on a top of a center support assembly, or alternatively may snap onto a top of a center support assembly 107. Although the description above corresponds to the intelligent umbrella of FIGS. 1A and 1B, the description applies to similar components in the intelligent shading charging system of FIG. 1C.

In embodiments, a sensor module 750 may comprise a telemetry PCB 705 and a weather-related PCB. A telemetry PCB 705 may also be referred to as a GPS solar tracking module. In embodiments, a telemetry PCB may comprise a GPS/GNSS sensor 706 and/or a digital compass 707. In embodiments, a telemetry PCB 705 may be powered by a rechargeable battery 820 and/or DC-to-DC converters, or by a battery located on a telemetry PCB. In embodiments, a GPS receiver 706 may communicate with GPS/GNSS satellites and receive positioning signals from satellites and calculate a latitude and/or longitude of a shading object. In embodiments, a GPS receive may receive latitude, longitude and/or altitude readings from GPS/GNSS satellites. In embodiments, a GPS receiver 706 may also determine an altitude of a shading object from signals communicated from GPS/GNSS satellites. In embodiments, GPS receiver measurements and/or calculations may be utilized by a shading object to determine movements necessary by different electromechanical assemblies of a shading object. For example, a movement control PCB 895 may receive GPS receiver measurements (e.g., longitude, latitude, and/or altitude measurements), analyze and/or process these measurements, and determine necessary movements by a stem assembly 106, a center support assembly 107, and/or arm support assembly 108. These actions may be initiated automatically. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. Although the description above corresponds to the intelligent umbrella of FIGS. 1A and 1B, the description applies to similar components and/or assemblies in the intelligent shading charging system of FIG. 1C.

In embodiments, a sensor module 805 may comprise a digital compass 707 may measure magnetic fields surrounding a shading object and may generate a directional reading and/or an angle a direction heading (e.g., a degree heading from true north). In embodiments, these directional and/or angular readings may be communicated to a motion control PCB 895. For example, a movement control PCB may receive digital compass 807 measurements or values, analyze and/or process these measurements or values, and determine necessary movements in response to heading or directional information by a stem assembly 106, a center support assembly 107, and/or arm support assembly 108. In embodiments, a movement control PCB may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. In embodiments, these actions may be initiated automatically. In embodiments, a telemetry PCB may be utilized infrequently because a shading object may not be moved from one geographical location to another. Thus, GPS information (latitude, longitude, and/or altitude) and/or heading information (from a digital compass) may not change frequently. Thus, a telemetry circuit PCB 805 may comprise a low power processor. In embodiments, a telemetry PCB 805 (and a GPS receiver 806 and/or digital compass 807) may only utilized during configuration and/or calibration of a shading object. During configuration and/or calibration of a shading object (or after a shading object or umbrella has been moved), GPS and digital compass measurements may be captured and after communication of these measurements, a movement control PCB 895 may analyze measurements, calculate elevation and azimuth movements for an intelligent shading object, and communicate instructions, commands and/or signals to respective motor assemblies. In embodiments, computer-readable instructions fetched from a memory may be executed by a processor to automatically capture GPS and/or digital compass measurements, communicate the measurements, analyze measurements, calculate azimuth and/or elevation movements and communicate commands or signals corresponding to the movements. In embodiments, a digital compass 807 may be utilized more frequently than a GPS receiver 806.

In embodiments, a sensor module 750 may comprise a weather variable PCB 810. In embodiments, a weather variable PCB may be located in another assembly of a shading object or umbrella (e.g., stem assembly 106, a center support assembly 107, and/or arm support assembly 108 of FIGS. 1A and 1B) or intelligent shading charging system (lower support assembly 187 or upper support assembly 191 of FIG. 1C). In embodiments, a weather variable PCB 810 may also be referred to as a micro climate data module. In embodiments, a weather variable PCB 810 may comprise a processor/controller, a memory, one or more air quality sensors 811, one or more UV radiation sensors 812, one or more digital and/or analog barometers 813, one or more temperature sensors 814, one or more humidity sensors 816, and/or one more wind speed sensors 817. In embodiments, a solar power charging assembly 830 may provide power (e.g., voltage and/or current to a weather variable PCB 805 and/or components located thereon. In embodiments, a battery (e.g., rechargeable battery) 820 may provide power to a weather variable PCB and components located thereon.

In embodiments, sensor readings, measurements, and values communicated by sensors to a weather variable PCB in a sensor module 750 may be communicated directly or indirectly to a movement control PCB 895 and then directly or indirectly to an integrated computing device 860. In embodiments, sensor readings, measurements, and values communicated by a sensor module 750 may be communicated directly or indirectly to an integrated computing device 860. In embodiments, sensor readings, measurements and/or values may be stored in a memory of a shading object computing device and/or a memory coupled thereto. In embodiments, a memory storing sensor reading measurements may be non-volatile and/or volatile. In embodiments, a shading object computing device 860 may communicate sensor readings to external computing devices via wireless communication protocols (e.g., WiFi) in order to minimize usage of storage on a shading object computing device. In embodiments, external devices storing sensor information may include application servers and/or databases, cloud servers and/or databases, and other offsite storage devices. In embodiments, storing of sensor readings on either a shading object computing device and/or external computing devices allows a shading object sensor reading history to be created and/or maintained. In embodiments, computer-readable instructions fetched from a memory may be executed by a processor to automatically capture sensor readings, communicate sensor and/or component measurements, readings and/or values to different components an umbrella, shading object and/or shading charging system, external computing devices and/or external storage devices.

In embodiments, a sensor module 750 may comprise an air quality sensor 811. In embodiments, an air quality sensor 811 may provide ozone measurements, particulate matter measurements, carbon monoxide measurements, sulfur dioxide measurements and/or nitrous oxide measurements. In embodiments, an air quality sensor 811 may provide allergen measurements. In embodiments, a weather variable PCB 810 may receive measurements and/or readings from an air quality sensor 811 and may communicate these measurements to a movement control PCB 895. In embodiments, a movement control PCB 895 may receive air quality sensor measurements, analyze the measurements, and cause shading object assemblies and/or components to react to air quality measurements. In embodiments, for example, if an air quality is too low, e.g., as compared to an existing threshold, a movement control PCB 895 may communicate commands, instructions and/or signals to an audio system to alert a user of unsafe conditions. In embodiments, for example, ozone measurements received by a movement control PCB 895 from an air quality sensor may be utilized to determine an amount of time an individual should be outside, and this amount of time may be communicated to an individual via a sound system (communicated audibly), via a display and/or monitor, and/or wirelessly to an external computing device. In embodiments, computer-readable instructions fetched from a memory may be executed by a processor to automatically capture air quality measurements, communicate air quality measurements and generate commands, instructions and/or signals in response to received air quality measurements.

In embodiments, a sensor module 750 may comprise an ultraviolet (UV) radiation sensor 812. In embodiments, a UV radiation sensor may provide discrete radiation band measurements, including, but not limited to UVB, radiation, UVA radiation, Infrared lighting, or a combination of any and all of these radiation measurements. In embodiments, a weather variable PCB 810 may receive measurements and/or readings from a UV sensor 812 and may communicate these measurements to a movement control PCB 895. In embodiments, for example, UV radiation measurements received by a movement control PCB 895 from a UV sensor 812 may be utilized to determine and/or calculate an amount of time an individual should be outside, and this amount of time may be communicated to an individual via a sound system (communicated audibly), via a display and/or monitor, and/or wirelessly to an external computing device. In embodiments, computer-readable instructions fetched from a memory may be executed by a processor to automatically capture UV radiation measurements, communicate UV radiation measurements and generate commands, instructions and/or signals in response to received air quality measurements.

In embodiments, a sensor module 750 may comprise a digital barometer 813, which provides, measures and/or displays complex atmospheric data more accurately and quickly than prior barometers. Many digital barometers display both current barometric readings and previous 1-, 3-, 6-, and 12-hour readings in a bar chart format, much like a barograph. They also account for other atmospheric readings such as wind and humidity to make accurate weather forecasts. In embodiments, a weather variable PCB 810 may receive measurements and/or readings from a digital barometer 813 and may communicate these measurements to a movement control PCB 895. In embodiments, for example, a movement control PCB 895 may receive digital barometer measurements (e.g., altitude measurements), analyze and/or process these measurements, and determine necessary movements by a stem assembly 106, a center support assembly 107, and/or arm support assembly 108 (of FIGS. 1A and 1B) or a lower support assembly 187 and/or upper support assembly 191 of FIG. 1C (e.g., may automatically receive, analyze and process these measurements and automatically determine movements). In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108 of FIGS. 1A and 1B or a lower support assembly 187 and/or upper support assembly 191 of FIG. 1C. In embodiments, for example, a movement control PCB 895 and/or an integrated computing device 860 may receive digital barometer measurements and generate a weather forecast for an area being served by a shading object and/or umbrella.

In embodiments, a sensor module 750 may comprise a temperature sensor 814, which may generate and provide a temperature reading for a shading object environment. In embodiments, a weather variable PCB 810 may receive measurements and/or readings from a temperature sensor 814 and may communicate these measurements to a movement control PCB 895. In embodiments, for example, temperature measurements received by a movement control PCB 895 from a temperature sensor 814 may be utilized to determine and/or calculate an amount of time an individual should be outside, and this amount of time may be communicated to an individual via a sound system (communicated audibly), via a display and/or monitor, and/or wirelessly to an external computing device. In embodiments, computer-readable instructions fetched from a memory may be executed by a processor to automatically capture temperature measurements, communicate temperature measurements and generate commands, instructions and/or signals in response to received or communicated temperature measurements.

In embodiments, a sensor module 750 may comprise a humidity sensor 816, which may provide humidity measurements in an environment where a shading object, umbrella or shading charging system is located. In embodiments, a weather variable PCB 810 may receive measurements and/or readings from a humidity sensor 816 and may communicate these measurements to a movement control PCB 895. In embodiments, for example, humidity measurements received by a movement control PCB 895 from a humidity sensor 816 may be utilized to determine and/or calculate an amount of time an individual should be outside, and this amount of time may be communicated to an individual via a sound system (communicated audibly), via a display and/or monitor, and/or wirelessly to an external computing device. In embodiments, a movement control PCB 895 may receive humidity sensor readings and/or temperature sensor readings and determine that a misting system and/or cooling system should be activated. In embodiments, a movement control PCB 895 may generate commands, instructions and/or signals and communicate the same to a misting system 1420 and/or a misting system controller to activate a misting and/or cooling system to deal with high humidity and/or high temperature environments and/or situations. In embodiments, computer-readable instructions fetched from a memory may be executed by a processor to automatically capture temperature and/or humidity measurements, communicate temperature and/or humidity measurements and generate commands, instructions and/or signals in response to received and communicated humidity and temperature measurements.

In embodiments, a sensor module 750 may comprise a wind sensor 817, which may provide wind speed and/or wind direction information at a top and/or a middle of a shading object, umbrella, and/or shading charging system. In embodiments, a weather variable PCB 810 may receive measurements and/or readings from a wind sensor 817 and may communicate these measurements to a movement control PCB 895. In embodiments, for example, a movement control PCB 895 may receive wind speed measurements analyze and/or process these measurements, and determine necessary movements by a stem assembly 106, a center support assembly 107, and/or arm support assembly 108 of FIGS. 1A and 1B or a lower support assembly 187 and/or upper support assembly 191 of FIG. 1C. In embodiments, a movement control PCB 895 may communicate commands, signals, and/or instructions to a first motor controller PCB 880 (azimuth), a second motor controller 885 (elevation), and/or a third motor controller PCB 890 (actuation) to cause movements of a stem assembly 106, a center support assembly 107, and/or arm support assembly 108. In embodiments, if a wind speed is higher than a predetermined threshold, a movement control PCB 895 may communicate commands, instructions, and/or signals to motor controllers to cause a shading object to be retracted and moved to a rest position. Although the description above corresponds to the intelligent umbrella of FIGS. 1A and 1B, the description applies to similar components and/or assemblies in the intelligent shading charging system of FIG. 1C. In embodiments, computer-readable instructions fetched from a memory may be executed by a processor to automatically capture wind speed measurements, communicate wind speed measurements and generate commands, instructions and/or signals in response to received and communicated wind speed measurements.

In embodiments, a shading object, intelligent umbrella and/or intelligent shading charging system may comprise one or more digital cameras 857 and/or other analog-based cameras. In embodiments, one or more cameras 857 may comprise an optical system and/or an image generation system. In embodiments, digital cameras 857 may display images on a screen immediately after being captured. In embodiments, one or more digital cameras 857 may store and/or delete images from a memory associated with a digital camera. In embodiments, one or more digital cameras 857 may capture, record and/or moving videos with or without sound. In embodiments, digital cameras 857 may also incorporate computer-readable and computer-executable instructions which, which when retrieved from a non-volatile memory, loaded into a memory, and executed by a processor, may crop and/or stitch pictures, and/or perform other image editing on captured images. For example, image stitching is a process of combining multiple photographic images with overlapping fields of view to produce a segmented panorama and/or high-resolution image. In embodiments, a digital camera may also internally perform video stitching. In embodiments, other computing devices, components and/or assemblies within a shading object, umbrella and shading charging system may perform image stitching, video stitching, cropping and/or other photo editing. In embodiments, computer-readable instructions loaded into a memory of a movement control PCB 895 and/or integrated computing device 860, may be executable by a processor to perform image stitching, video stitching, cropping and/or other photo editing after receiving communicated images, videos, and/or audio. In embodiments, computer-readable instructions may be loaded into a memory located within a shading object, intelligent umbrella and/or intelligent shading charging system and executable by a processor on an integrated computing device to perform the above-identified photo editing.

In embodiments, cameras may capture images of an area around, surrounding, and/or adjacent to shading objects, intelligent umbrellas, and/or intelligent shading charging systems. In embodiments, a stem assembly 106 and/or a central support assembly 107 may comprise a camera 857.

In embodiments, a stem assembly 106 and/or center support assembly 107 may rotate (e.g., up to 360 degrees) about a vertical axis with respect to a base assembly 105—FIGS. 1A and 1B) (or a lower support assembly 187 and/or an upper support assembly 191 may rotate about and/or around a housing and/or enclosure 182—FIG. 1C) and this may allow a camera to capture images, videos and/or sound corresponding to 360 degrees of an area surrounding, around and/or adjacent to a shading object, intelligent umbrella and/or intelligent shading charging system. In embodiments, a camera 857 and/or other components or assemblies (as discussed above) may stitch or combine images and/or videos to provide a panoramic image of the area. The ability of a shading object to rotate allows a benefit of panoramic image capture and not just an area where a camera is initially oriented. In embodiments, a camera 857 may have one or more images resolutions (e.g., 1 Megapixel (MP), 3 MP, 4 MP, 8 MP, 13 MP and/or 38 MP) that are selectable and/or adjustable.

Figure 17A:
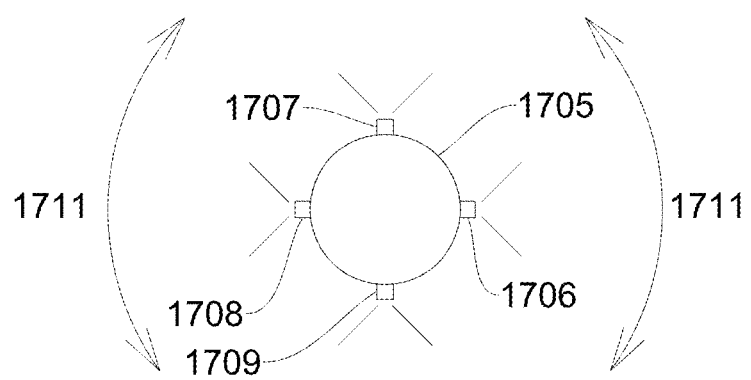
FIG. 17A illustrates an intelligent umbrella comprising four cameras according to embodiments.
Figure 17B:
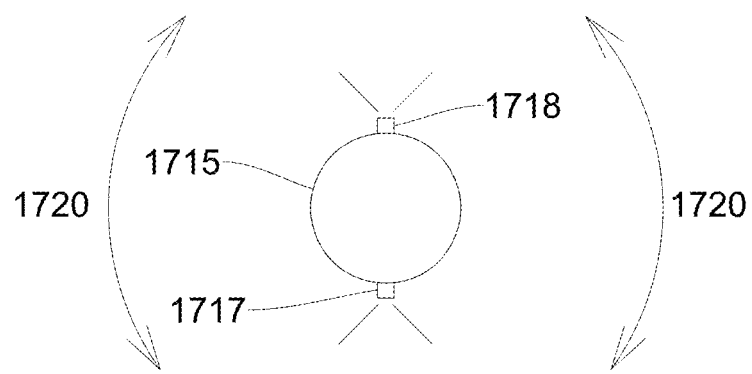
FIG. 17B illustrates an intelligent umbrella comprising two cameras according to embodiments.
Figure 17C:
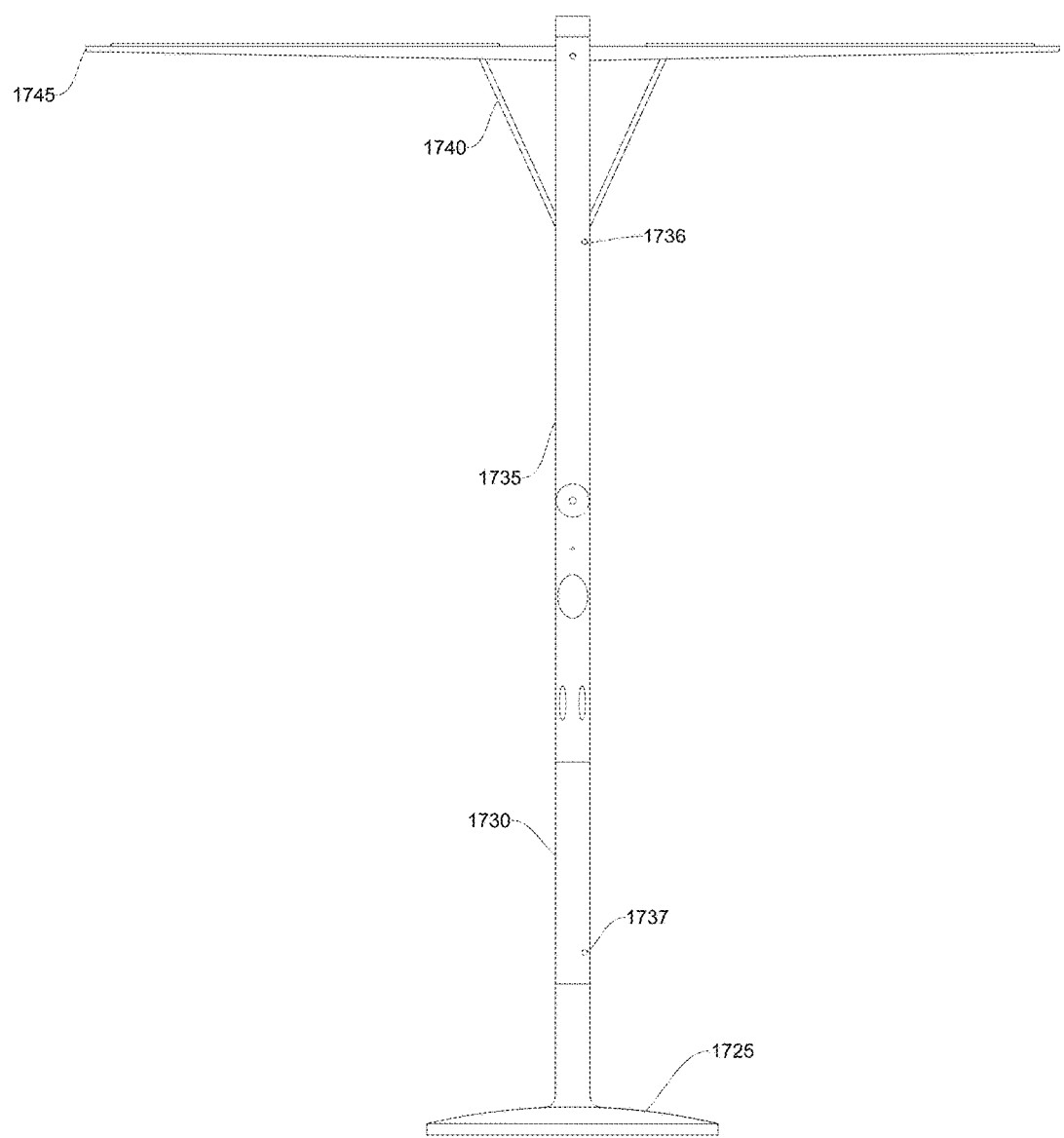
FIG. 17C illustrates an intelligent umbrella comprising a camera at a first elevation and a camera at a second elevation.

In embodiments, a shading object, intelligent umbrella and/or intelligent shading charging system may comprise one or more cameras (e.g., digital cameras), which allows better image coverage of an area surrounding a shading object, intelligent umbrella and/or shading charging system without requiring movement of a stem assembly 106 and/or center support assembly 107 (FIGS. 1A and 1B) and/or lower support assembly 187 and/or upper support assembly 191 (FIG. 1C). FIGS. 17A, 17B and 17C illustrate placement of multiple cameras within shading objects, intelligent umbrellas and/or intelligent shading charging systems according to embodiments. In embodiments, for example FIGS. 1A and 1B, a center support assembly 107 may comprise four cameras, with each camera installed approximately right angles from the other cameras. FIG. 17A illustrates potential placement of four cameras 1706 1707 1708 and 1709 in a shading object, intelligent umbrella and/or intelligent shading charging system. In FIG. 17A, the cameras 1706 1707 1708 and 1709 may be integrated into or placed into a stem assembly, a central support assembly (FIGS. 1A and 1B), a lower support assembly and/or an upper support assembly (FIG. 1C), all which are represented by reference number 1705 in FIG. 17A. In utilizing four cameras placed to provide maximum coverage, a shading object, intelligent umbrella and/or intelligent shading charging system may not need to move and/or rotate in order to capture images, video and/or sound of more of an area surrounding the object, umbrella and shading charging system. This may be effective in situations where cameras may be activated without individuals and/or owners knowing that the cameras have been activated, (e.g., in emergency situations, robberies and/or other life threatening situations). In embodiments, in these situations, cameras may be automatically activated or initiated. Cameras may be activated and capture up to a 360 degree view of an area or environment without movement of support assemblies of shading object, intelligent umbrellas and/or intelligent charging systems. In embodiments, in addition, the stem assembly, a central support assembly (FIGS. 1A and 1B), a lower support assembly and/or an upper support assembly (FIG. 1C) may rotate with respect to a base assembly (FIGS. 1A and 1B) and/or a housing and/or enclosure (FIG. 1C). The rotating of the stem assembly, a central support assembly (FIGS. 1A and 1B), a lower support assembly and/or an upper support assembly (FIG. 1C) is illustrated and/or represented by reference number 111 in FIG. 17A. In FIGS. 17A, 17B and/or 17C, lines radiating from cameras may represent a start of an image capture area for a digital camera.

In FIG. 17B, a stem assembly, a central support assembly (FIGS. 1A and 1B), a lower support assembly, and/or an upper support assembly (FIG. 1C), all which are represented by reference number 1715 in FIG. 17B may house and/or have integrated two cameras 1716 1717. In embodiments, cameras 1716 1717 may be placed directly opposite each other across a radius of a stem assembly, central support assembly, lower support assembly and/or upper support assembly 1715. In embodiments, cameras 1716 and 1717 may be placed approximately between 30 to 180 degrees apart from each other in order to increase an area of which images may be captured of an area surrounding, around and/or adjacent to the shading object, intelligent umbrella and/or intelligent shading object. In FIG. 17B, cameras 1716 1717 are placed approximately 180 degrees from each other around a circumference of support assemblies of the shading object, intelligent umbrella and/or intelligent shading charging system. In embodiments, a stem assembly, central support assembly, lower support assembly and/or upper support assembly 1715 may be rotated with respect to a base assembly (FIGS. 1A and 1B) and an enclosure and/or housing (FIG. 1C) to capture a larger area around, surrounding and/or adjacent to the shading object, umbrella and/or shading charging system. This rotation is illustrated and represented by reference number 1720

FIG. 17C illustrates a shading object, intelligent umbrella, and/or an intelligent shading charging system comprising two cameras installed at different elevations. In FIG. 17C, a shading object and/or intelligent umbrella may comprise a base assembly 1725, a stem assembly 1730, a central support assembly 1735, one or more arm support assemblies 1740, one more arm/blades and/or a shading fabric 1745. In addition, a shading object may comprise a low elevation camera 1737 and a higher elevation camera 1736. In embodiments, having a low elevation camera 1737 and/or a high elevation camera 1736 allows a shading object and/or an intelligent umbrella to capture images from more than one perspective and/or orientation. For example, a low elevation camera 1737 may capture images, sounds, and/or videos from a waist high and/or chest high level of an individual and a high elevation camera 1736 may capture images, sounds, and/or videos from a high level (e.g., above an individual's head). This may be beneficial to see objects from a top perspective.

In embodiments, cameras 857 may be adjustable as to orientation and/or perspective. In embodiments, cameras 857 may be automatically adjustable. In embodiments, a shading object, intelligent umbrella and/or intelligent shading charging may comprise canisters, hinging assemblies in which cameras may be located. In embodiments, canisters and/or hinging assemblies may be adjustable to change an orientation of a camera with respect to the shading object, intelligent umbrella and/or intelligent shading charging system. In embodiments, canisters and/or hinging assemblies may be adjustable to allow cameras 857 to be moved between 0 to 180 degrees from an original position and/or orientation. In embodiments, each of the one or more cameras 857 (e.g., cameras 1706 1707 1708 1709 in FIG. 17A) may be independently adjustable. For example, in FIG. 17C, low elevation camera 1737 may be rotated in an upwards direction 15 degrees and upper elevation camera 1736 may be rotated in an upwards or downwards direction 30 degrees. The movements and/or orientations of the digital cameras 857 may be independently adjustable.

In embodiments, one or more cameras 857 may also be located on a top portion of a shading object (e.g., located on and/or within a sensor module positioned 750 on top of a center support assembly 107, located on top of an arm/blade 108, and/or located on a shading fabric 715). Although the description above corresponds to the intelligent umbrella of FIGS. 1A and 1B, the description applies to similar components and/or assemblies in the intelligent shading charging system of FIG. 1C. In embodiments, if a camera 857 is located on a top portion of a shading object, intelligent umbrella and/or intelligent shading charging system, images, sounds and/or videos may be captured above a level of a shading fabric. In addition, a camera 857 located on a top portion of a shading object, intelligent umbrella and/or intelligent shading charging system may capture images, sounds, and/or videos of objects in a sky or just of a horizon or sky. For example, in embodiments, a camera 857 located on a top portion may capture images of mountains and/or buildings that are in a skyline. This may be beneficial in situations where there is a fire in the mountain or an issue with a building or someone wants to monitor certain aspects of a building (e.g., if certain lights are on). Further, one or more cameras 857 located on a top portion of a shading object, intelligent umbrella and/or intelligent shading charging system may capture images, sounds, and/or videos of a night time sky (e.g., stars). In addition, one or more cameras 857 located on a top portion of a shading object, intelligent umbrella and/or intelligent shading charging system may capture images, sounds, and/or videos of objects moving and/or flying in the sky and/or horizon.

In embodiments, cameras 857 may be activated by messages, signals, instructions and commands. In embodiments, cameras may be automatically activated and/or initiated in response to computer-readable instructions fetched from a memory may be executed by a processor, controller and/or signals from computing devices (e.g., integrated into an umbrella, shading object, and/or shading charging system and/or external computing devices (e.g., mobile communication devices). In embodiments, computer-readable instructions fetched from a memory may be executed by a processor, controller or computing device to instruct components and/or assemblies and communicate messages, signals, instructions and/or commands to the camera to activate, turn on, change modes, turn off, change focus and/or change capture image resolution (which may occur automatically. In addition, computer-readable instructions fetched from a memory may be executed by a processor, controller or computing device may cause messages, signals, instructions, and/or commands to be generated which may activate a camera and software stored therein to perform image stitching, video stitching, image editing and/or cropping. In embodiments, a processor, controller, and/or wireless transceiver in a shading object, intelligent umbrella and/or intelligent shading charging system may communicate messages, signals, instructions and/or commands to activate a camera in order to perform functions and/or features described above. In embodiments, a computing device 860, separate from a controller and/or processor in a motion control PCB 895, and/or other locations in a shading object, may communicate messages, signals, instructions and/or commands to activate a camera in order to perform functions and/or features described above (which may occur automatically). In embodiments, a wireless transceiver and/or a processor/controller in a computing device 860 may communicate messages, signals, instructions and/or commands to activate a camera (e.g., these communications may occur automatically).

In embodiments, a camera 857 may communicate captured images, sounds and/or videos to a memory of a motion control PCB 895. In embodiments, a camera 857 may capture images, sounds, and/or videos automatically. In embodiments, a camera may communicate captured images, sounds and/or videos to a memory of a computing device separate from a processor and/or controller in a motion control PCB 895. In embodiments, a camera may communicate captured images, sounds and/or videos to an external computing device (e.g., for storage and/or streaming). In embodiments, a camera may communicate captured images, sounds, and/or videos utilizing wired (e.g., utilizing Ethernet, USB, or similar protocols and transceivers) and/or wireless communication protocols (e.g., utilizing 802.11 wireless communication protocols and transceivers). In embodiments, communication of images, video and/or sounds may be communicated automatically.

In embodiments, a shading object, intelligent umbrella and/or intelligent shading charging system may comprise one or more of the digital cameras 857 may comprise an infrared detector, which may comprise one or infrared light sources and an infrared sensor. In embodiments, an infrared detector may generate a signal indicating that an object is located within an area being monitored or viewed. In embodiments, if an infrared detector generates a signal indicating that an object (and/or individual) is present, a camera 857 may be activated (e.g., automatically and without intervention) and begin to capture images and/or video, with or without sound, and transmit captured images and/or video, with or without sound, to a computing device 860. In embodiments, if an infrared detector generates a signal indicating that an object (and/or individual) is present, a lighting assembly (e.g., LED lights) 870 may also be activated and lights may be directed in an area surrounding the shading systems and/or directly to an area where an object is detected, which results in better images and/or video of an area surrounding a shading object, umbrella and/or shading charging system being captured and/or communicated to a computing device. This is an additional benefit of a shading object, umbrella and/or shading charging system provides additional benefits of not only capturing images of its surrounding area but also being utilized as a security device for an environment.

In embodiments, a shading object, intelligent umbrella and intelligent shading charging system may comprise one or more cameras 857, which may comprise thermal imaging cameras which include a special lens, an infrared light, and an array of infrared-detector elements. In embodiments, a thermal imaging camera comprises a special lens may focus on infrared light emitted by all objects within an area surrounding and/or adjacent to a shading object, intelligent umbrella, and/or shading charging system. In embodiments, a focused light may be scanned by a phased array of infrared-detector elements. In embodiments, one or more detector elements may generate a very detailed temperature pattern, which may be referred to as a thermogram. In embodiments, a detector array may take a short amount of time (e.g., about one-thirtieth of a second) to obtain temperature information to make a thermogram. In embodiments, detector elements from a thermogram may be converted and/or translated into electric impulses and electrical impulses may be sent to a signal-processing unit. In embodiments, a signal-processing unit may be a PCB with a dedicated chip that translates received information (electrical impulses) into thermal images and/or thermal video. In embodiments, a signal-processing unit may communicate thermal images and/or thermal video either to a display (e.g., a shading object display and/or a display on a computing device communicating with an intelligent shading object). In embodiments, a signal-processing unit of a thermal imaging camera 857 may communicate thermal images and/or thermal video to a shading object computing device 860 for analysis, storage and/or retransmission to an external computing devices (e.g., these actions may occur automatically and without intervention). In embodiments, a thermal image may appear as various colors depending on and/or corresponding to an intensity of an infrared image. In embodiments, a thermal imaging camera allows an additional benefit of not having to activate a lighting assembly in order to capture images and/or videos of an area surrounding an intelligent shading umbrella or object (e.g., which would not alert an intruder that a camera is capturing images, videos and/or audios). In embodiments, an infrared detector may activate a thermal imaging camera 857 automatically upon detection of movement. In embodiments, a thermal imaging camera may activate on its own (e.g., automatically) due to movement of an intruder and/or object, or may be periodically or continuing capturing images and/or video.

Figure 10:
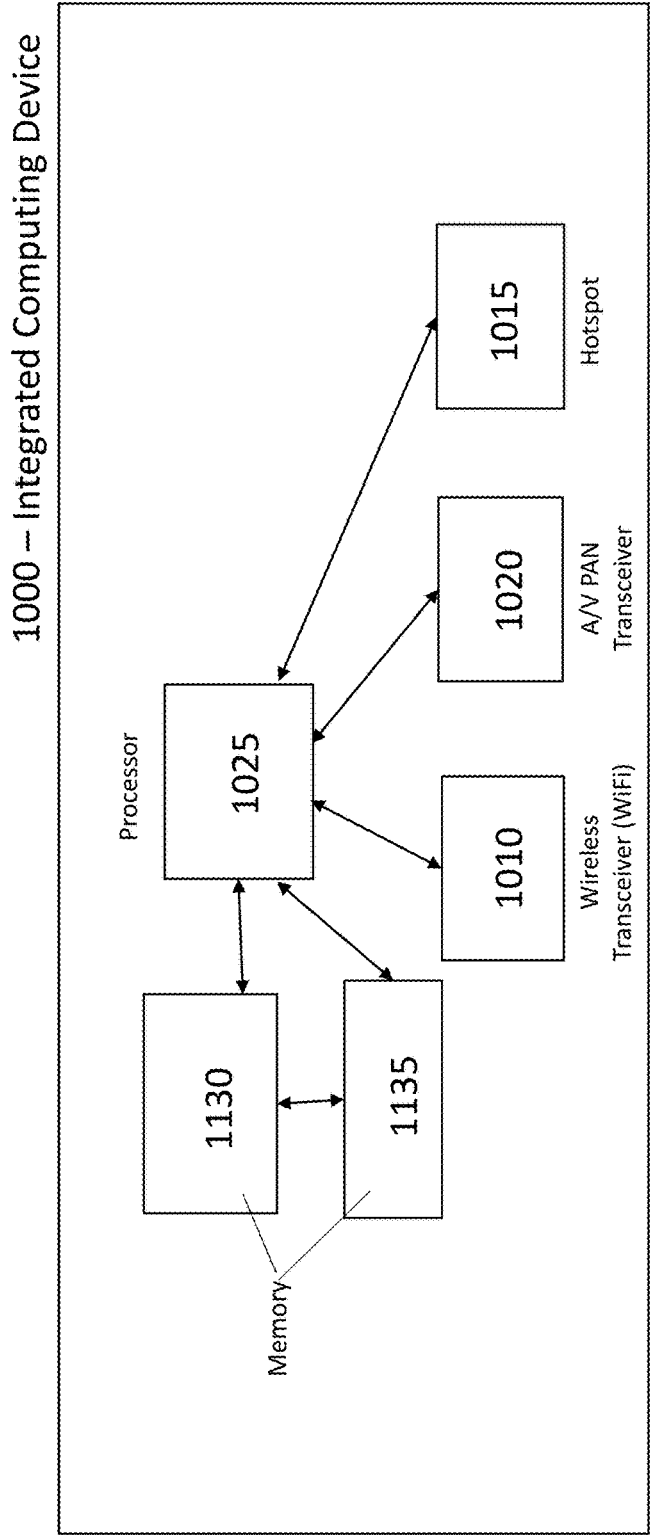
FIG. 10 illustrates a shading object or umbrella computing device according to embodiments.

FIG. 10 illustrates a shading object, umbrella and/or shading charging systems comprising integrated computing device according to embodiments. In embodiments, an integrated computing device PCB 1000 may comprise a wireless WiFi or LAN wireless transceiver 1010 (which may or may not operate as a wireless hotspot and/or router), a separate wireless hotspot device 1015, one or more audio/video transceivers 1020 (e.g., PAN transceivers), one or more processors 1025, one or more non-volatile memories 1030 and one or more memory components 1035. In embodiments, many of the components may reside on a computing device PCB. In embodiments, a separate PCB may house or have some of the above-listed components (e.g., WiFi transceiver 1010, and/or wireless hotspot device 1015) mounted thereon and a shading object computing device may comprise non-volatile memory 1030 (e.g., a flash drive, a hard drive, a removable disk drive), and a volatile memory 1035 such as RAM, and on or more processors 1025.

In embodiments, computer-readable and/or computer-executable instructions may be stored in non-volatile memory, fetched by one or more processors 1025, loaded into RAM 1035, and executed by one or more processors 1025 to initiate and/or execute functions, features and/or processes. In embodiments, a computing device processor may execute and initiate data intensive functions, execute processes such as a healthcare process (e.g., selecting a healthcare option or icon from a dashboard of a mobile or software application), a security process (e.g., selecting a security option or icon from a dashboard of a mobile or software application), an energy process or application (e.g., selecting an energy option or icon from a dashboard of a mobile or software application), a weather application or processor (e.g., selecting a weather option or icon from a dashboard of a mobile or software application), and/or communicating with external devices (e.g., wireless access points, portable electronic devices, servers, networks, existing security systems). In embodiments, software may be resident on computing device of an object, umbrella and/or shading charging system, a mobile computing device, and/or multiple servers. In embodiments, an integrated computing device 860 and/or a computing device PCB may consume more power due to, for example, higher data throughput and higher utilization time. Having a computing device integrated into an intelligent shading object, umbrella, and/or shading charging system provides a benefit, as compared to prior art systems, of allowing an intelligent shading object, umbrella and/or shading charging system to run, initiate and/or execute software applications, communicate with data intensive devices, components and/or assemblies, such as cameras and/or audio system, utilize WiFi or other wireless communication transceivers, operate as a WiFi hotspot (or other wireless communication hub) and communicate with external computing devices to transfer data obtained by the intelligent shading object, umbrella, and/or shading charging system. In embodiments, these functions and/or processes may be executed automatically without intervention. These functions and/or features are not included in prior art shading systems.

In embodiments, an integrated computing device 1000 may communicate with application servers, mobile applications servers, proxy servers, mobile communication devices, and/or other computing devices on a global communications network (e.g., the Internet). In embodiments, a shading object computing device may handle data and/or command communications between external devices and a shading object, umbrella and/or shading charging system. In embodiment, an integrated computing device 860 may handle intra-shading object communications requiring more extensive processing power and/or higher data transfer rates. In embodiments, a shading object center support assembly 107 may house an integrated computing device 860 and/or a computing device PCB. Although the description above corresponds to the intelligent umbrella of FIGS. 1A and 1B, the description applies to similar components and/or assemblies in the intelligent shading charging system of FIG. 1C. In embodiments, an integrated computing device 860 may be a Linux-based computing device (e.g., Raspberry PI) although other operating systems and/or other processor types may be utilized.

In embodiments, a shading object, umbrella, and/or shading charging system may comprise one or more transceivers to communicate with wireless access points utilizing a wireless communication protocol. In embodiments, one or more wireless transceivers may communicate voice and/or data communications to an access point, which in turn may communicate received voice and/or data communications to a packet-switched network (e.g., a global communications network such as the Internet, an intranet, or a private network) or a circuit-switched network (such as existing telecommunications system). In embodiments, an integrated computing device may comprise a WiFi (or wireless LAN) transceiver 1010 which may also operate as a hotspot and/or personal wireless access point. In embodiments, an integrated computing device 860 may comprise a separate and/or additional wireless hotspot 1015. In embodiments, a wireless hotspot may be operate as an wireless access point providing network and/or Internet access to portable electronic devices (e.g., smartphones, music players) or other electronic devices (personal computers and/or laptops) in public locations, where other wireless access points are not located (or being utilized for different purposes). If a computing device 860 comprises a wireless hotspot 1015 (or a wireless transceiver 1010 is operating as a hotspot), wireless communication devices (e.g., laptops, tablets, smartphones) may utilize a shading object as a communications hub. This may be beneficial in remote locations where no wireless access points are located, or in locations where wireless data or voice communications have been interrupted. In addition, if a shading object computing device and thus a shading object includes a wireless hotspot, image or video streaming, face-timing, application downloads, or other data intensive functions and/or applications may execute and be completed in a shorter amount of time then when using a PAN transceiver 865.

In embodiments, an integrated computing device 860 may store and/or execute shading object, umbrella and/or shading charging application software, which may be referred to as SMARTSHADE and/or SHADECRAFT application software. In embodiments, intelligent shading object, umbrella and/or shading charging system application software may be run and/or executed on a variety of computing devices including a computing device integrated within a shading object or umbrella. In embodiments, for example, shading object or umbrella application software may include computer-readable instructions being stored in non-volatile memories of a shading object computing device, a portable computing device (e.g., a smart phone, laptop, tablet, console and/or iPad), an application server, and/or a web application server, all of which may interact and communicate with each other. In embodiments, computer-readable instructions may be retrieved from memories (e.g., non-volatile memories) of these above-identified computing devices, loaded into volatile memories and executed by processors in the shading object computing device, portable computing device, application server, and/or mobile application server. In embodiments, a user interface (and/or graphical user interface or dashboard) for a shading object software application may be presented on a mobile computing device, via a user interface component or module, although other computing devices could also execute instructions and present a graphical user interface (e.g., dashboard) to an individual. In embodiments, shading object application software may generate and/or display (e.g., utilizing a user interface component and/or processor), a dashboard and/or graphical user interface (GUI) with different application (e.g., process) selections (e.g., weather, health, storage, energy, security processes and/or application processes selectable via buttons and/or icons). In embodiments, process selection may be initiated via voice controls and/or commands. In embodiments, shading object, umbrella and/or shading charging application software may control operation of a shading object, communicate with and receive communications from shading object assemblies and/or components, analyze information obtained by assemblies and/or components of a shading object or umbrella, integrate with existing home and/or commercial software systems, and/or store personal data generated by the shading object, and communicate with additional external computing devices.

In embodiments, a portable electronic device may also be referred to as a wireless communication device, a portable computing device, a mobile communications device, or a mobile computing device, all of which may be utilized interchangeably. In embodiments, a mobile computing device may also comprise a mobile application (e.g., computer-readable and/or computer-executable instructions), stored in a non-volatile memory. In embodiments, a mobile computing device may be mobile communication device, a smart phone, a flip phone, a tablet, a network computer, a laptop computer, and/or wearable computer technology. In embodiments, a mobile software application may be referred to as a SHADECRAFT or a SMARTSHADE mobile application or SMARTSHADE mobile application software. In embodiments, a mobile application (mobile app) may comprise computer-readable instructions stored in a non-volatile memory of a mobile computing device, which can be fetched from a memory and executed by a processor of a mobile computing device to perform specific functionality identified by and incorporated into the computer-readable instructions. In embodiments, this functionality may be controlling of, interacting with, monitoring of, and/or communicating with a shading object, umbrella and/or shading charging device. In embodiments, mobile application software, may be individual software units or modules with limited and/or specific functionality. In embodiments, mobile applications may be available for download from mobile application stores, such as Apple's and/or Android App Store. In embodiments, mobile apps may also be known as an app, a native app, a Web app, an online app, an iPhone app or a smartphone app and these terms may be used interchangeably throughout the specification.

An intelligent umbrella, shading object and/or shading charging system mobile software application allows a smartphone and/or tablet user/owner to control a number of operational aspects of an intelligent umbrella, shading object and/or a shading charging system (e.g., including moving and/or activating assemblies, components, and/or circuits), monitoring operational aspects, as well as activating, controlling and/or supplementing communications with external devices such as home security systems, retail and/or commerce systems, and/or remote storage systems (e.g., cloud-based video and/or audio storage systems). In addition, existing applications stored on and/or being utilized by the mobile computing devices (such as iTunes, Facebook, Instagram) may also interface and/or interface with SMARTSHADE software and/or an intelligent shading object, umbrella and/or shading charging system. For example, in embodiments, a user may be utilizing iTunes to listen to a song and/or album on a smartphone and/or tablet, and the selected music may also be communicated to the intelligent shading object, umbrella and/or shading charging system and played on an integrated or incorporated sound reproduction device (e.g., speaker) of the shading object via an audio receiver.

In embodiments, mobile application software (e.g., SMARTSHADE software) may communicate with a mobile application server and/or also an application server, as well as an intelligent shading object, umbrella and/or shading charging system. In embodiments, an application server may be a backend server. In embodiments, application servers may consist of components, such as web server connectors, computer programming languages, runtime libraries, database connectors, and administration software code which may be utilized to deploy, configure, manage, and connect these components on a web host. In embodiments, an application server may run and/or execute behind a web Server (e.g. an Apache or Microsoft IIS webs server) and may run and/or execute in front of an SQL database (e.g. a PostgreSQL database, a MySQL database, or an Oracle database). In embodiments, web software applications may be executable computer instructions which run and/or execute on top of application servers, and are written in computer programming language(s) an application server may support. In embodiments, web software applications may call runtime libraries and/or components an application server may offer. In embodiments, an application server may be referred to as a SMARTSHADE application server and/or a SHADECRAFT application server.

In embodiments, a mobile app server may be utilized in between a mobile app and an application server. In embodiments, a mobile application server may be mobile middleware software that interfaces with back-end systems (e.g., applications servers) to allow the mobile applications to communicate and interface with the application servers. In embodiments, a mobile app server may bridge a gap from existing infrastructure (e.g., application servers and/or networks and/or databases) to mobile computing devices (e.g., smart phones) and/or intelligent umbrellas, shading objects and/or shading charging systems. In embodiments, mobile application servers may take care of security, data management and other off-line requirements in order to minimize a load placed on application servers. In embodiments, a mobile application server may be referred to as a SHADECRAFT and/or SMARTSHADE mobile application server.

In embodiments, SMARTSHADE and/or SHADECRAFT application software (e.g., mobile application software) may comprise one or more application components and/or modules which may provide a user and/or individual with different features and/or functionality. For example, in embodiments, a SMARTSHADE and/or SHADECRAFT application software or system may comprise a personal care component and/or module; a shading object, umbrella, or shading charging system operation component and/or module; a shading object, umbrella or shading charging system accessory commerce component or module; a shading object, umbrella or shading charging system e-commerce component and/or module; and a shading object, umbrella or shading charging system security/monitoring component and/or module (e.g., which may include a connection to an Internet of Things). In embodiments, a SMARTSHADE and/or SHADECRAFT application software or system (e.g., mobile application software) may also provide storage or access to storage for an individual's personal information, preferences, device settings, digital products (e.g., movies, pictures, and/or music), and/or security information.

In embodiments, SMARTSHADE and/or SHADECRAFT application software may refer to software (e.g., computer-readable instructions) being executed by a processor on one or more of a mobile computing device (e.g., a smart phone or a tablet), an integrated computing device in an intelligent shading object, umbrella or shading charging system, an application server, a cloud server, and/or a mobile application server), or any combination thereof. In embodiments, different portions, components, modules of the SMARTSHADE application software may be located and executing on different devices and/or systems (e.g., mobile computing device, object, umbrella, shading charging system integrated computing device, application server, cloud server, mobile application server), and a user may be interacting and/or interfacing with one or more of the devices.

In embodiments, SMARTSHADE mobile application software (e.g., computer-readable instructions executed by a processor of a mobile communications device) may control operations of a shading object, intelligent umbrella and/or shading charging system. In embodiments, SMARTSHADE mobile application software may receive input and communicate messages, instructions, commands and/or signals directly and/or indirectly to a shading object, intelligent umbrella and/or shading charging system via wireless communication technologies.

In embodiments, a mobile computing device (e.g., smart phone) may communicate messages, instructions, commands and/or signals wirelessly directly to an intelligent shading object, umbrella, and/or shading charging system via a PAN (e.g., Bluetooth) transceiver and/or WiFi transceiver. In other words, in embodiments, messages, instructions, commands and/or signals from the mobile communications device may be communicated directly to a corresponding PAN transceiver and/or WiFi transceiver on an intelligent shading object, umbrella, and/or an intelligent shading charging system.

In embodiments, a mobile computing device (e.g., smart phone) may communicate instructions, messages, commands and/or signals to an application server and/or a mobile application server, which in turn may communicate instructions, messages, commands and/or signals to an intelligent shading object, umbrella and/or intelligent shading charging system. In embodiments, SMARTSHADE mobile application may receive input regarding rotation of an object, umbrella and/or shading charging system about an azimuth axis, and may communicate messages, instructions, commands and/or signals to the umbrella to cause the umbrella to rotate a support assembly (e.g., central support assembly) and/or a stem assembly about an azimuth axis as is illustrated at least by reference number 140 in FIG. 1B. In embodiments, as described above and below, input may be received via a touchscreen (e.g., a gesture, swipe, tap and/or other movement), via a camera (e.g., gesture recognition), via a user's voice, a keyboard, a mouse, a trackball, or other physical mobile computing device input device. Similarly, SMARTSHADE mobile application software may receive input regarding the following features and may communicate messages, instructions, commands and/or signals directly and/or indirectly to the umbrella, which results in the umbrella performing, initiating and/or activating the selected component, assembly and/or function:

a. Rotate a lower support assembly (and remainder of intelligent shading charging system) within a base assembly about an azimuth axis; as illustrated at least by reference number 188 in FIG. 1C.
b. Rotate an upper support assembly with respect to a lower support assembly about an elevation axis (or tilting axis) as is illustrated at least by reference number 160 in FIG. 1B and similarly reference number 192 in FIG. 1C
c. Deploy and/or retract arm support assemblies and/or arms/blades as illustrated at least in FIGS. 6A, 6B and 7.
d. Activate/deactivate one or more solar panels or solar arrays
e. Activate/deactivate one or more cameras
f. Place shading objects, intelligent umbrellas, and shading charging systems into low-power mode
g. Place shading object, intelligent umbrella, and shading charging system into emergency power mode.
h. Activate/deactivate one or more selected of sensors in a sensor assembly and/or other sensors in systems;
i. Activate/deactivate proximity detector; motion detector; tilt detector and/or obstacle detector
j. Activate voice recognition of shading object, intelligent umbrella and/or shading charging system.
k. Activate/deactivate one or more Bluetooth transceivers.
l. Activate/deactivate one or more WiFi transceivers.
m. Activate/deactivate cooling system.
n. Activate/deactivate one or more lighting assemblies and/or lighting system.
o. Activate/deactivate one or more audio transceivers.
p. Activate/deactivate infrared transceivers for remote control.
q. Activate/deactivate DC or USB charger assemblies.
r. Activate/deactivate wind sensors and/or wind turbines for intelligent shading object, intelligent umbrella, and/or intelligent shading charging system.
s. Activate/deactivate GPS transceiver and/or digital compass.
t. Activate/deactivate power tracking solar controller and/or converter.
u. Place motion control printed circuit board, other printed circuit boards, selected components and/or assemblies into low power mode and/or emergency.

In embodiments, a mobile computing device (e.g., smart phone) may communicate messages, instructions, commands and/or signals to an application server and/or a mobile application server, which in turn may communicate instructions, commands and/or signals to an intelligent shading object, umbrella and/or intelligent shading charging system to execute and/or initiate processes, software modules and/or other functionality utilizing components, assemblies and/or devices of the shading object, intelligent umbrella and/or shading charging system. In embodiments, as described above and below, input may be received via a touchscreen (e.g., a gesture, swipe, tap and/or other movement), via a camera (e.g., gesture recognition), via a user's voice, a keyboard, a mouse, a trackball, or other physical mobile communication device input device. Similarly, SMARTSHADE mobile application software may receive input regarding the following features and may communicate messages, instructions, commands and/or signals directly and/or indirectly to the umbrella, which results in the umbrella performing, initiating and/or activating selected submodules, processes, and/or software functions described below, e.g., including but not limited to processes described in FIGS. 15A-I and 16A-D. As discussed above, this software may be initiated by computer-readable instructions stored in memory of a mobile computing device and executed by one or more processors of a mobile computing device, which presents a user interface (e.g., graphical user interface) including a dashboard where selections of processes may be made. In embodiments, a user interface is generated via a user interface component.

Figure 15A:
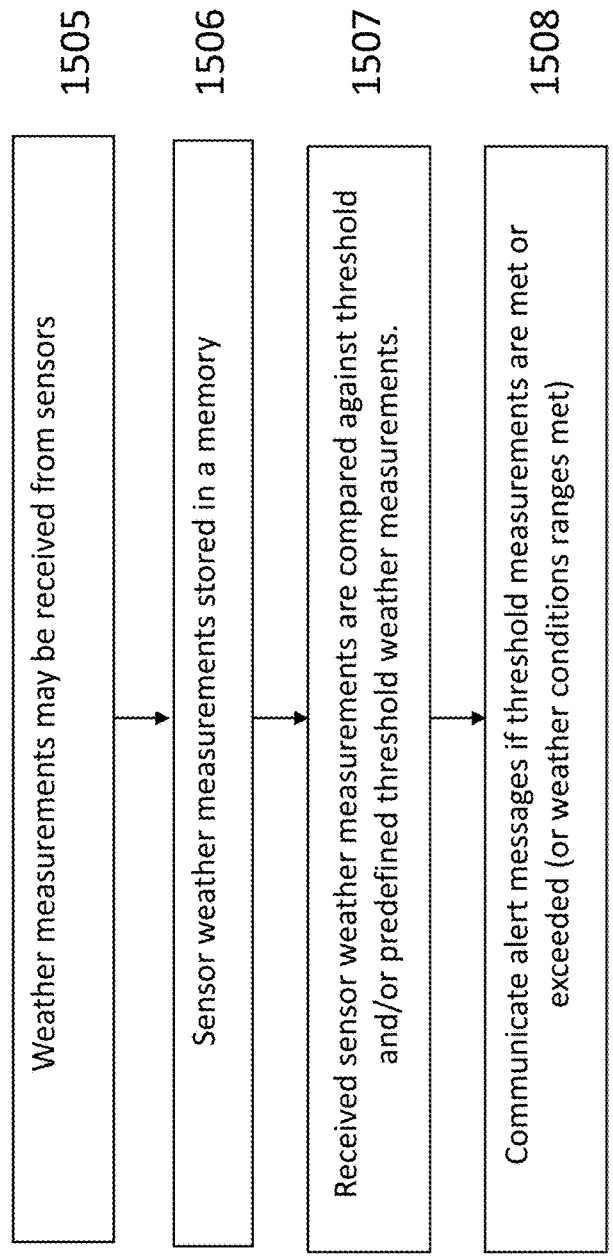
FIG. 15A illustrates an automated weather process according to embodiments.

FIG. 15A illustrates an automated weather process according to embodiments. In embodiments, when implementing a weather process (e.g., executing a weather process from a dashboard on a mobile software application), an integrated computing device 860 may leverage shading object, intelligent umbrella and/or intelligent shading charging system sensor measurements, other component measurements, and measurements from other nearby similar devices and can communicate and/or transfer weather measurements for a microclimate with unprecedented accuracy and improve an individual's understanding of microclimate weather conditions. In embodiments, weather measurements and/or information may be obtained and/or received 1505 from sensors in a sensor module 750 via a weather variables PCB 810 and/or a shading object moving control PCB 895. In embodiments, sensor measurements stored may be air quality measurements, UV measurements, temperature measurements, humidity measurements, wind measurements, and/or barometer measurements. In embodiments, sensor measurements may be stored 1506 in a memory 1030 and/or 1035 of an integrated computing device 1000. Individuals may be presented with localized and microenvironment weather conditions with unprecedented accuracy due to localization of these microclimate measurements. This is an improvement on existing systems where sensor readings were normally obtained in public places and not to such a micro level in an embodiment. In embodiments, capturing of weather measurements, communicating of measurements, and storage or analyzation of measurements may automatically occurred and/or initiated.

In embodiments, weather thresholds and/or preferred weather conditions may be established and/or set for intelligent shading objects, umbrellas, and/or shading charging systems. In embodiments, an intelligent umbrella system may automatically compare 1507 received sensor weather measurements against threshold and/or predefined threshold weather measurements. If the computing device automatically executes the weather process (or software application) determines that these threshold weather measurements and/or weather conditions have occurred, the weather process may automatically communicate 1508 an alert message identifying thresholds have been met and/or exceeded. In embodiments, an intelligent umbrella software system may automatically communicate an alert or communication in a message, command, instruction and/or signal to a display device for display device to a user and/or to a sound reproduction device (e.g., audio subsystem) for playback to a user. In embodiments, for example, users may also set desired weather and/or environment condition parameters that a user may wish to enjoy and/or wish to avoid. In embodiments, a computing device may store the set and/or established environmental condition parameters in a memory and/or database of a computing device of the intelligent umbrella and/intelligent charging shading system. For example, in embodiments, a user may establish that he and/or she may be wish to be alerted if a temperature is over 70 degrees (so that a user may enjoy the umbrella or shading charging system) and/or also if a temperature exceeds 95 degrees (in order for a misting system to be activated to cool down an environment). In addition, for example, parameters may be set so that he or she may wish to be alerted in a wind speed over 15 miles per hour and/or if a relative humidity is over 60%. Further, for example, a user may wish to be alerted if an air quality reading has a particulate reading or other measurement determined to be unsafe. Likewise, settings may be established which identify conditions under which the user may wish to start utilizing an intelligent umbrella system. For example, a user may wish to start enjoying an outdoor environment and utilize an intelligent shading umbrella if it is after 9:00 am but before 6:00 pm, a temperature is over 65 degrees Fahrenheit, a humidity reading is under 75%, an air quality measurement indicates air with minimal contaminants, and/or a wind reading is less than 10 miles per hour. For example, in embodiments, if one or more of these parameters are met, as determined by received sensor measurements, an intelligent umbrella and/or shading charging system may automatically generate an alert message, command, instruction, and/or signal to alert of dangerous and/or desired conditions.

Figure 15B:
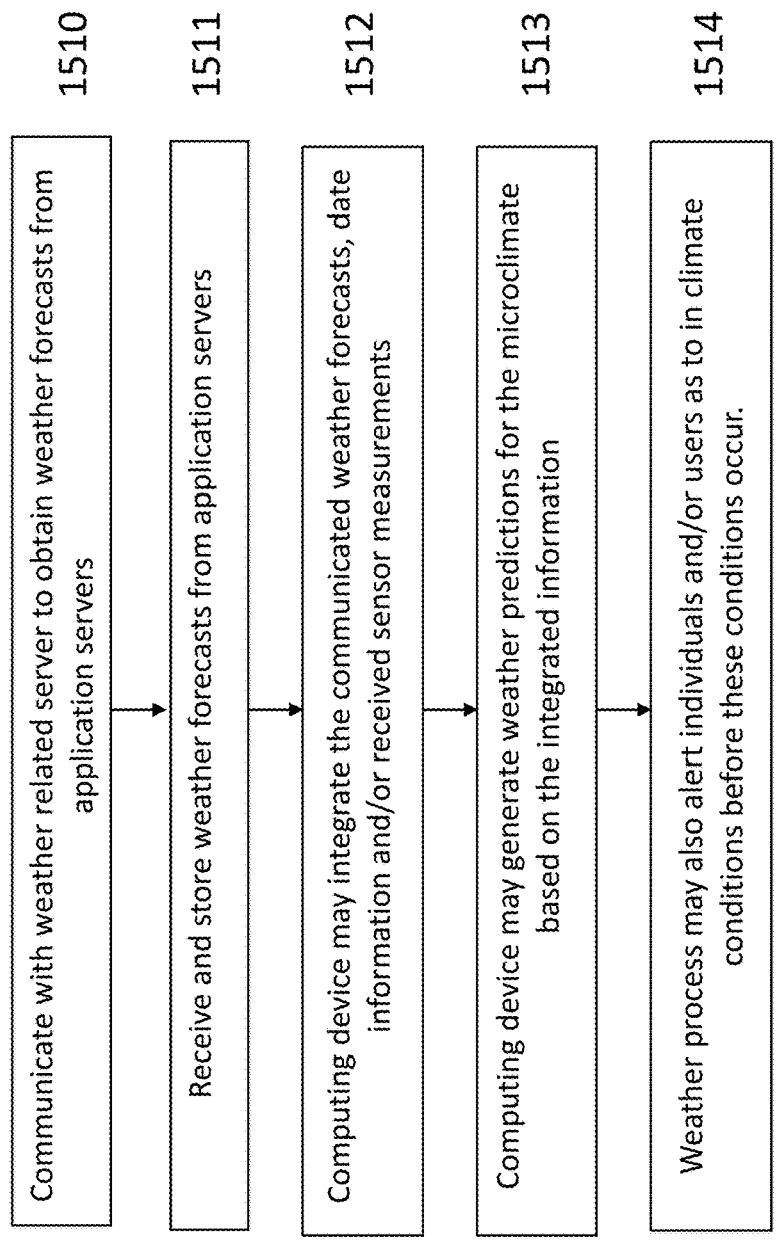
FIG. 15B illustrates predicting weather conditions in a weather process according to embodiments.

In embodiments, a weather process executing on a computing device of an intelligent umbrella or an intelligent shading charging system may also predict weather conditions for an upcoming period of time. FIG. 15B illustrates predicting weather conditions in a weather process according to embodiments. Predicting weather conditions in a weather process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15C:
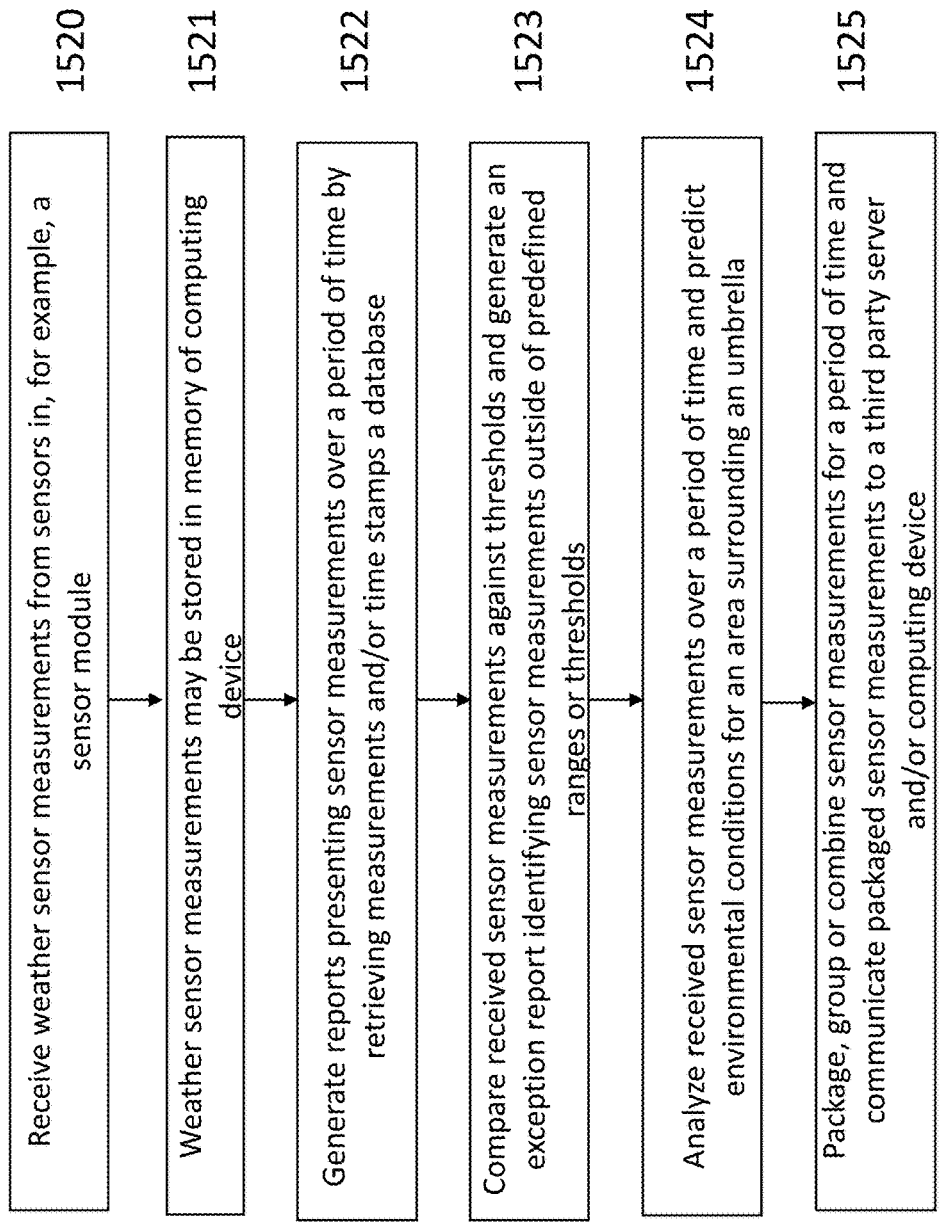
FIG. 15C illustrates a weather data gathering process on a periodic basis according to embodiments.

FIG. 15C illustrates a weather data gathering process on a periodic basis according to embodiments. A weather data gathering process in a weather process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, an intelligent umbrella and/or shading charging system may receive communicated sensor measurements and/or solar panel measurements. In embodiments, an intelligent umbrella and/or shading charging system may store communicated sensor measurements and/or solar panel measurements. In embodiments, an intelligent umbrella and/or shading charging system may integrate received sensor measurements and/or solar panel measurements with other software application software executing on one or more processors of the computing device of an intelligent umbrella system. In embodiments, details of the above process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, computer-readable and computer-executable instructions may be fetched from a non-volatile memory in an integrated computing device, loaded into a volatile memory, and may be executed by a processor in a computing device to recognize an individuals' voice and/or to perform a voice recognition process. This may occur in response to a user selecting a voice recognition button or icon on a dashboard of a shading object application software. In embodiments, the computer-readable instructions may be executed automatically and autonomously after receiving voice commands from a user. In embodiments, a shading object central support assembly may also comprise one or more microphones. In embodiments, a shading object fabric, arms/blades and/or shading object arm support assemblies may comprise one or more microphones installed or attached thereto, or integrated within. In embodiments, for example, a user in a physical vicinity of a shading object may speak into a microphone, located on or within the shading object may capture a user's voice and generate an analog voice signal. In embodiments, an analog-to-digital converter may convert a voice to a digital signal and transfer the voice digital signal to a shading object computing device. In embodiments, a shading object computing device system may analyze the received digital voice, extract commands or information, and generate instructions based on the received digital voice signal. In embodiments, a computing device voice recognition process may recognize a voice command in a communicated voice signal, and then convert a recognized voice command into a text (or digital representation) command. In embodiments, the text command (or other digital representation of the command) may be communicated to other PCBs, subassemblies, and/or components of an intelligent shading object and/or umbrella. In embodiments, if commands are successfully converted and/or executed, a computing device voice recognition process may generate a confirmation audio signal. The computing device 860 may communicate the confirmation audio signal to an audio system 875 and/or speakers 940. In embodiments, these instructions may be communicated to other PCBs, subsystems, subassemblies, and/or components of an intelligent shading object or umbrella in order to automatically and/or autonomously comply or react to voice instructions. For example, an integrated computing device may extract from a received voice signal, a command to obtain sensor measurements, (e.g., sunlight intensity, ozone, and/or wind measurements or reading). In embodiments, a computing device voice recognition process may provide support for additional commands as compared to a voice recognition engine 815. In embodiments, a computing device voice recognition process may allow for more customization (e.g., additional commands, dialects and/or languages) and be more directed to interacting with an intelligent shading object and/or umbrella. In embodiments, a computing device voice recognition process may integrate with an artificial intelligence voice engine. In embodiments, an artificial intelligence voice engine may be located in an integrated computing device. In embodiments, a computing device voice recognition process may communicate a voice signal to an artificial intelligence voice engine located in an external computing device. In this illustrative embodiment, a computing device 860 may communicate audio signals (including voice commands) to the external computing device, where the artificial intelligence voice engine may translated the audio signal to text or another digital representation, and then communicate the text or digital representation of the audio signal back to the computing device 860 for use by the computing device voice recognition process. In embodiments, a computing device 860 may also comprise a voice synthesis process for generating audio signals (e.g., including commands, prompts or responses) and communicating these audio signals to an audio system 875 and/or one or more speakers. In embodiments, In embodiments, computer-readable and computer-executable instructions may be fetched from a non-volatile memory in an intelligent shading object, loaded into a volatile memory, and may be executed by a processor in a shading object computing device 860 to generate audio signals (e.g., synthesize speech and/or voice) and/or perform a voice synthesis process. In embodiments, a computing device voice synthesis process generates voice commands, responses or alerts and allows an intelligent shading object or umbrella to speak to an individual.

In embodiments, an integrated computing device system may communicate (e.g., through wireless transceivers, wires, and/or circuit traces) with a shading object movement control PCB 895. In response, a shading object movement control PCB 895 may communicate with a weather variables PCB 810 to obtain sensor measurements from sensors coupled to and/or connected to a weather variables PCB 810. In embodiments, sensors may obtain measurements and may communicate these measurements to a weather variables PCB 810, a shading object control PCB 895, and/or to a shading object computing device 860. In embodiments, obtained measurements may be stored (for later use and/or analyzation) in a memory 1030 or 1035 of a shading object computing device 860, may be communicate via a sound system to a user, or may be displayed via a mobile software application.

In embodiments, in another illustrative example, a user may provide verbal instructions to rotate a shading object, a shading object computing device 860 may process the voice signal as described above (e.g., employing voice analyzation and/or voice recognition, and transmit instructions and/or commands to a first motor controller to cause a first motor to rotate a shading object a specified number of degrees (e.g., about a vertical axis). In embodiments, a user may provide verbal commands to a shading object remotely. For example, a user may provide verbal instructions to a mobile computing device (e.g., a smartphone), which may communicate the voice commands via a wireless communications protocol and/or Bluetooth to an audio/video receiver (e.g., a Bluetooth-enabled receiver) on the shading object. In this example embodiment, an audio/video receiver may communicate the voice-commands to a voice-recognition engine 815 which may convert the remotely-transmitted speech and communicate signals to the controller/processor, which may then operate in a manner described above. In embodiments, voice recognition may be executed and/or completed on a mobile computing device, and converted messages, instructions, commands and/or signals may be communicated to a shading object, intelligent umbrella and/or shading charging system.

Figure 15D:
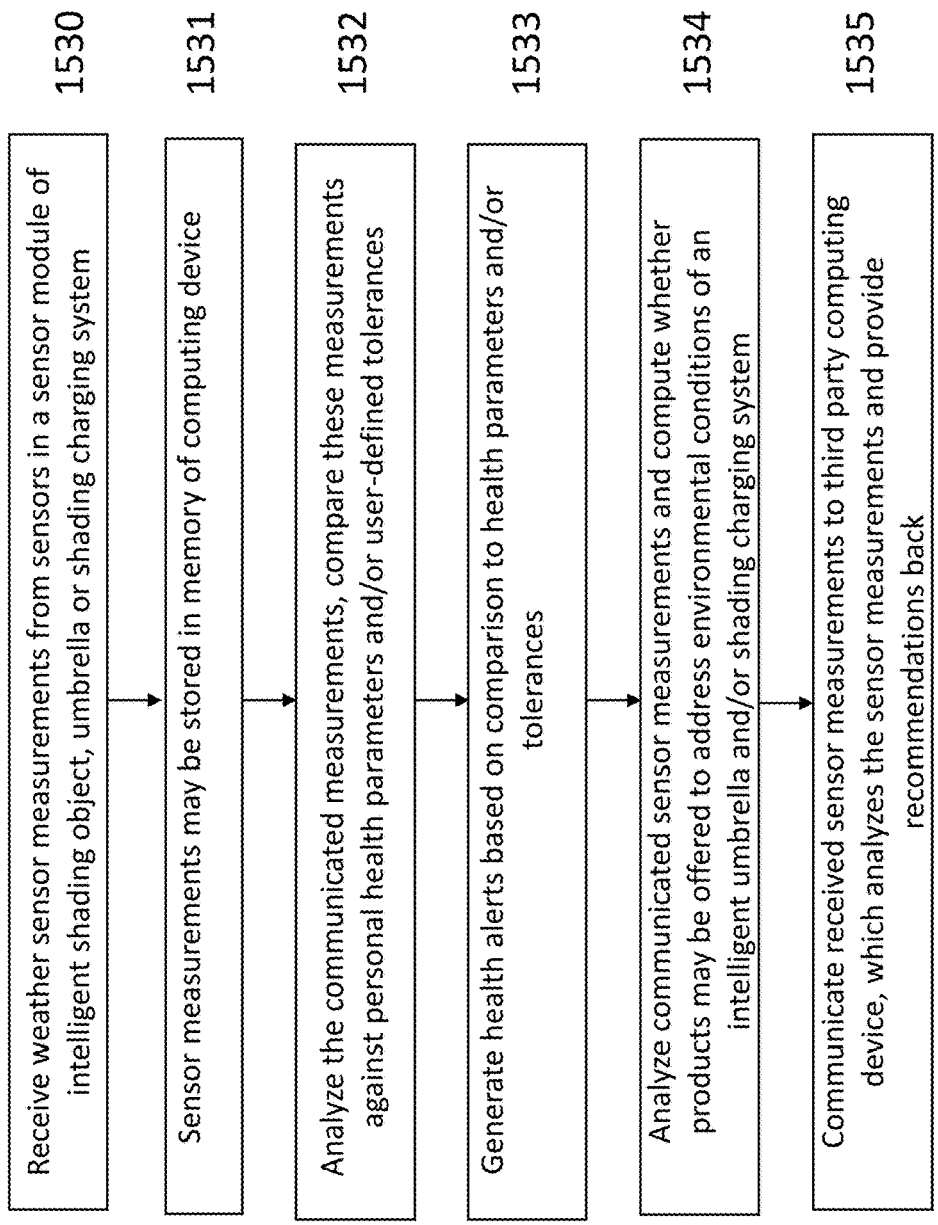
FIG. 15D illustrates execution of a health process by a computing device in an intelligent umbrella or shading charging system according to embodiments.

In embodiments, computer-readable and computer-executable instructions may be fetched from a non-volatile memory, loaded into a volatile memory, and may be executed by a processor in an integrated computing device to perform a personal health process. In embodiments, the computing device may be in a shading object, intelligent umbrella, and/or intelligent shading charging system. FIG. 15D illustrates execution of a health process by a computing device in an intelligent umbrella or shading charging system according to embodiments. A health process is described in detail in non-provisional patent application Ser. No. 15/214, 471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference. In addition, sun and other environmental and/or weather conditions may damage an individual's skin or impact an individuals' health. In embodiments, SMARTSHADE application software may provide a user with medical monitoring features and/or functionality. In embodiments, for example, a shading object system may detect a user is within a shading area. In embodiments, a shading object system may activate a camera to capture an image of the individual. In embodiments, a captured image may be compared to images stored in a memory of a shading object system to identify if an individual is known by a shading object system. In embodiments, facial recognition may be performed on the image to assist in identifying an individual. Continuing with this illustrative example, if an individual is not known and/or recognized, characteristics of an individual's image may be stored in a memory of a shading object system for future reference. In embodiments, characteristics may include hair color, hair length and/or scalp coverage, skin color and/or skin tone, number of freckles, presences of moles and/or lesions. In embodiments, characteristics may comprise medical history such as respiratory illnesses (e.g., asthma), skin cancer, heart conditions, etc. In embodiments where an individual is recognized, a shading object computing device 860 may retrieve a user's characteristics and/or measurements. In embodiments, a shading object computing device may retrieve and/or capture environmental conditions. For example, a shading object computing device may retrieve an air quality measurement, an ozone measurement, a sunlight intensity measurement, a humidity measurement, and/or a temperature measurement. In embodiments, a shading object computing device may analyze the retrieved individual characteristics and/or the received environmental conditions and provide recommendations to an individual as potential actions. For example, if an air quality measurement is low or poor and an individual has asthma, a shading object computing device 860 may provide recommendations for an individual to make sure they have their asthma medication and/or limit their time in the environment. As another illustrative example, if an individual's characteristics indicate that an individual and/or an individual's family has a history of skin cancer, a local time is between 10:00 am and 3:00 pm (highest portion of sunlight, and there is no cloud cover, a shading object computing device may generate recommendations such as requesting that a user stay within a shading area and/or apply sunscreen. In addition, a shading object computing device may analyze the individual's image, identify that a user is sunburned, and may recommend that an individual apply aloe or skin conditioner to a sunburn and/or stay within a shading area. As discussed, computer-readable instructions on a mobile computing device communicatively coupled to the shading object, umbrella and/or shading charging system may perform some actions described above. In embodiments, a shading object, umbrella and/or shading charging system computing device 860 may also receive capture images of an individual (captured via its own cameras or a mobile computing device's camera) and transfer these images (either still images and/or video images) to a third party provider. In embodiments, a third party provider may be a medical professional (e.g., like a dermatologist, a surgeon, or a general practitioner). In embodiments, a medical professional may analyze an image and/or videos and provide an individual with feedback related to an image. For example, a shading object system camera 857 may capture an image of a mole on an individual's chest and/or back. A medical professional may provide a preliminary evaluation of an individual and provide a recommendation to a user for future actions. In embodiments, a shading object system camera 857 may provide a video of an individual's movement after, for example, a surgery. In embodiments, images and/or videos may be provided in real-time, e.g., such as in a Snapchat and/or Facetime. In embodiments, images may be communicated from a shading object camera 857 through a wireless transceiver 1010 or 865 to an access point and onto a global communications network such as the Internet. In embodiments, images and/or videos may be communicated through a mobile application server (middleware) to an application server (e.g., a SMARTSHADE and/or SHADECRAFT application server). In embodiments, images and/or videos may be communicated through the Internet to a medical professional's web server, for example.

Figure 15E:
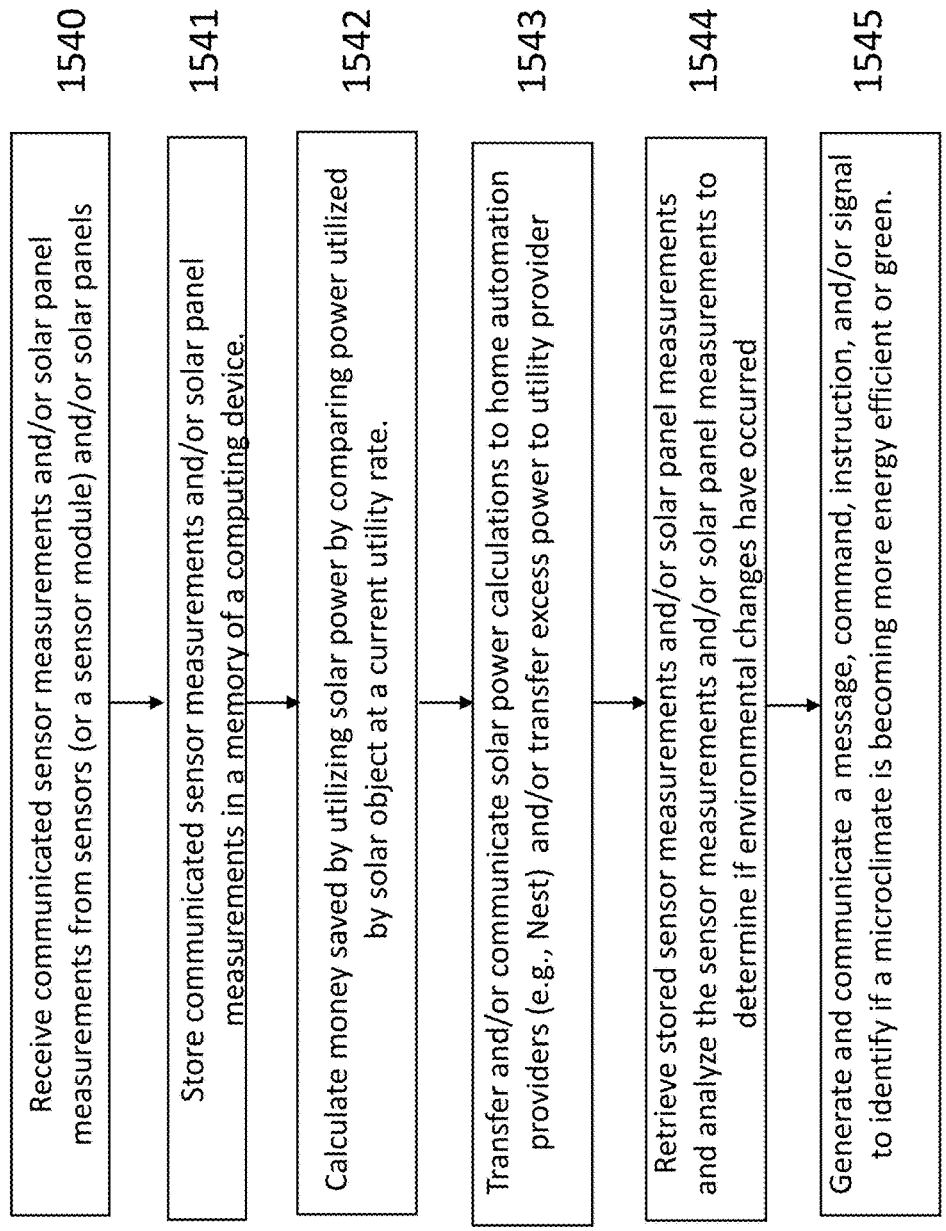
FIG. 15E illustrates an energy process in a shading object, intelligent umbrella, and/or intelligent shading charging system implementing an energy process according to embodiments.

FIG. 15E illustrates an energy process in a shading object, intelligent umbrella, and/or intelligent shading charging system implementing an energy process according to embodiments. In embodiments, computer-readable and computer-executable instructions may be fetched from a non-volatile memory, loaded into a volatile memory, and may be executed by a processor in a computing device in an intelligent umbrella and/or shading charging system to perform an energy process. In embodiments, for example, execution of an energy process may occur in response to a user selecting an energy button or icon on a dashboard of an intelligent umbrella and/or shading charging system mobile and/or software application. In embodiments, operation and/or execution of an energy process may provide visibility into an energy flow into and out of a shading object, intelligent umbrella and/or shading charging system and can present information regarding a value of utilizing solar energy.

In embodiments, an intelligent umbrella and/or shading charging system may receive 1540 communicated sensor measurements and/or solar panel measurements from, for example, sensors (or a sensor module) and/or solar panels (and/or solar panel charging assembles). In embodiments, the sensor measurements and/or solar panel measurements may be captured and/or communicated automatically and/or autonomously, without user invention. As compared to prior art systems, this may allow a shading object, umbrella and/or intelligent shading charging system to monitor sensor and/or solar panel measurements and identify out-of-tolerance conditions even when users or owners are not around or when objects, umbrellas and shading charging systems are not deployed. In embodiments, for example, an integrated computing device may receive, directly or indirectly, solar power readings for one or more shading object, intelligent umbrella and/or intelligent shading charging system solar cells 825 and/or a power tracking solar charger 830. In embodiments, a computing device in an intelligent umbrella or shading charging system may store 1541 communicated sensor measurements and/or solar panel measurements in a memory of a computing device. In embodiments, storing of communicated sensor and/or solar panel measurements may be initiated and/or executed automatically and/or autonomously. In embodiments, an energy process may calculate 1542 money saved by utilizing solar power by comparing power utilized by solar object at a current utility rate. For example, the automated energy process may calculate these savings based on power utilized by specific hardware PCBs and/or components, such as lights, speakers, and/or cameras. In embodiments, an energy process can transfer and/or communicate 1543 solar power calculations to home automation providers (e.g., Nest) which could enhance an efficiency of these systems (and an availability of these systems) by sharing solar power energy information as well as sensor information with home automation providers. In embodiments, if a shading object is not utilizing solar power, surplus solar power may be transferred back to an energy grid (either via an AC adapter and/or through home automation provider servers).

In embodiments, an energy tracking process may retrieve stored sensor measurements and/or solar panel measurements for a specified period of time and analyze the sensor measurements and/or solar panel measurements to determine 1544 if environmental changes have occurred. In embodiments, analyzation of sensor and/or solar panel measurements may be initiated automatically and/or autonomously. In embodiments, for example, an energy tracking process may determine if air quality in a user's microclimate has been reduced over a period of time. In embodiments, for example, an energy tracking process may determine if an air quality ozone reading in a user's microclimate has been reduced over a period of time, which may result in more harm to an individual and require more vigilant use of an intelligent umbrella and/or intelligent shading charging system. In embodiments, for example, an energy tracking process may determine in an UV radiation reading is increasing or decreasing over time thus making an environment safer. In embodiments, an intelligent umbrella system may generate 1545 a message, command, instruction, and/or signal to identify if a microclimate around an intelligent umbrella or shading charging system is becoming more green or energy efficient (e.g., ozone is not being reduced; air quality is improving, UV radiation is decreasing). In embodiments, an energy tracking process of an intelligent umbrella or shading charging software system may communicate 1545 such information in a message, command, instruction and/or signal to a display device for display to a user and/or to a sound reproduction device for playback to a user. In embodiments, an object, umbrella and/or shading charging system may communicate messages and/or alerts automatically and/or autonomously, without user intervention to identified components within systems, third party computing devices (security systems, emergency responders) if out of tolerance measurements and/or conditions are present. In embodiments, if emergency conditions are detected based on captured and communicated sensor and/or solar measurements, an object, umbrella and/or shading charging system may automatically and/or autonomously generate an emergency signal (e.g., an emergency broadcasting system signal) and/or project an emergency beacon.

In embodiments, an energy tracking process may store calculated solar energy levels in a memory of a computing device. In embodiments, an energy tracking process of an intelligent umbrella and/or shading charging software system may communicate calculated solar energy level values in a message, command, instruction and/or signal to a display device for display to a user and/or to a sound reproduction device for playback to a user. In embodiments, an energy tracking process of an intelligent umbrella and/or shading charging system may communicate calculated solar energy readings to an external computing device, portable communications device, wireless communication device and/or an application server. For example, an energy process in a computing device of an intelligent umbrella and/or shading charging system may communicate calculate solar energy readings to a utility computing application server to identify solar power energy generation. In embodiments, an energy tracking process of an intelligent umbrella and/or shading charging system may communicate calculated solar power energy readings to other devices in a smart home and/or smart building in order to identify potential power available for use by other devices (e.g., smart and/or other devices) in a smart home, smart building and/or smart city network if an intelligent umbrella and/or shading charging system may transfer power (e.g., current and/or voltage) to other devices on a smart home, building and/or city network. As discuss above, computer-readable instructions may be executed by a processor of a mobile computing device to initiate this process and/or functionality.

Figure 15F:
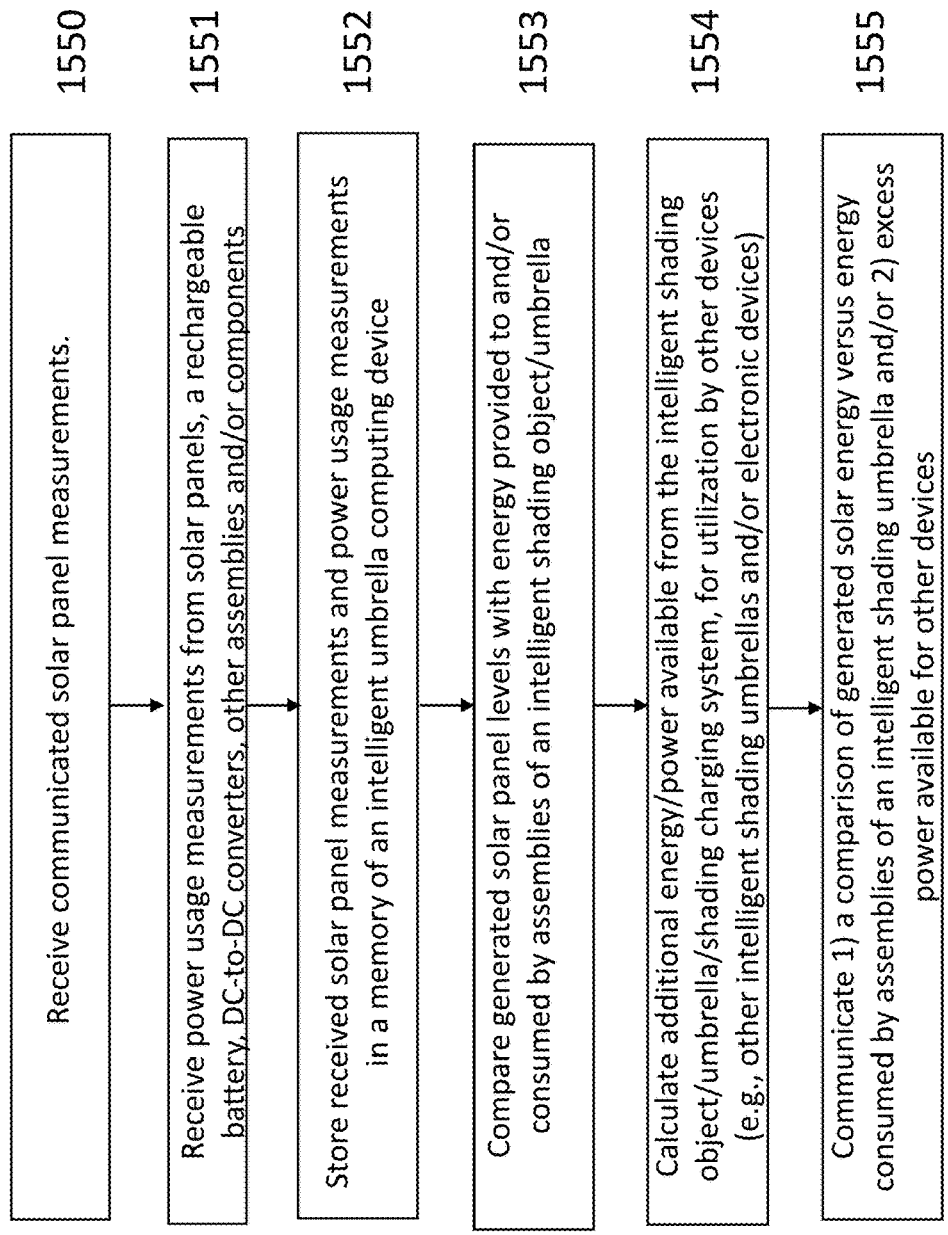
FIG. 15F illustrates energy generation and energy consumption process of an energy process in an intelligent umbrella and/or intelligent shading charging assembly according to embodiments.

FIG. 15F illustrates energy generation and energy consumption in an energy process in an intelligent umbrella and/or intelligent shading charging assembly according to embodiments. Energy generation and/or energy consumption in an energy process is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is incorporated by reference.

Figure 15G:
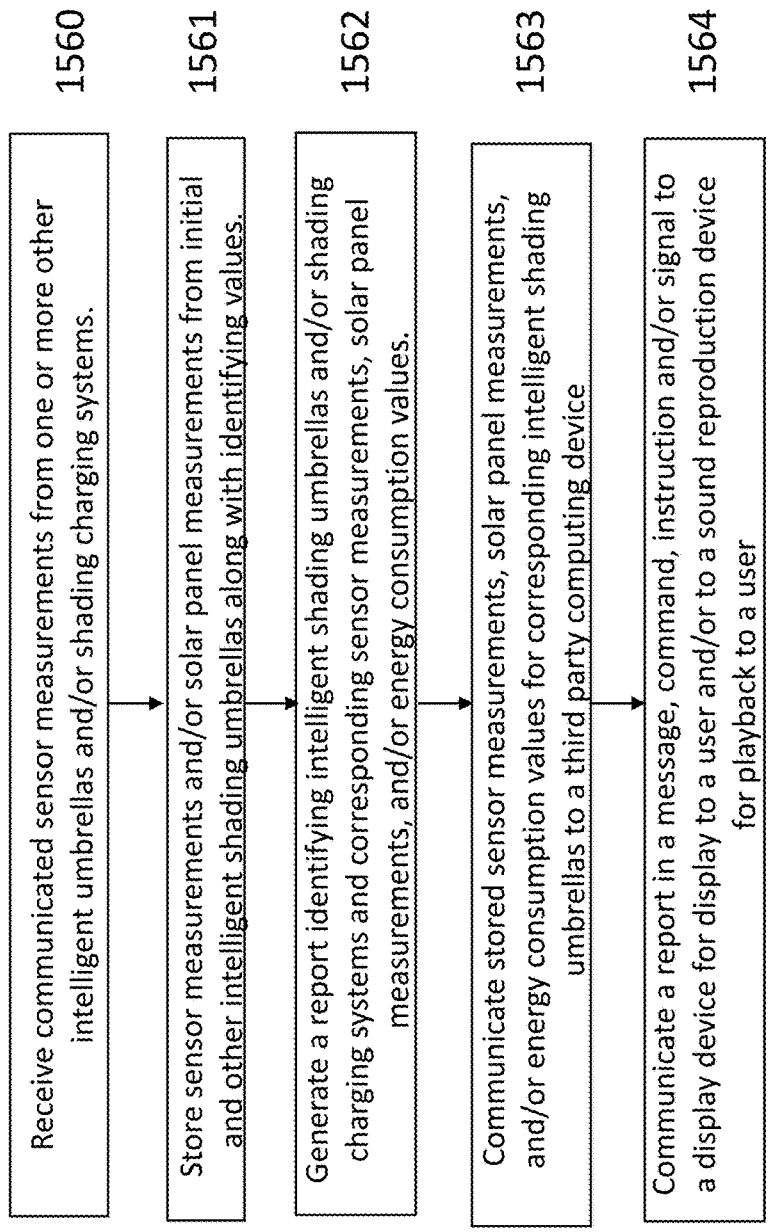
FIG. 15G illustrates energy gathering for a plurality of devices according to embodiments

In embodiments, an energy tracking process may retrieve computer-readable instructions from a memory of an intelligent umbrella computing device and execute the computer-readable instructions on one or more processors of the intelligent umbrella or intelligent shading charging system's computing device. FIG. 15G illustrates an energy tracking process for one or more shading objects, intelligent umbrellas and/or shading charging system according to embodiments. An energy tracking process for multiple shading objects, intelligent umbrellas and/or intelligent shading charging systems is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15H:
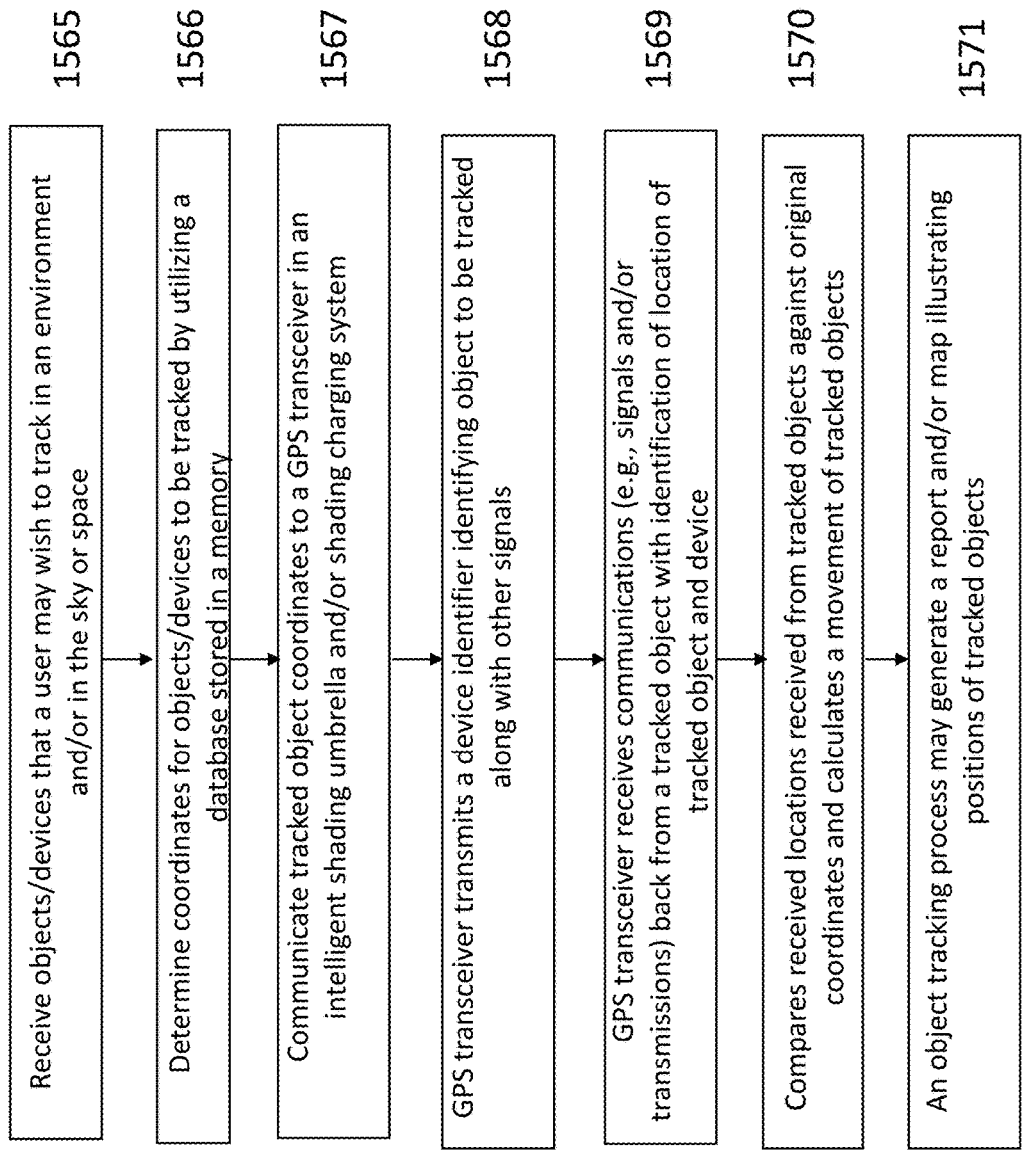
FIG. 15H illustrates object tracking in an energy process according to embodiments.

FIG. 15H illustrates object tracking in an energy process according to embodiments. Object tracking in an energy process is described in detail in U.S. non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 15I:
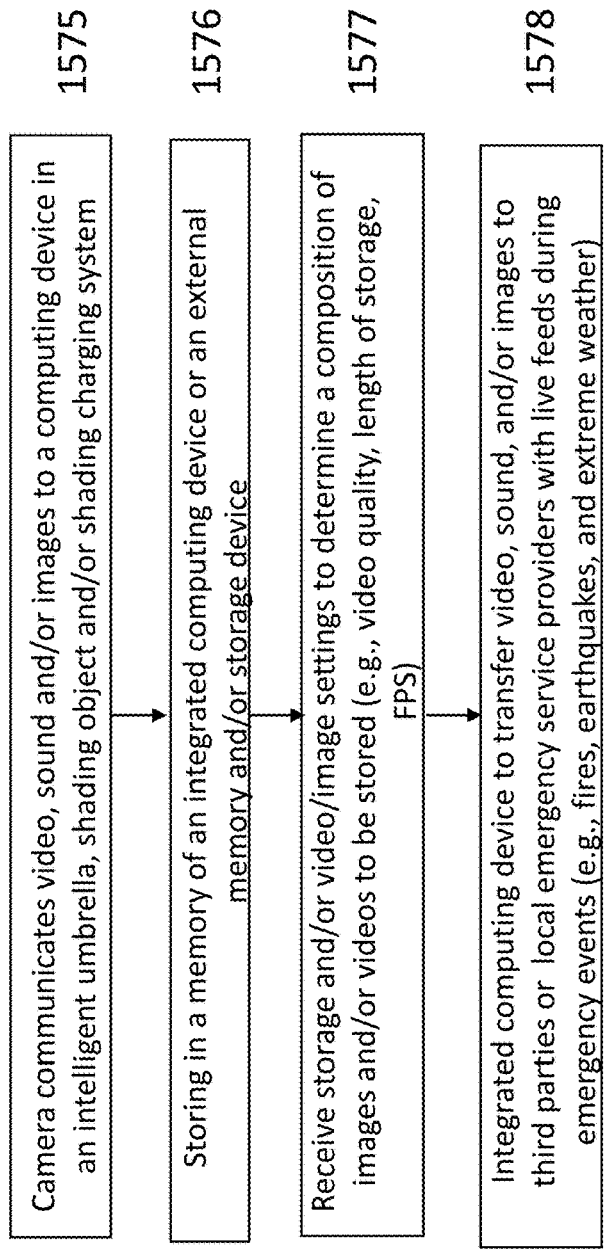
FIG. 15I illustrates a backup process for a shading object, an intelligent umbrella and/or shading charging system according to embodiments.

FIG. 15I illustrates a backup process for a shading object, an intelligent umbrella and/or shading charging system according to embodiments. In embodiments, a backup process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 16A:
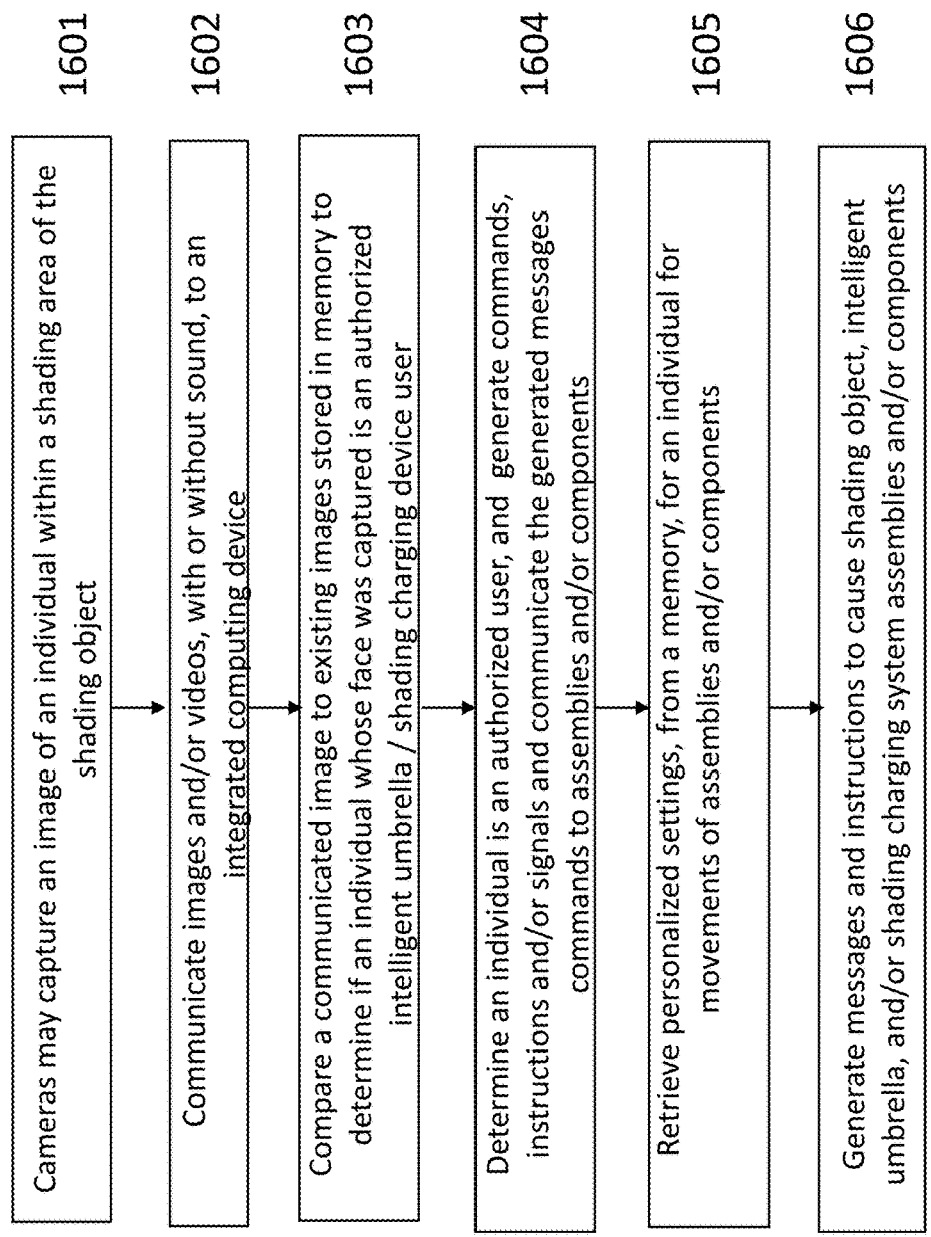
FIG. 16A is a flowchart of a facial recognition process according to an embodiment.

FIG. 16A is a flowchart of a facial recognition process according to an embodiment. In embodiments, a mobile computing device to control one or more umbrellas, comprises a user interface component configured to output stimuli and receive inputs, a wireless transceiver configured to communicate commands and/or messages to one or more wireless transceivers of the one or more umbrellas, one or more processors coupled to the user interface component and the wireless transceiver; and a computer-readable storage medium containing computer-readable instructions, that, when executed by the one or more processors, cause the one or more processors to perform actions. These actions may include receiving input indicative of activation of initiation of a facial recognition process, generating instructions initiating the facial recognition process, generating instructions initiating capture of an image of a user, receiving one or more captured images, determining if the one or more captured images matches an image stored in the computer-readable storage medium, and if a match is determined, retrieve umbrella settings associated with the matched image, and communicate the retrieved umbrella settings to the umbrella to cause the umbrella to instruct identified assemblies to conform to the retrieved umbrella settings. Additional embodiments and details of a facial recognition process are described in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

Figure 16B:
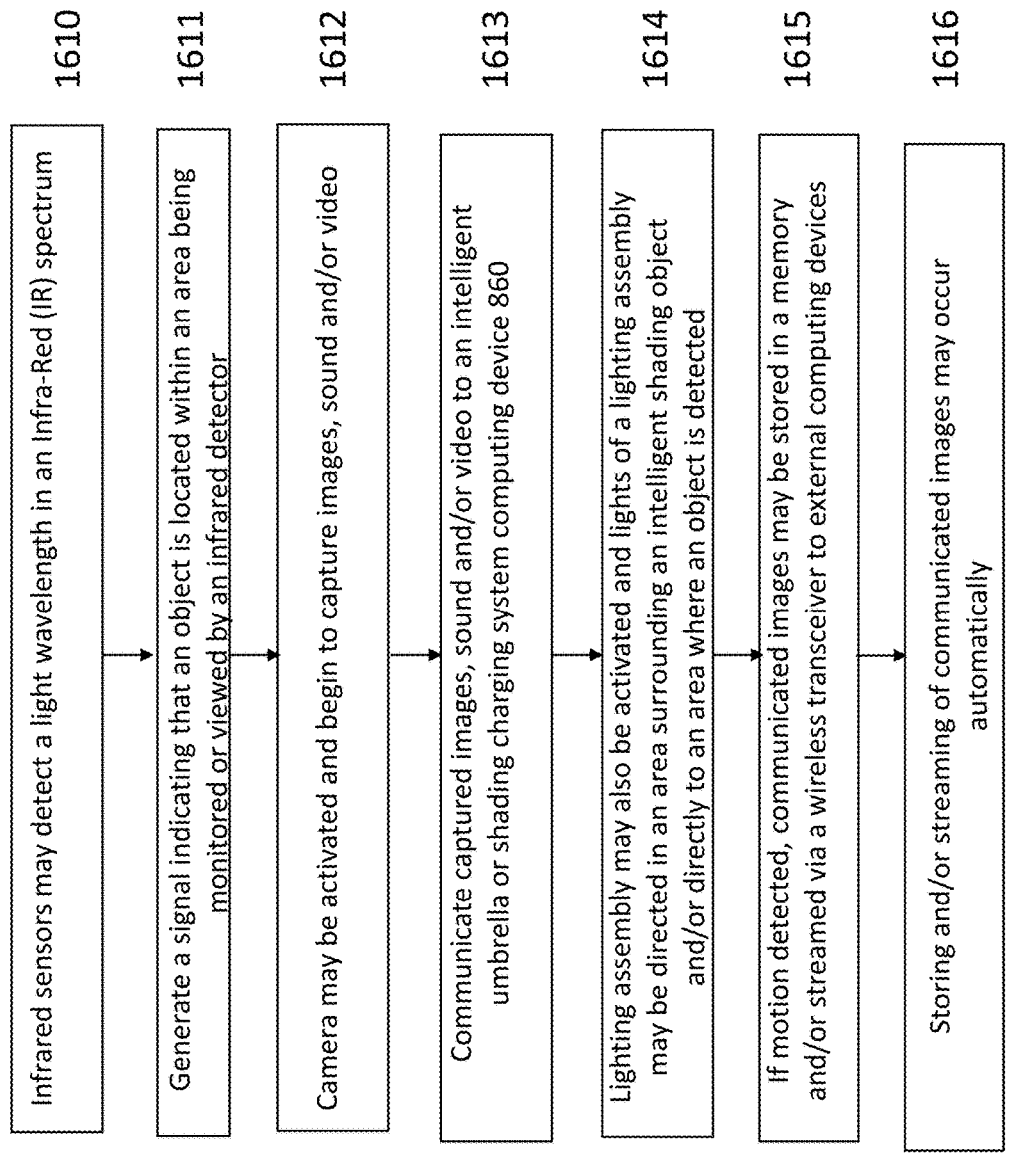
FIG. 16B illustrates an infrared detection process according to embodiments.
Figure 16C:
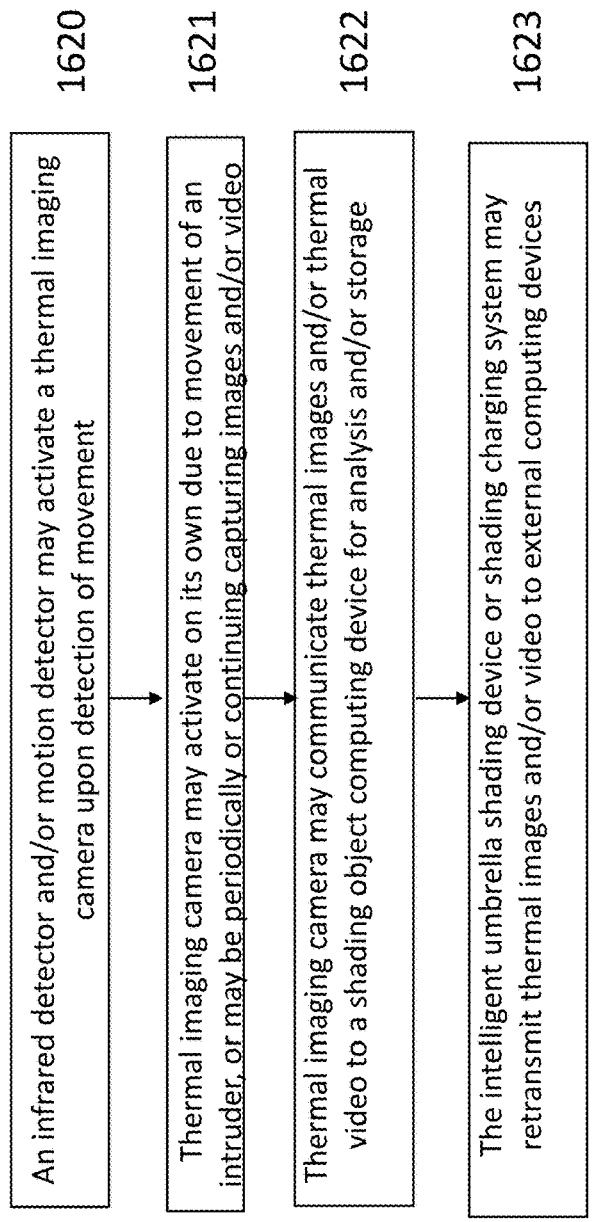
FIG. 16C illustrates a thermal detection process according to embodiments.

FIG. 16B illustrates an infrared detection process according to embodiments. In embodiments, an infrared detection process is described in detail in non-provisional patent application Ser. No. 15/214,471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference FIG. 16C illustrates a thermal detection process according to embodiments. A thermal detection process is described in detail in non-provisional patent application Ser. No. 15/214, 471, filed Jul. 20, 2016, entitled "Computer-Readable Instructions Executable by Processor to Operate a Shading Object, Intelligent Umbrella and an Intelligent Shading Charging System," the disclosure of which is hereby incorporated by reference.

In embodiments, one or more digital cameras 857 may be utilized as a security cameras for the environment. In embodiments, for example as discussed above, one or more digital cameras 857 may capture images, sounds and/or video in an environment in which a shading object, umbrella and/or shading charging system is installed and/or located. For example, if a shading object, umbrella, and/or shading charging system is rotating around a vertical axis (e.g., the shading system (stem assembly 106 and center support assembly 107) are rotating about a base assembly 105—FIGS. 1A and 1B and a lower support assembly 187 and an upper support assembly 191 are rotating about a housing and/or enclosure 182—FIG. 1C), a camera 857 may capture images, sounds and/or real-time video. In embodiment, one or more digital cameras may capture images, sounds and/or real-time video and may communicate images, sounds and/or video to a memory located on a computing device 860 within a center support assembly 107, lower support assembly 187 or upper support assembly 191. In embodiments, one or more digital cameras 857 may capture images, sounds and/or real-time video of an environment here a shading object, umbrella, and/or shading charging system is located (up to a 360 degree picture) and may communicate images, sounds and/or video to a memory located on a motion control PCB 895. In embodiments, images, sounds or real-time video may be communicated and/or streamed to a wireless transceiver in an integrated computing device 860 and/or associated computing device PCB. In embodiments, continuing with this example, images, sounds and/or real-time video communicated to a computing device may be stored in a memory (e.g., volatile and/or non-volatile memory) of a computing device 860. In embodiments, continuing with this illustrative embodiments, images, sounds and/or real-time video may be communicated via a wireless transceiver and/or wireless hotspot to external computing devices (e.g., application servers, databases, network servers) or other devices on a global communications network (e.g., such as the World Wide Web and/or the Internet). In embodiments, a computing device 860 and/or its transceiver may not be utilized to communicate images, sounds, and/or video. Instead, a transceiver (e.g., a Bluetooth transceiver) may receive images, sounds, and/or video communicated from a camera and communicate the received images, sounds and/or video to external computing devices (e.g., application servers, databases, network servers) or other devices on a global communications network (e.g., such as the World Wide Web and/or the Internet).

In embodiments, computer-readable and computer-executable instructions may be fetched from a non-volatile memory, loaded into a volatile memory, and may be executed by a processor in a computing device to executed and/or to perform a security process. This may occur in response to a user selecting a security button or icon on a dashboard of a shading object, umbrella and/or shading charging system mobile and/or software application. Operation and/or execution of a security process (or security portion of a software application) may be controlled by a computing device in a shading object, umbrella and/or shading charging system. In embodiments, a security process (e.g., initiated by selection in a mobile application or another software application) may receive communicated images, sounds and/or video feeds and/or quality of image readings (e.g., a desired resolution of received images). In embodiments, the video, sound and/or image feeds may be stored in a memory 1030 or 1035 of a computing device in a shading object (umbrella or shading charging system), a memory of a cloud server, a memory of an application server, a memory of a mobile device, and/or databases. In embodiments, an integrated computing device 860 may analyze video, sound and/or images and issue safety alerts based on analyzation of video, sound, and/or images, motion detector activity, and/or over threshold sensor readings (e.g., air quality readings from an air quality sensor). In embodiments, an integrated computing device 860 may communicate video, sound and/or images to an external device, such as an existing home security application server, such as ADT Security, which could enhance ADTs security capabilities, and/or also provide a platform for cross-promotion of security system software. In embodiments, an integrated computing device 860 may execute a home and/or building security process and may communicate video and/or images, with or without sound, to emergency responders (e.g., police, fire, security responders, FEMA) to aid in dealing with emergency situations. In embodiments, analyzation of video, images and/or sounds may be performed automatically and/or autonomously without user intervention. In embodiments, automatic and/or autonomous analyzation of images may determine who or what types of objects are being filed and/or captured. In embodiments, computer-readable instructions may be executed by a processor of a mobile computing device to initiate processes and/or functionality discussed above.

In embodiments, computer-readable and/or computer-executable instructions may be fetched from a non-volatile memory, loaded into a volatile memory, and may be executed automatically by a processor in a computing device to perform an intelligent umbrella and/or shading charging system security process. In embodiments, a security process may be executed automatically in response to specific and/or certain conditions. In embodiments, operation of a security process (or security portion of a software application) may be controlled by an intelligent umbrella computing device and/or a user operating an intelligent umbrella computing device. In embodiments, a security process may be initiated, controlled, or executed on a portable computing device, a wireless communications device (e.g., a smartphone), a tablet, a laptop computer, a server, an application server, or combination thereof, utilizing computer-readable instructions that are loaded into one or more memories and executed by one or more controllers and/or processors. In embodiments, a security process may be initiated and/or executed automatically at 1) a certain predefined time; 2) under certain predefined conditions (e.g., it is evening and an individual will not be home for a period of time); and 3) upon a trigger received from a connected and/or coupled device (e.g., a motion detector, infrared detector, a proximity detector, dangerous readings/measurements from sensors and/or an external device (e.g., NEST home security system).

In embodiments, a shading object, intelligent umbrella and an intelligent shading charging system operating as a security device in a security process provides many benefits over current systems. A shading object, intelligent umbrella and/or shading charging system is portable and may provide security in locations inaccessible to current security devices. In addition, as is described infra, a shading object, intelligent umbrella and/or shading charging system may operate autonomously, e.g., without external power and/or solar power, for period of times utilizing a rechargeable battery. In embodiments, a shading object, intelligent umbrella and/or shading charging system may have so many components and/or assemblies that allow it to provide wireless communications, capturing and communicating images, video and sound, providing sensor readings and/or also becoming an emergency signal or messages transmitter and/or receiver. In embodiments, a shading object, intelligent umbrella and/or intelligent shading charging system may also provide many of these services silently without individuals within an area knowing that a security system is present and providing many additional services that are not apparent to a user. In embodiments, a shading object, intelligent umbrella and/or intelligent shading charging system may also provide storage and/or connection to external storage systems (e.g., cloud-based storage) as well as interfacing and/or connection with existing external security system providers, e.g., ADT Systems and/or NEST.

Figure 16D:
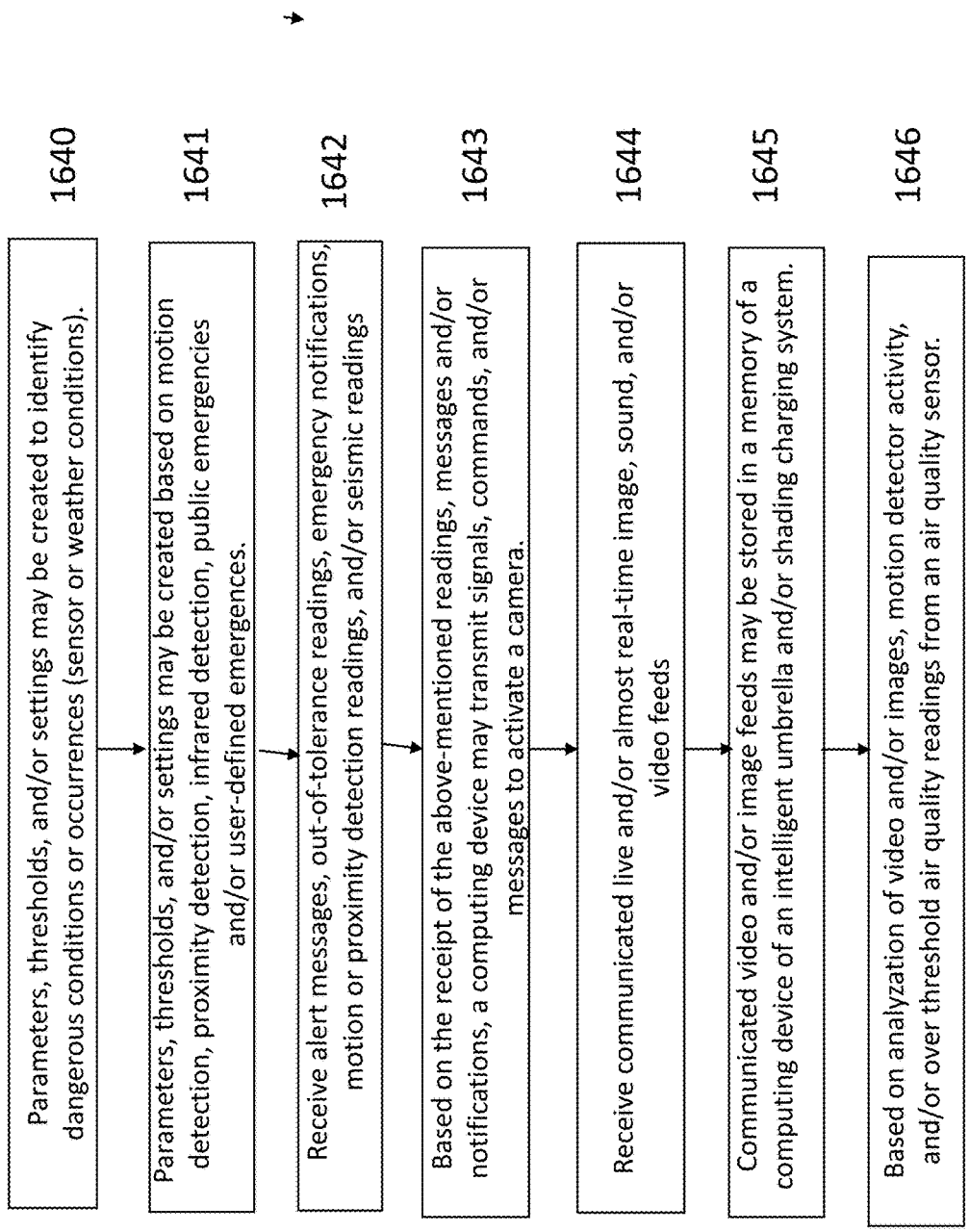
FIG. 16D illustrates a security process for an intelligent umbrella and/or intelligent shading charging systems according to embodiments.

FIG. 16D illustrates a security process for an intelligent umbrella and/or intelligent shading charging systems according to embodiments. In embodiments, a security process may be implemented in a home environment, a building or multi-dwelling environment (where shading objects and/or intelligent umbrellas are installed) and/or an outside area (where, for example, intelligent shading charging systems are installed). In embodiments, a security process may be executed with respect to a single shading object, intelligent umbrella and/or shading charging system, or multiple shading objects, intelligent umbrellas and/or shading charging systems. In embodiments, a security process may be initiated automatically under specified conditions (e.g., specific times of the day, specific weather and/or environmental) conditions, may be initiated at a shading object, umbrella and/or shading charging system by a user, and/or may be initiated by commands, messages and/or instructions from external computing devices, e.g., mobile phones, laptops, tablets, etc. In embodiments, parameters, thresholds, and/or settings may be created and/or established 1640 to identify dangerous conditions or occurrences (e.g., alerts may be established for dangerous sensor or weather conditions). In embodiments, parameters, thresholds, and/or settings may be created and/or established 1641 based, at least in part, on motion detection, sensor reading or measurements being out of range and/or tolerance, proximity detection, infrared detection, public emergencies and/or user-defined emergences. In other words, users can set parameters for triggering alarm and emergency modes based on things like motion detection, proximity detection, tilt detection, sensor readings, or seismic activity. In addition, users may set parameters to receive alerts on dangerous on-board sensor readings and could share these alerts with family members, emergency service providers, and other providers such as ADT, as well as other home automation manufacturers like Nest Product. In embodiments, for example, an integrated computing device 860 in a shading object, intelligent umbrella and/or intelligent shading charging system may receive 1642 alert messages, sensor out-of-tolerance readings, emergency notifications, motion or proximity detection readings, and/or seismic readings. In embodiments, based on the receipt of the above-mentioned readings, messages and/or notifications, a computing device may transmit signals, commands, and/or messages to activate 1643 a camera. In addition, a computing device may also transmit signals, commands, and/or messages to activate and/or turn on a sound reproduction device (e.g., speakers), a display device, a lighting assembly, and/or a wireless transceiver. In embodiments, messages, signals, commands may be transmitted to shut down one or more assemblies and/or components in shading objects, intelligent umbrella and/or intelligent shading charging systems (e.g., retract arms and/or arm support assemblies, stop rotation of a stem assembly and/or a lower support assembly).

In embodiments, an intelligent umbrella and/or shading charging system security process (e.g., initiated and/or executed as discussed above) may receive 1644 communicated live and/or almost real-time image, sound, and/or video feeds. In embodiments, an intelligent umbrella security process may also receive a quality value of video and/or images. In embodiments, a video quality value may be, e.g., 360p, 720p, and/or 1080p. In embodiments, an image quality value for printing may be pixels per inch (72 ppi, 240 ppi, 360 ppi and/or 720 ppi). In embodiments, communicated video and/or image feeds may be stored 1645 in a memory 1030 or 1035 of a computing device of an intelligent umbrella and/or shading charging system. In embodiments, communicated video and/or images may be stored in a memory of a cloud server, a memory of an application server, and/or databases, and/or combinations thereof.

In embodiments, an integrated computing device 860 can analyze video and/or images and issue safety alerts 1646 based on analyzation of video and/or images, motion detector activity, and/or over threshold air quality readings from an air quality sensor. In embodiments, an integrated computing device 860 may communicate video, sound and/or images to an external device, such as an existing security application server, such as ADT Security, which could enhance ADTs security capabilities, and/or also provide a platform for cross-promotion of security system software. In embodiments, an integrated computing device 860 may execute a security process and communicate video and/or images, with or without sound, to emergency responders (e.g., police, fire, security responders, FEMA) to aid in dealing with emergency situations. In embodiments, a computing device 860 may communicate messages, signals, commands and/or instructions to assemblies and/or components of an intelligent umbrella and/or shading charging system to place the umbrella and/or shading charging system into an alarm and/or emergency mode. In other words, all electrical components may be shut down, the arms/blades and/or arm support assemblies may be retracted, and/or transceivers may be shutdown. In embodiments, computer-readable instructions may be executed by a processor of a mobile computing device to initiate a security process and/or features and functionality discussed above.

In embodiments, user behavior characteristics may be desired by many organizations. In embodiments, a shading object and its multiple components may generate data which may be desirable to third parties. For example, obtained weather information, air quality readings, UV readings, wind readings, and user selections in a software application and/or other shading object or umbrella features. In embodiments, this raw information may be licensed to third parties as real-time or near real-time user information. In embodiments, access to different types and/or scope of data may be a basis for different subscription models. In embodiments, data on in-app purchases (via e-commerce features) may provide insight into decisions that shading object individual owners make (e.g., drivers behind consumer spending patterns). In embodiments, third parties may be able to purchase ad-space on Shadecraft devices and/or assemblies. In embodiments, utilizing obtained sensor data obtained from a shading object, a third party could deliver targeted ads based on region, climate, user behavior, as well as other metrics. In embodiments, in-app purchasing ability may give advertisers data on conversion rates & revenue, making ad space more valuable because ad success may be tracked and/or refined. In embodiments, revenue sharing models may also increase ad revenue and incentivize commercial customers to utilize shading objects and/or shading object application software.

In embodiments, a shading object computing device and/or mobile app may allow individuals to purchase, replace and/or return shading object accessories. In embodiments, a shading object computing device and/or mobile app may present a user with various accessories for purchase. For example, an individual may be able to purchase shading object arms/blades, shading fabric, batteries or solar cells for a shading object. In embodiments, a shading object computing device and/or mobile application may also present a menu item allowing individuals to connect to Internet and purchase items from other e-commerce web sites.

In embodiments, a shading object computing device and mobile app may allow individuals to diagnose problems with shading object operation. In embodiments, an individual may initiate diagnostics for a shading object by selection of a menu item in a mobile device application. In embodiments, commands, instructions and/or signals may be communicated to components of a shading object. Measurements and/or signals may be received back from components and if these measurements and/or signals exceed a threshold, a shading object computing device and/or mobile application may generate an error condition and/or message.

In embodiments, this error condition and/or message may be communicated to a display 1425. For example, diagnostics may be run on any one of the first, second and/or third motors. In addition, diagnostics may be run on any one of shading object sensors (e.g., environmental sensors, tilt sensor, motion or proximity sensors).

In embodiments, an intelligent shading object or umbrella may be a device on an Internet of Things (IoT). In embodiments, an Internet of Things (IoT) may be a network of physical objects—sensors, devices, vehicles, buildings, and other electronic devices. These objects may comprise items embedded with electronics, software, sensors, and network connectivity, which enables these physical objects to collect and exchange data with each other and/or with servers connected via a global communications network (e.g., an Internet). In embodiments, the IoT may sense and/or control objects across existing wireless communication network infrastructure an global communications network infrastructure. In embodiments, integrating of devices via IoT may create opportunities for more direct integration of a physical world into computer-based systems, which may result in improved efficiency, accuracy and economic benefit. In addition, when IoT is augmented with sensors and actuators, IoT may be integrated or enabled with a more general class of cyber-physical systems, e.g., smart grids, smart homes, intelligent transportation and smart cities. In embodiments, in IoT, for example, may be uniquely identifiable through its embedded computing system but is able to interoperate within the existing Internet infrastructure. If a shading object is integrated into IoT, for example, a shading object may be part of a smart home and/or smart office. For example, a shading object enable with IoT capability, because it may incorporate cameras, may be able to communicate with or be integrated into a home or office security system. Further, if an individual has a smart home, an individual may be able to control operation of, or communicate with an intelligent shading object or umbrella as part of an existing smart home software application (either via a smart phone, mobile computing device, mobile communication device, tablet, and/or computer). In addition, an intelligent shading object, if part of IoT, may be able to interface with, communicate with and interact with an existing home security system. Likewise, an intelligent shading object may be able to be an additional sound reproducer (e.g., via speaker(s)) for a home audio and/or video system that is also on the IoT. In addition, an intelligent shading object may be able to integrate itself with an electronic calendar (stored on a computing device) and become part of a notification or alarm system because it will identify when upcoming meetings are occurring. In embodiments, an intelligent shading computing device may utilize artificial intelligence to determine which music to play from a mobile computing device. In embodiments, a memory of an intelligent shading object may have user playlist information, e.g., genre played during certain timeframes, favorites, song played at specific times. In embodiments, an integrated computing device 860 may receive a request to play music and may select a playlist of music based on user's preferences and or usage factors. After a playlist is selected, a shading object computing device 860 may stream selected music from an individual's mobile computing device through a wireless network transceiver and to a sound reproduction system.

In embodiments, a shading object computing device 860 may have computer-readable instructions, stored in a non-volatile memory, which when executed by a processor, may execute an artificial intelligence process and may provide artificial intelligence functionality. For example, a shading office computing device 860 may receive measurements from environmental sensors, as described above, analyze the measurements, and make recommendations to users regarding sun exposure, heat exposure, and/or hydration. For example, a shading object computing system 860 may receive and analyze temperature measurements and sun intensity measurements, and based on the analysis, provide a recommendation to a shading object user how long the user should be out in the environment or when an individual should hydrate if in the environment. In addition, an individual can input health risk factors, and a shading object computing device 860 may also consider health risk factors when making a recommendation. For example, if a temperature is high and humidity is high, and a user has a heart condition, a shading object computing device system may recommend that a user only spend 30 minutes under a shading object and that during this time, the individual should drink eight ounces of water.

In embodiments, an integrated computing device 860 may also recommend shading object positioning throughout a day based on weather forecasting and/or sun tracking. In embodiments, a shading object computing device may have stored previous positions of different portions of a shading object (e.g., rotation angle of a stem assembly, angle of an upper assembly 112 with respect to a lower assembly 113 of a central support assembly), and may provide a recommendation of a starting shade position based on previous positions of different portions of a shading object. In addition, a shading object computing device 860 may also consider current environmental factors when making recommendations of a shading object starting position and/or positions throughout a day. In addition, a computing device 860 may consider environmental factors and/or sensor readings and provide a recommendation of when sunburn may occur if 1) no sunscreen is used; 2) sunscreen with a specific sun protection factor (SPF) is used; and/or 3) sunscreen is used in a partly cloudy environment.

In embodiments, a computing device 860 integrated into a shading object or umbrella may communicate with or interface with an external artificial intelligence system, such as the Amazon Alexa system or the Google Now system. In embodiments, a user may speak into a microphone located on or integrated within a shading object central support assembly 107 (for example) and ask questions or make requests. These voice signals are converted by the shading object computing device 860 and/or a voice recognition engine or module 815, as discussed previously, and communicated to an external artificial intelligence system (Amazon Alexa and/or Google Now) via a wireless transceiver, a PAN transceiver, and/or a wireless hotspot. In embodiments, a shading object computing device 860 may also comprise an artificial intelligence engine, which may be located on a computing device PCB and perform similar functions to an external artificial intelligence engine (such as Amazon Alexa and/or Google Now). In embodiments, an external artificial intelligence engine may responds to requests, transfer requests to other application servers for processing, and/or perform analysis based on a user request. After an action has been performed and responses and/or confirmations obtained, the external artificial intelligence engine may communicate the responses, answers, and/or confirmations to a shading object computing device. An integrated computing device may provide the responses, answer, and/or confirmations to an individual via a sound reproducing apparatus (e.g., speakers) and/or a visual display apparatus (display, monitor, and/or screen). In embodiments, computer-readable instructions may be executed by a processor of a mobile computing device to initiate an artificial intelligence process and/or features and functionality discussed above.

In embodiments, a shading computing device may also detect obstacles in a shading area of the shading object. In embodiments, an obstacle may be in a path or orbit of where a shading object may be moving (e.g., a person may be located in an area where shading arm supports are to be deployed and/or a lamp or other object may be in an area where an upper assembly of the central support assembly is being moved in response to a command). In embodiments, a shading object computing device 860 may receive an image or images from one or more shading object camera. In embodiments, a shading object computing device 860 may analyze the captured images and determine if a person and/or object (e.g., an obstacle) is in a path of travel of one or more shading object components. If a shading object computing system determines an obstacle is present, a notification may be communicated to an individual. In embodiments, a notification is sent to a sound system, and an alarm and/or voice warning may be sent out over a shading object speaker. In embodiments, a notification may be sent to a control panel and/or a portable electronic device and a communicated notification message may be displayed to a user. In embodiments, a shading object computing device may communicate commands, instructions and/or signals to controllers and/or controller PCBs to cause motors (e.g., a first, second or third motor) to stop movement, or to redirect movement away from a located obstacle. In embodiments, a shading object computing device 860 may continue to communicate notifications and/or commands, instructions and/or signals until an obstacle moves away from an area of concern (or shading area) or is removed from an area of concern (or shading area). In embodiments, a shading object computing device may also receive notifications, commands, instructions and/or signals from proximity sensors and/or motion sensors, and identify if an obstacle is in a movement path of one or more of a shading objects assemblies and/or components. If a shading object computing device 860 identifies an obstacle, then, as discussed above, notifications may be sent to portable electronic devices and/or sound systems, and commands, instructions, and/or signals may be communicated to controllers and/or controller PCBs for motors in order to stop a motor's operation and/or redirect a direction of an assembly's movement path. In embodiments, computer-readable instructions may be executed by a processor of a mobile computing device to initiate an obstacle detection process and/or features and functionality discussed above.

Figure 19:
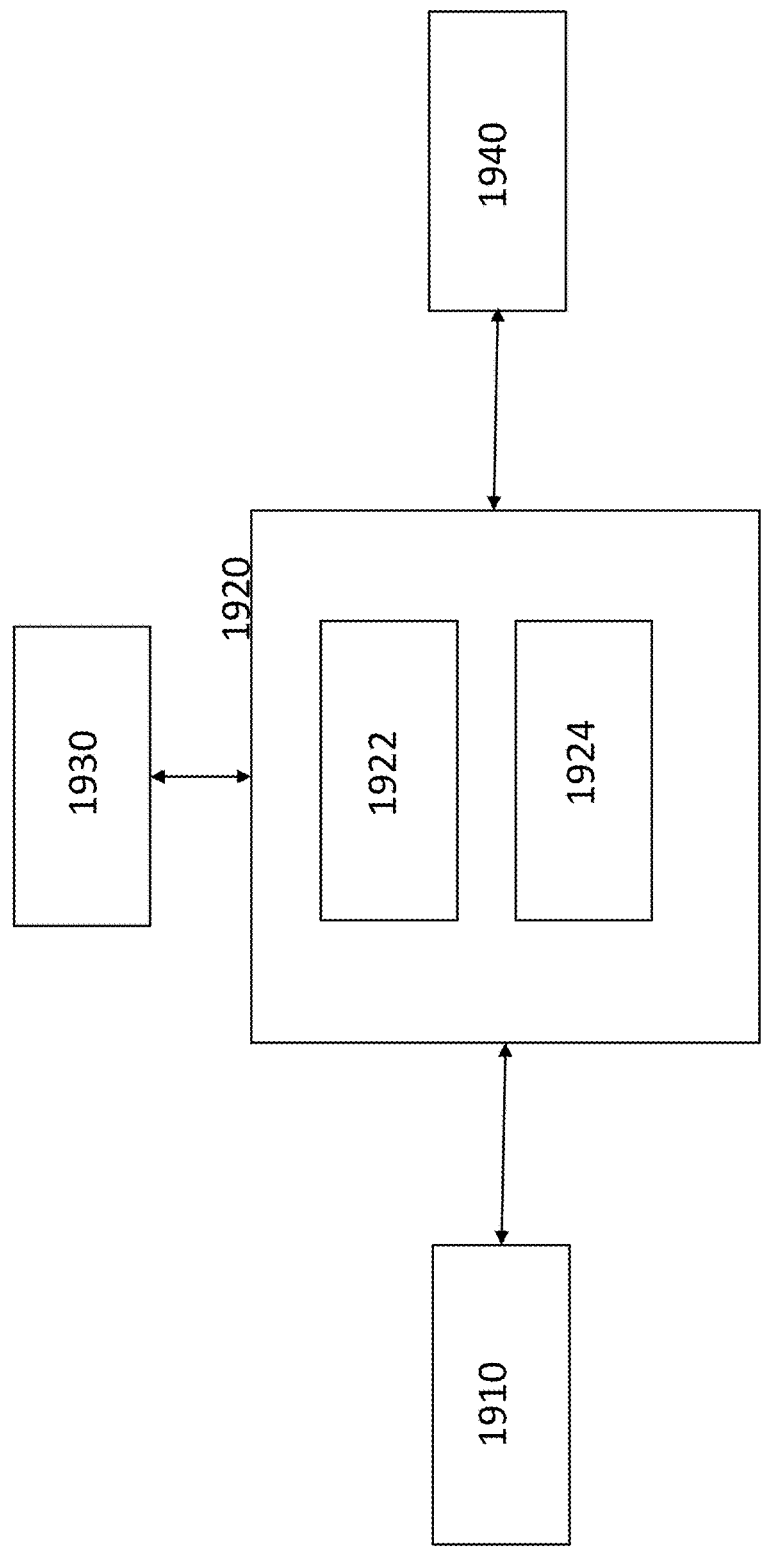
FIG. 19 illustrates a touch screen recognition component according to embodiments.

In embodiments, SMARTSHADE and/or SHADECRAFT software may be a graphical based, visual based and/or icon based software application resident and/or partially resident on a mobile computing device. In embodiments, SMARTSHADE and/or SHADECRAFT software may be initiated and/or executed by gestures and a touchscreen. In embodiments, a SMARTSHADE mobile application may also comprise a touch gesture recognition apparatus, device and/or module. Modules and/or components of a SMARTSHADE mobile application may comprise computer-readable instructions stored in a memory of a mobile computing device, an application server, and/or a mobile application server. In embodiments, a mobile computing device may further comprise a touch gesture recognition apparatus, device and/or module. In embodiments, a mobile computing device may control operation of a shading object, intelligent umbrella and/or shading charging system. FIG. 19 illustrates a touch screen recognition component according to embodiments. In embodiments, a touch screen recognition apparatus, component, device and/or module 1900 may comprise a touch sensor 1910, a controller 1920, a storage or memory 1930, and a display device and/or apparatus 1940. In embodiments, a touch sensor 1910 may detect an area or location at which a touch occurs by detecting a change in signal intensity due to a touching of an electrode (based on projective capacitive touch technology or an infrared touch technology). In embodiments, a controller 1920 (which may be a processor or mobile communications device or a separate controller), may control operation of a gesture recognition apparatus or unit 1922 and may create a user interface screen on a display device to display interactions which respond to information input by a user. In embodiments, a controller may include a gesture recognizer 1922 and an input event processor 1924. In embodiments, a user interface screen may display icons, buttons, sliding scales, animations, images, text input areas, or other interaction devices from which to receive input from a user and/or operator.

In embodiments, a gesture recognizer 1922 may define a bounding box surrounding a detected area, and recognizes a users' gesture based on a length of a diagonal line of a bounding box. In embodiments, a gesture recognizer or gesture recognition engine 1922 may recognize a user's gesture using variations in diagonal-line lengths of bounding boxes as well as using the diagonal line length (these may be calculate by collecting line lengths for a prior duration of time). For example, bounding boxes may be establishing by, for example, icons, buttons, input areas, images and/or animations. In embodiments, an input even processor and/or controller maps a recognized gesture to a user input event, such as an already existing event of an alternative input device. In embodiment, for example, a mobile computing device operating system (OS) may corresponding to one of a number of known mouse input event (e.g., pressing of a left mouse button, right mouse button, moving of cursor, rotation of scroll wheel and/or release of buttons).

In embodiments, if an OS can process keyboard input events, a user input event may be a keyboard input event. In embodiments, an input event processor and/or controller may map a recognized gesture to an input event processable or capable of being handled by the existing OS, using mapping information between predetermined and stored touch gestures and user input events. In embodiments, this allows an existing OS, and thus existing application software, to not have to revised, changed or modified to handle gesture recognition.

In embodiments, a storage device (e.g., a volatile and/or non-volatile memory) of a mobile computing may store data, OS programs, and/or application programs (computer-readable instructions) to drive and/or execute a touch gesture recognition process. In embodiments, a storage device may store a touch recognition algorithm and/or process which is executed by a process regarding determining and/or computing a mapping relationship between recognized gestures and input events of one or more of an input device. In embodiments, a display may also display a user interface screen. In embodiments, a display 1940 may display results of executions of a processor and/or controller. In embodiments, a display 1940 may display an execution result of an input event mapped by an input event processor on a user input screen. In embodiments, a touch sensor and/or display may be integrated into a touch screen.

Figure 20:
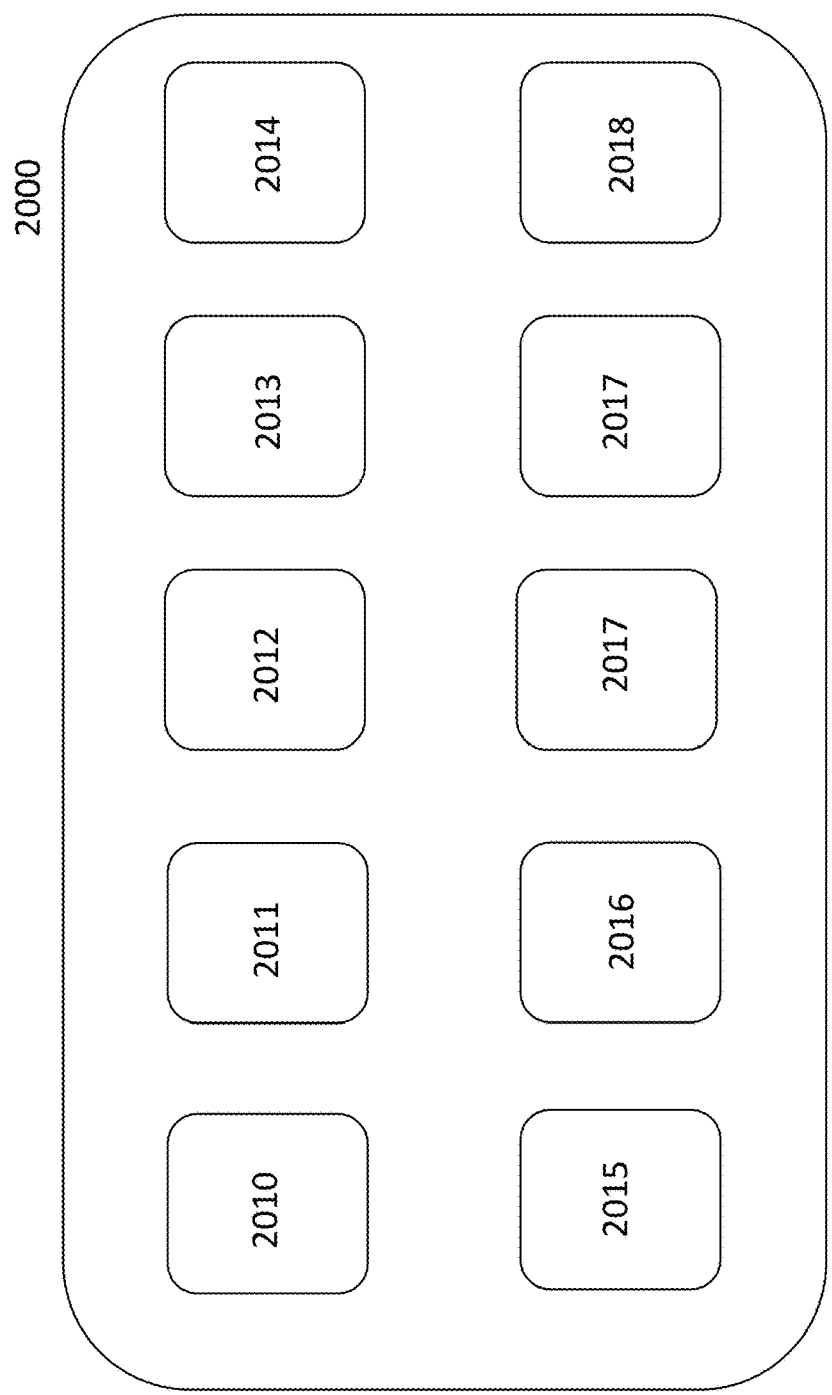
FIG. 20 illustrates placement of icons and/or buttons on a user interface screen of SMARTSHADE and/or SHADECRAFT installed or resident on a mobile communication device (e.g., smartphone) according to embodiments

In embodiments, SMARTSHADE and/or SHADECRAFT software may be a graphical, visual and/or an icon-based application. FIG. 20 illustrates placement of icons and/or buttons on a user interface screen of SMARTSHADE and/or SHADECRAFT, where all or portions of the application, are installed or resident on a mobile computing device (e.g., smartphone) according to embodiments. In embodiments, computer-readable instructions executable by a processor may generate a graphical user interface with a plurality of icons or buttons 2010 2011 2012 2013 2014 2015 2016 2017 and 2018. In embodiments, an icon and/or button may be selected, for example, via a user's touch, a stylus, a swipe, a keyboard and/or a mouse. In embodiments, icon and/or button 2010 may initiate selecting a measurement of a rotation (e.g., an angle) of a shading object, umbrella and/or shading charging system about an azimuth axis. In embodiments, selecting an adjustment and/or movement measurement may occur via an input screen, a slide, and/or a touch (and/or gesture) indicating an angle measurement on a circle. In embodiments, after selection of an adjustment and/or movement measurement, computer-readable instructions executable by a processor of the mobile computing device may generate an image and/or text indicating rotation movement and/or adjustment to a selected rotation adjustment or movement location or value. In embodiments, an icon and/or button 2011 may initiate selecting a measurement of a tilting (e.g., an elevation angle) of a shading object, umbrella and/or shading charging system about an elevation axis (e.g., or an axis of a hinging assembly). In embodiments, selecting a tilting adjustment and/or movement measurement may occur via an input screen, a slide, and/or a touch (and/or gesture) indicating an angle of tilting desired for an upper assembly (or upper support assembly) about a lower assembly (or lower support assembly). In embodiments, after selection of a tilting adjustment and/or movement measurement, computer-readable instructions executable by a processor of a mobile computing device may generate an image and/or text indicating tilting movement and/or adjustment to a selected adjustment or movement value and/or location. In embodiments, icon and/or button 2012 may initiate selecting of deployment and/or retraction of arm support assemblies and/or arms/blades of a shading object, umbrella and/or shading charging system about an elevation axis. In embodiments, selecting deployment and/or retraction of arm support assemblies may occur via an input screen, a slide, and/or a touch (and/or gesture) indicating an opening of closing of arm support assembles. In embodiments, after selection of deployment and/or retraction, computer-readable instructions executable by a processor of a mobile computing device may generate an image and/or text indicating an object, umbrella and/or intelligent shading system is opening/deploying or retracting.

In embodiments, icon and/or button 2013 may initiate selecting an activation/deactivation of one or more lighting assemblies of a shading object, umbrella and/or shading charging system. In embodiments, selecting one or more lighting assemblies activation may occur via an input screen, a slide, and/or a touch (and/or gesture) indicating whether or not one or more lighting assemblies may be turned on or off. In embodiments, a secondary adjustment button, icon, slide and/or lever may be selected to increase and/or decrease intensity of one or more lighting assemblies. In embodiments, after selection of activation and/or deactivation of one or more lighting assemblies, computer-readable instructions executable by a processor of a mobile computing device may generate an image and/or text indicating which lighting assemblies have been activated and/or deactivated.

In embodiments, icon and/or button 2014 may initiate selecting an activation/deactivation of one or more lighting cameras of a shading object, umbrella and/or shading charging system. In embodiments, selecting activation or deactivation of one or more cameras may occur via an input screen, a slide, and/or a touch (and/or gesture) indicating whether or not one or more cameras may be turned on or off. In embodiments, one or more secondary selection buttons, icons, slides and/or levers may be selected to capture one or more of images, video and/or sound. In embodiments, one or more secondary selection buttons, icons, slides and/or levels may also be selected to a) identify a quality of image, video and/or sound resolution and/or b) move one or more cameras to a new orientation. In embodiments, after selection of activation and/or deactivation of cameras (and/or other features), computer-readable instructions executable by a processor of a mobile computing device may receive images, videos and/or sound from one or more cameras on a shading object, umbrella and/or shading charging system and display the communicated images, videos, and/or sounds on a mobile computing device display as part of one or more windows of a generated user interface.

In embodiments, icon and/or button 2015 may initiate selecting an automatic and/or autonomous operation of a shading object, intelligent umbrella and/or intelligent shading charging system. In embodiments, selecting an automatic and/or autonomous application may occur via an input screen, a slide, a button, a slide button, and/or a touch (and/or gesture) indicating an activation of an autonomous and/or automatic operation. Automatic operation and/or autonomous operation of an intelligent shading object, intelligent umbrella and/or intelligent shading charging system is described in detail in U.S. non-provisional patent application Ser. No. 15/268,199, titled AUTOMATIC OPERATION OF SHADING OBJECT, INTELLIGENT UMBRELLA AND INTELLIGENT SHADING CHARGING SYSTEM, filed Sep. 16, 2016, the disclosure of which is hereby incorporated by reference. In embodiments, after selection of autonomous and/or automatic operation of a shading object, umbrella and/or shading charging system, computer-readable instructions executable by a processor of a mobile computing device may communicate, directly and/or indirectly, commands, signals and/or instructions to place an object, umbrella and/or shading charging system into an automatic and/or autonomous mode where no manual intervention is needed. In embodiments, a shading object, umbrella and/or shading charging system may communicate updates on sensor readings, assembly and/or component movements and measurements, and other automatic operations. In embodiments, computer-readable instructions executable by a processor of a mobile computing device may display received information on a display screen of a mobile computing device (e.g. sensor readings, assembly and/or component movements and/or measurements, and other automatic and/or autonomous operations.

In embodiments, icon and/or button 2016 may initiate selecting an activation/deactivation and/or integration of music (e.g., streaming music from a music software application) with a shading object, umbrella and/or shading charging system by communication of digital music files for playback on these devices. In embodiments, selecting activation, deactivation and integration of a music may be initiated via an input screen, a slide, and/or a touch (and/or gesture) indicating whether or not music may be activated, deactivated and/or integrated. In embodiments, one or more secondary selection buttons, icons, slides and/or levers may be selected to select playlists, songs, albums, etc., for reproduction on a speaker, for example, of shading object, umbrella and/or shading charging system. In embodiments, after selection of activation, deactivation, and/or integration of music computer-readable instructions executable by a processor may execute and/or initiate a mobile music application (e.g., iTunes, Pandora, etc.), initiate selection of one or more digital music files for playback, and communicate selected one or more digital music files to a shading object, umbrella and/or shading charging system for reproduction on a speaker (after being processed by at least an audio/video receiver). In embodiments, computer-readable instructions executing on a processor of a mobile computing device may display a user interface of a mobile music application and/or a graphical representation of a digital song being played at a shading object, umbrella and/or shading charging system.

In embodiments, icon and/or button 2017 may initiate selecting an activation/deactivation of an artificial intelligence (AI) process for a shading object, umbrella and/or shading charging system. In embodiments, selecting activation, deactivation or integration of an AI process or module may be initiated via an input screen, a slide, and/or a touch (and/or gesture) indicating whether or not AI may be activated, deactivated and/or integrated. In embodiments, one or more secondary selection buttons, icons, slides and/or levers may be selected to integrate with existing AI applications such as Amazon Alexa and/or Google Now. In embodiments, one or more secondary selection buttons, icons, slides and/or levers, may be selected to initiate and/or execute voice recognition on a mobile communication device and/or object, umbrella and/or shading object. In embodiments, after selection of activation, deactivation, and/or integration of an AI process or module, computer-readable instructions executable by a processor of a mobile computing device may execute and/or initiate a voice recognition process, module and/or software application, to enable a wireless communication device to receive voice and/or audible commands. In embodiments, computer-readable instructions may also be executed to establish an interface and/or communication channel to a third-party voice recognition process and/or engine and voice commands may be communicated to the third party voice recognition process and/or engine for analysis (e.g., Alexa and/or Google Now). In embodiments, computer-readable instructions may be executed by a processor of a mobile computing device to analyze voice commands and/or generate signals, instructions and messages based on the received voice commands. In embodiments, analyzation of voice commands may also be executed at an application server, a mobile application server, and/or a shading object, umbrella and/or shading charging system. Operations of artificial intelligence process and/or module (including but not limited to features, functions and/or capabilities) are discussed within the patent application. In embodiments, computer-readable instructions executing on a processor may display received communications and/or messages from a shading object, umbrella and/or shading charging system, the received communications based on an AI process and/or module executed in response to voice commands. In embodiments, computer-readable instructions executing on a processor of a mobile computing device may generate voice responses which will be played on a speaker of a mobile communication device.

In embodiments, icon and/or button 2018 may initiate selecting an activation, deactivation, or integration of other features, functions, capabilities and/or other software applications. In embodiments, selecting activation, deactivation and integration of button may be initiated via an input screen, a slide, and/or a touch (and/or gesture). In embodiments, selecting of an icon and/or button 2018 may cause computer-readable instructions to be executed by a processor to generate an additional user interface screen with additional and/or secondary icons and/or buttons. For example, additional icons and/or buttons may be for 1) adding, editing or deleting shading object, umbrella or shading charging system account information; 2) selecting one or more of a plurality of shading objects, umbrellas and/or shading charging systems associated with a user and/or the mobile communication device; 3) setting and/or editing alerts and methods of alerting when out-of-tolerance readings, conditions and/or measurements occur at a shading object, umbrella and/or shading charging system; 4) integrating with social network platforms or software applications (e.g., Facebook, Instagram, etc.); 5) interfacing with retail systems or integration with ecommerce software applications for purchase of goods and/or services; and 6) selecting and generating a help menu for a user/owner of a shading object, umbrella and/or shading charging system. In embodiments, these additional or secondary icons and/or buttons may be initiated via an input screen, a slide, and/or a touch (and/or gesture).

For example, in embodiments, if an account icon is selected, computer-readable instructions executable by a processor of a mobile computing device, may retrieve account information of user from a memory and may present account information (e.g., password, applications integrated, number of shading objects, umbrellas associated with account, e-commerce transactions, etc.) on a display screen of a mobile computing device. For example, in embodiments, if a shading object/umbrella icon is selected, computer-readable instructions executable by a processor may retrieve associated shading object/umbrella/shading charging system information for an account, and may present this information on a display screen of a mobile computing device. For example, in embodiments, if a help icon is selected, computer-readable instructions executable by a processor of a mobile computing device may retrieve help information from a memory, and may present this information on a display screen of a mobile computing device.

For example, if an alert icon or button is selected, computer-readable instructions may be executed by a processor to retrieve alert information from a memory and generate a user interface, via a user interface component, including retrieved alert information to be presented on a display of a mobile computing device. In embodiments, alert measurements and/or thresholds (for components, assemblies, sensors, etc.) for a shading object, umbrella and/or shading charging assembly) and methods of alert notification may be received (or communicated). In embodiments, computer-readable instructions may be executed by a processor of a mobile computing device, which communicate alert measurements to a shading object, umbrella and/or shading charging system directly (or indirectly through an application server and/or mobile application). In embodiments, computer-readable instructions may be executed by a processor of the mobile computing device to receive alert and/or emergency messages, identifying out of tolerance conditions, from a shading object, umbrella and/or shading charging system directly or indirectly (e.g., app server, mobile app server) via a selected alert message method or system (e.g., email, text, integrated into SMARTSHADE and/or SHADECRAFT mobile application software). In embodiments, computer-readable instructions executing on a processor of a mobile computing device may present alert messages and/or communications via a user interface of a mobile computing device.

For example, if a social media icon or button is selected, activation, deactivation and/or integration of a social media application may be initiated and/or executed with a SMARTSHADE or SHADECRAFT mobile application and/or a shading object, umbrella and/or shading charging system. In embodiments, selecting activation, deactivation or integration of a social media may be initiated via an input screen, a slide, and/or a touch (and/or gesture). In embodiments, one or more secondary selection buttons, icons, slides and/or levers may be selected to select one or more social media software applications (e.g., Facebook, Instagram, etc.). In embodiments, after selection of activation, deactivation, and/or integration of a social media icon, computer-readable instructions executable by a processor of a mobile computing device may execute and/or initiate a social media application (e.g., Facebook, Instagram), execute and/or initiate features, functions or portions of a social media application (e.g., activating camera, capturing images, editing images; posting comments, videos and/or sound files within application; and/or adding new friends, DMs and/or connections). In embodiments, computer-readable instructions executing on a processor of a mobile computing device may communicate commands, instructions, messages and/or signals if components of a shading object, umbrella and/or shading charging system are to be utilized by one or more social media application (e.g., umbrellas camera, sound reproduction, Bluetooth and/or WiFi being utilized). In embodiments, computer-readable software instructions may be executable by a processor of the mobile computing device to received communicated images, sounds, videos and/or messages from a shading object, intelligent umbrella and/or shading charging system and to present communicated images, sounds, videos and/or messages via a user interface of a mobile computing device.

For example, if a retail or ecommerce button or icon is selected, an e-commerce and/or shopping application may be activated, deactivated and/or an interface may be generated to a third party e-commerce and/or shopping software application. In embodiments, selecting activation, deactivation and integration with a third-party application may be initiated via an input screen, a slide, and/or a touch (and/or gesture). In embodiments, computer-readable instructions executed by a processor of a mobile computing device may 1) retrieve e-commerce and/or shopping information from memory; present e-commerce options on a display; receive e-commerce selections and communicate e-commerce selections to an app server (and/or mobile app server) to create transactions; or 2) may communicate with an application server (and/or mobile application server) of a third party provider to execute e-commerce transactions. In embodiments, computer-readable instructions executing on a processor may receive e-commerce transaction information and may present via a user interface received e-commerce transaction information on a display of a wireless communication device.

In embodiments, a mobile computing device (e.g., a smartphone) may include a camera. In embodiment, SMARTSHADE and/or SHADECRAFT software may be fetched and loaded into memory and executed by a processor of a mobile computing device to instruct a camera to capture facial gestures of a user. In embodiments, the SMARTSHADE and/or SHADECRAFT software may translate these captured facial gestures, generate commands, messages and/or instructions based on these captured facial gestures, and may communicate the translated commands, messages and/or instructions to a shading object, intelligent umbrella and/or shading charging system.

In embodiments, for example, computer-readable instructions may be fetched from a non-volatile memory, loaded into a memory of a portable computing device (e.g., a smartphone or a tablet), and executed by a processor and may generate a user interface on a display of the portable computing device. In embodiments, a user interface may be generated by a user interface component in a portable computing device. In embodiments, user interfaces, graphical user interfaces, and/or information or images display on mobile computing device displays, as discussed in detail above, may be generated by a user interface component, which receives input and outputs stimuli. In embodiments, a user interface component may generate a user interface displaying an animation and/or image of a shading object, intelligent umbrella and/or shading charging device. In embodiments, a portable computing device may comprise a touch screen for a display. In embodiments, a portable computing device may comprise a microphone for receiving voice commands and/or a voice recognition engine and/or component for converting voice commands and generating messages and/or instructions based on the received voice commands. In embodiments, an animation of a shading object, intelligent umbrella and/or shading charging system may have selectable areas (e.g., a central support assembly, arm support assemblies, an upper assembly, a lower assembly, lighting assemblies, cameras, other component and/or assemblies). In embodiments, a user interface component may receive input (tactile input, audible input, and/or computer-readable input) and output stimuli (e.g., visible stimuli, computer-readable stimuli and/or audible stimuli). For example, inputs may be received from a keyboard, a virtual keyboard, a touchscreen and/or a microphone). For example, output stimuli may be a visual image, a visual GUI, an visual animation, and/or an audible sound or sounds.

In embodiments where an animation is generated and display, SMARTSHADE and/or SHADECRAFT software may retrieve, from a memory, a configuration of a shading object, intelligent umbrella and/or shading charging system and generate and/or display an image and/or animation matching a retrieved configuration. In embodiments, a portable computing device may be coupled and/or associated with an intelligent shading charging system and SMARTSHADE software may retrieve this configuration from a memory and/or generate a shading charging system animation and present such animation to a portable computing device display.

In embodiments, a portable computing device may comprise a touchscreen. In embodiments, a section and/or component of a generated animation and/or image may be selected to move, adjust, activate, rotate and/or deactivate the associated section and/or component of a shading object, intelligent umbrella and/or a shading charging system. For example, a lower support assembly of a shading object, umbrella and/or shading charging system animation and/or image may be selected via an input on a touchscreen (e.g., a user may swipe an animation or image of a lower support assembly in a clockwise direction to rotate the assembly with respect to a base assembly). In embodiments, a user interface component, in combination with computer-readable instructions executable by a processor, may convert such inputs in commands, instructions and/or messages, and communicate the converted commands, instructions and/or messages to a shading object, umbrella and/or charging system to cause a lower support assembly to rotate in a selected direction. Similarly, in embodiments, for example, an upper support assembly and/or arm support assemblies of an animation may be selected via an input on a touchscreen (e.g., via a gesture on a touchscreen to rotate an upper support assembly and/or deploy or retract arms support assemblies). In embodiments, a user interface component, in combination with computer-readable instructions executable by a processor, may convert such inputs to commands, instructions and/or messages, and communicate the converted commands, instructions and/or messages to a shading object, umbrella and/or charging system to cause an upper support assembly to tilt in a selected direction, and/or arm support assemblies to deploy and/or retract. In embodiments, a component may be selected on an animation via an input on a touchscreen (e.g., a camera, solar panels, a speaker, a cooling system, specific sensors, lighting assemblies, etc.) via a tap or a gesture. In embodiments, a user interface component, in combination with computer-readable instructions executable by a processor, may convert such inputs to commands, instructions and/or messages, and communicate the converted commands, instructions and/or messages to a shading object, umbrella and/or shading charging device to initiate and/or activate the selected component (e.g., turning on speakers and/or assemblies). In embodiments, an animation and/or image may need to be expanded in order for a selection of some components not visible and/or selected originally from a first generated animation (e.g., a camera, lighting assemblies, a computing device, etc.).

In embodiments, a portable computing device may comprise a touchscreen integrated into a display and a microphone. In embodiments, a section and/or component of a generated animation and/or image may be selected via an input audible command (e.g., a voice command) to move, adjust, activate, rotate and/or deactivate an associated section and/or component of a shading object, intelligent umbrella and/or a shading charging system. For example, movement, adjustment, rotation, or activation of components (e.g., cameras, lighting assemblies, cooling systems, wireless transceivers, solar panels, support assemblies, arm support assemblies, a lower and/or upper support assembly) of a shading object, umbrella and/or shading charging system may be selected via an audible command. In embodiments, a user interface component, in combination with a voice recognition process (e.g., computer-readable instructions executed by a processor), may convert voice commands to instructions and/or messages, and communicate the converted commands, instructions and/or messages to a shading object, umbrella and/or charging system to cause an identified component and/or assembly to react based on the communicated message and/or command. For example, voice commands to activate one or more cameras may be received by the portable computing device and the camera devices may be activated on the shading object, umbrella and/or shading charging system. Similarly, in embodiments, for example, voice commands to deploy or retract arm support assemblies may be received by the portable computing device and, in response, the arm support assemblies may be moved on the shading object, umbrella and/or shading charging system.

In embodiments, a shading object may comprise a control panel (not shown). In embodiments, a control panel may comprise an input screen and/or a controller. In embodiments, an input screen may be a touch screen and/or a screen receptive to receiving electronic input via a pen. In embodiments, a control panel may present a graphical user interface with menu items to allow a user to control and/or operate many components of a shading object. In embodiments, a shading object may also comprise an organic light-emitting diode (OLED) display 1425 (see FIG. 14). In embodiments, an OLED display may be a control panel. In embodiments, an OLED display 1425 may be a diagnostics monitor. In embodiments, an OLED display may display messages from a motion control PCB, a computing device, external computing devices, and/or a portable electronic device.

In embodiments, a shading object, intelligent umbrella and/or intelligent shading charging system may comprise security features. In embodiments, a shading object is completely autonomous and may be powered solely by solar energy generated by solar panels and/or arrays. In other words, if electricity and/or power are not available due to power outages and/or emergency situations, a shading object, intelligent umbrella and/or intelligent shading charging system may continue to operate and provide services to users, owners, security providers and/or emergency service providers. For example, if there is a power outage and AC and/or DC power is not available from a power outlet or power mains system, a shading object, intelligent umbrella and/or intelligent shading charging system may obtain and/or generate power from solar energy. In embodiments, solar power may also not be available (e.g., due to failure of solar power system and/or weather) and a shading object, intelligent umbrella and/or intelligent shading charging system may have to rely on a rechargeable battery for power. In embodiments, the devices may also have to rely on a backup rechargeable battery. For example, if there is a power outage, certain components of a shading object, intelligent umbrella and/or intelligent shading charging system may be powered from a rechargeable battery and may be able to communicate with outside systems via either data communications and/or cellular communications. In embodiments, a shading object, intelligent umbrella and/or intelligent shading charging system may communicate a) video, audio and/or images from a camera; b) sensor measurements from sensors installed and/or integrated therein (e.g., carbon monoxide sensors, ultraviolet radiation sensors, and/or methane sensors); and c) available power measurements, such as remaining charges in one or more rechargeable devices (e.g., batteries) integrated and/or located therein.

In embodiments, a rechargeable device (e.g., a rechargeable battery) may provide power (e.g., voltage and/or current) to assemblies, components, circuits, and/or devices in a shading object, intelligent umbrella and/or intelligent shading charging system. In embodiments, as discussed above, one or more solar panel arrays and/or cells generate electricity and/or power which may be transferred to a solar power charging assembly. In embodiments, a solar panel charging assembly may convert power supplied by one or more solar panels, arrays or cells into DC power that may be transferred and/or supplied to a rechargeable device (e.g., a rechargeable battery). In embodiments, DC power from a solar power charging assembly may be transferred and/or supplied to assemblies, components, circuits and/or devices directly and/or without first being supplied to a rechargeable device. In embodiments, a solar panel charging assembly may provide power to a backup rechargeable device (e.g., battery).

In embodiments where external power is present, an external power source (e.g., a power mains, power from an outlet in a structure or building) may also supply and/or transfer power to the rechargeable device (e.g., rechargeable battery). In embodiments, an external power source may transfer and/or supply power to a second and/or backup rechargeable device (e.g., rechargeable battery). In embodiments, a backup rechargeable device may be located in a base assembly of a shading object and/or intelligent umbrella and/or a housing enclosure of an intelligent shading charging system.

In embodiments, a rechargeable device in a shading object, intelligent umbrella and/or intelligent shading charging system allows for autonomous usage of these devices as self-operating devices that do not need external power to operate in emergency situations. In embodiments, a shading object, intelligent umbrella and/or shading object may be able to self-operational or have autonomous operation for a specified period of time (utilizing only a rechargeable battery). In embodiments, an amount of time may depend on a configuration of a shading object, intelligent umbrella and/or intelligent shading charging system, a number of components and/or assemblies being powered by a rechargeable battery, and/or environmental conditions. Prior security systems utilize electricity and a connection to a global communications network in order to communicate with an outside server and/or computing system. In addition, prior security systems may require separate electrical power and/or connecting to an existing powered telephone system. In embodiments, a present shading objects, intelligent umbrellas and intelligent shading charging systems may operate utilizing power self-contained within the device (either generated from solar power system (e.g., solar panel arrays) and/or rechargeable devices (e.g., such as rechargeable batteries). Accordingly, the object, umbrella and/or shading charging system may therefore act as a security system even in emergency situations when there is no power (such as power blackouts and/or server weather conditions). In embodiments, a shading object, umbrella and/or shading charging system may automatically determine external power has been lost and may automatically (or autonomously) enter a low power and/or emergency power mode. In embodiments, when a low power and/or emergency power mode is entered, computer-readable instructions executable by a processor of a shading object, umbrella and/or shading charging system may automatically analyze a power and/or charge level and may determine a number of components and/or assemblies to be powered in a low power mode and/or emergency mode and communicate signals, instructions and/or commands to not power certain motors, assemblies and/or components. In embodiments, if shading object, umbrella and/or shading charging is in low power and/or emergency power mode, computer-readable instructions executable by a processor may communicate signals, instructions and/or commands to provide power to identified and/or selected components, assemblies and/or devices. For example, shading object, umbrella and/or shading charging system components, assemblies and/or devices may be solar panels/arrays, motors and motor controllers, PAN transceiver(s), wireless (WiFi) transceiver(s), lighting assemblies, speakers, audio/video receivers, integrated computing device, radio transceivers, cameras, or sensors (and sensor modules).

Figure 18A:
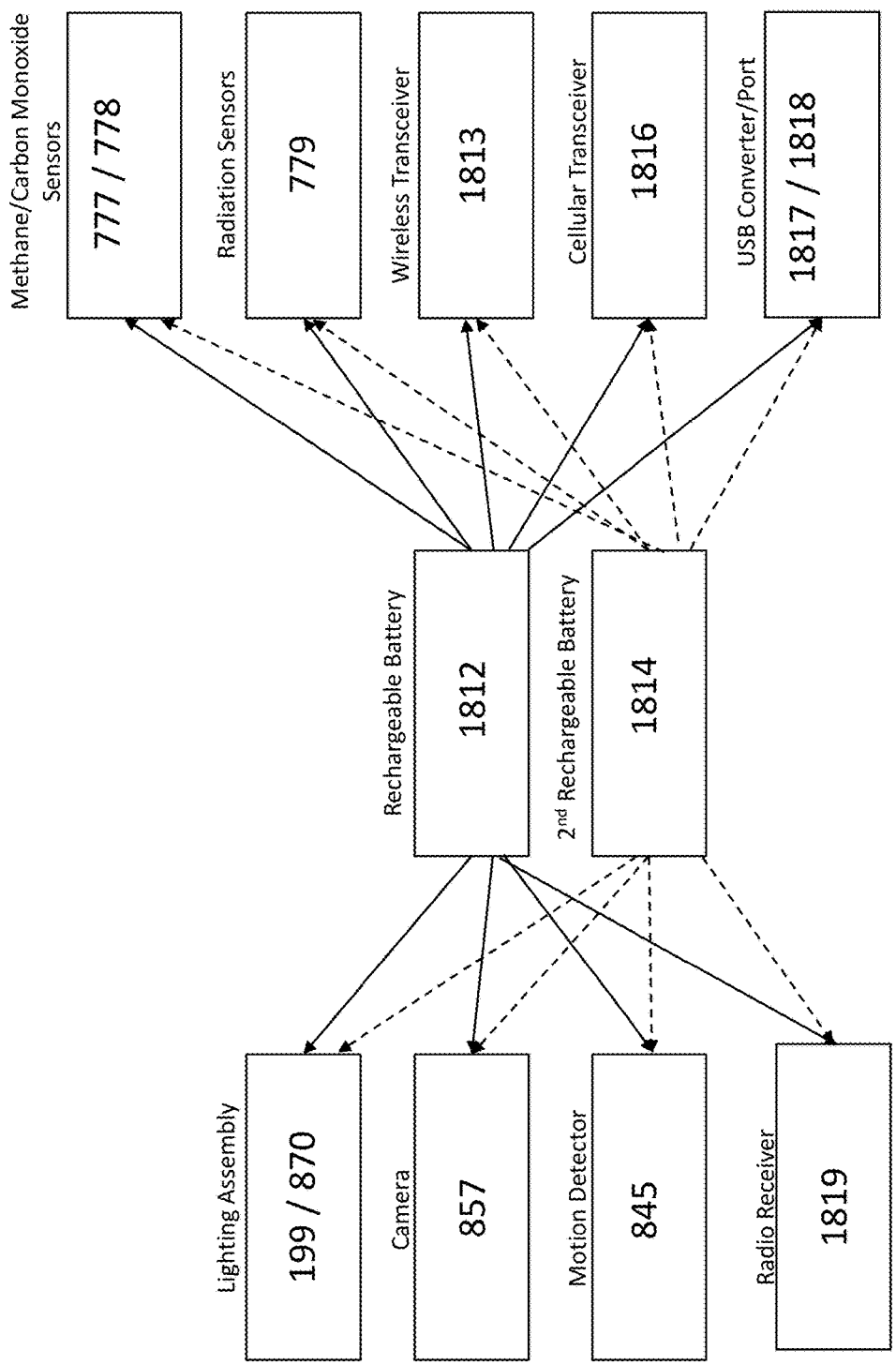
FIG. 18A illustrates a rechargeable battery and/a backup rechargeable battery providing power to selected assemblies and/or components according to embodiments.

FIG. 18A illustrates a rechargeable battery and/a backup rechargeable battery providing power to selected assemblies and/or components according to embodiments. Automatic Operation and/or autonomous operation of an intelligent shading object, intelligent umbrella and/or intelligent shading charging system is described in detail in U.S. non-provisional patent application Ser. No. 15/268,199, titled AUTOMATIC OPERATION OF SHADING OBJECT, INTELLIGENT UMBRELLA AND INTELLIGENT SHADING CHARGING SYSTEM, filed Sep. 16, 2016, the disclosure of which is hereby incorporated by reference.

In embodiments, multiple shading objects may be coupled together. In embodiments, by coupling multiple shading objects together mechanically and/or electrically, an individual may be able to operate and control intelligent shading objects or umbrellas in unison (e.g., in other words, same or similar commands, instructions, and/or signals may be sent to multiple shading objects by a single control computing device). In addition, if solar cells are generating an excess power, e.g., more than is necessary for a single rechargeable battery, excess power may be transferred to a rechargeable battery in another shading object coupled to an original shading object. In embodiments, if there is excess power generated by solar cells in a number of coupled shading objects and other local shading objects may not utilize the power, a shading object may transfer and/or relay excess power to an electricity grid and an individual may receive discounts and/or credits for any power delivered back to a grid. In embodiments, a portable electronic device, through a shading object mobile application, may control multiple coupled shading objects. In embodiments, a laptop or other computing device may control multiple coupled shading objects. In embodiments, multiple shading objects may communicate with each other via a personal area network. In embodiments, multiple shading objects may communicate with each other via wireless LAN transceivers.

In embodiments, a cable comprising data, control and power lines may be connected and/or attached between shading objects. In embodiments, a cable may be housed in a base assembly 105 and may extend to a power connector on another shading object. In embodiments, a cable may be housed in a stem assembly 106 and/or a center support assembly 107 and may extend to a power connector on another shading object.

In embodiments, a shading object may comprise an automatic button and a manual button. In embodiments, if a manual button is depressed and/or selected, a shading object may need to be operated in a manual fashion. In embodiments, a shading object may comprise a shutoff button or actuator. In embodiments, if an emergency situation occurs and a shading object needs to be deactivated and/or retracted, then an individual can press the shutoff button or actuator. For example, if high winds occur, a fire is in the area, or all wireless communications are cut off, an individual can immediately deactivate and/or shutdown a shading object.

In embodiments, a base assembly may also comprise a base motor controller PCB, a base motor, a drive assembly and/or wheels. In embodiments, a base assembly may move to track movement of the sun, wind conditions, and/or an individual's commands. In embodiments, a shading object movement control PCB may send commands, instructions, and/or signals to a base assembly identifying desired movements of a base assembly. In embodiments, a shading computing device system (including a SMARTSHADE and/or SHADECRAFT application) or a desktop computer application may transmit commands, instructions, and/or signals to a base assembly identifying desired movements of a base assembly. In embodiments, a base motor controller PCB may receive commands, instructions, and/or signals and may communicate commands and/or signals to a base motor. In embodiments, a base motor may receive commands and/or signals, which may result in rotation of a motor shaft. In embodiments, a motor shaft may be connected, coupled, or indirectly coupled (through gearing assemblies or other similar assemblies) to one or more drive assemblies. In embodiments, a drive assembly may be one or more axles, where one or more axles may be connected to wheels. In embodiments, for example, a base assembly may receive commands, instructions and/or signal to rotate in a counterclockwise direction approximately 15 degrees. In embodiments, for example, a motor output shaft would rotate one or more drive assemblies rotate a base assembly approximately 15 degrees. In embodiments, a base assembly may comprise more than one motor and/or more than one drive assembly. In this illustrative embodiment, each of motors may be controlled independently from one another and may result in a wider range or movements and more complex movements.

In embodiments, a shading object may also comprise a wind turbine 866. A wind turbine is described in detail in U.S. non-provisional patent application Ser. No. 15/214,471, filed Jul. 20, 2016, entitled "Computer-Readable Instructions Executable by a Processor to Operate a Shading Object, Intelligent Umbrella and/or Intelligent Shading Charging System, the disclosure of which is hereby incorporated by reference.

In embodiments, a shading object stem assembly 106, center support assembly, an upper support assembly, a lower support assembly, a hinging assembly, one or more arm support assemblies, one or more arms and/or blades, a base assembly, a housing assembly may be made of various materials. Material composition of such assemblies is described in detail in U.S. non-provisional patent application Ser. No. 15/160,822, filed May 20, 2016, entitled "Intelligent Shading Objects with Integrated Computing Device," the disclosure of which is incorporated by reference in its entirety.

In embodiments, a shading object center support assembly 107 may also include a light sensor (not shown). In embodiments, an illumination or projection source that can project light and/or videos onto surfaces of a shading object, arms/blades and/or shading fabric. Although the description above corresponds to the intelligent umbrella of FIGS. 1A and 1B, the description applies to similar components and/or assemblies in the intelligent shading charging system of FIG. 1C.

In embodiments, a center support assembly 107 may comprise an audio transceiver 865 and/or speakers 875. An audio device, such as an iPhone, a digital music player, or the like, may be electronically coupled to the audio transceiver 865 and transmit and/or receive audio signals from the audio device. In an embodiment, an audio transceiver 865 may receive audio signals and transfer audio signals to the speakers 875 so that speakers may reproduce and play sound for shading object users to hear. In embodiments, audio signals may be transmitted wirelessly between the audio device and the audio transceiver 865, and/or the audio receiver 865 and the speaker 875.

Figure 13:
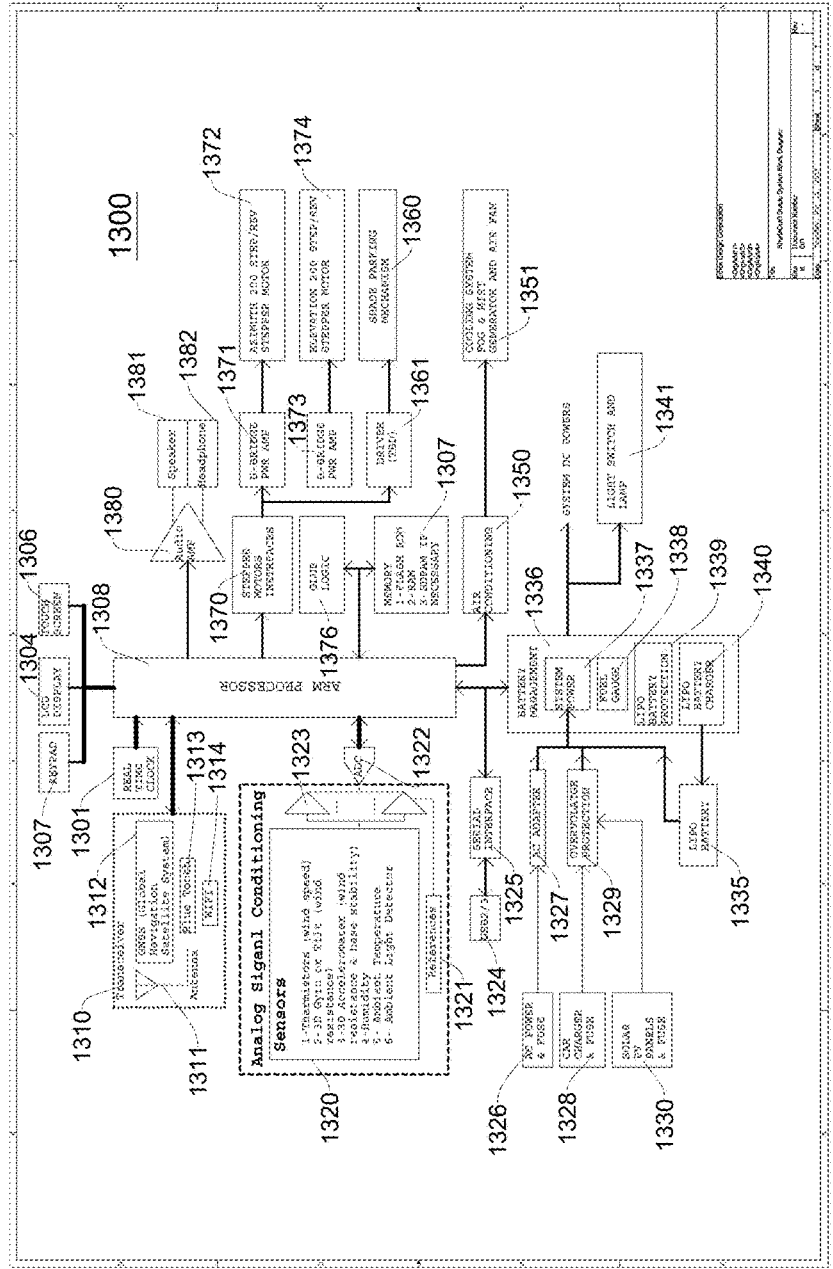
FIG. 13 illustrates components and assemblies of a shading object umbrella according to embodiments.
Figure 13A:
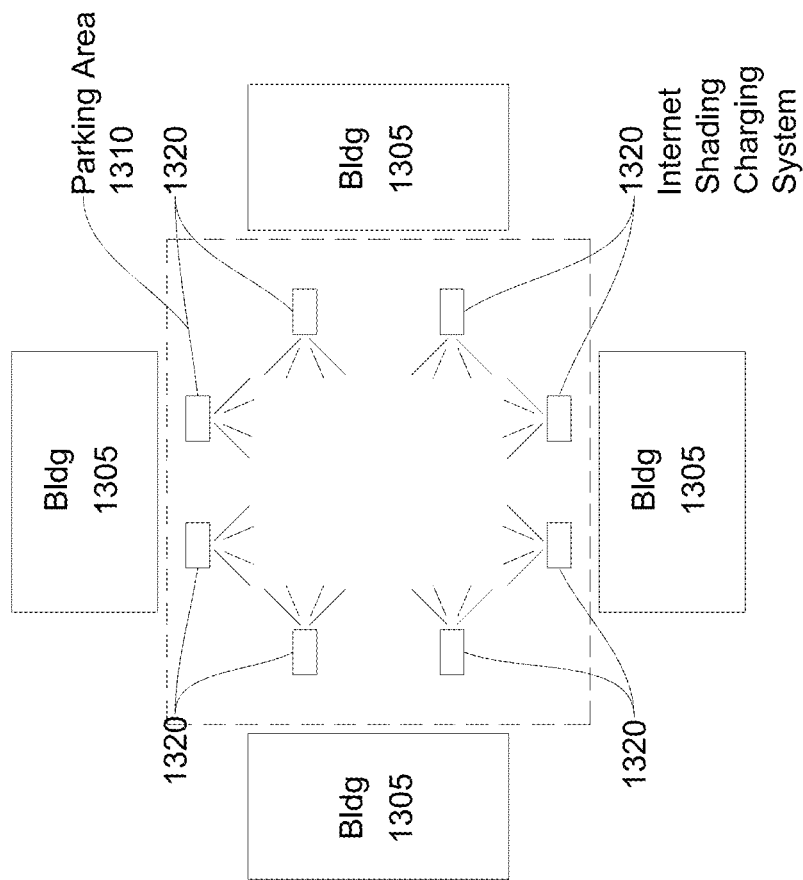
FIGS. 13A and 13B illustrates placements of intelligent shading charging systems according to embodiments.
Figure 13B:
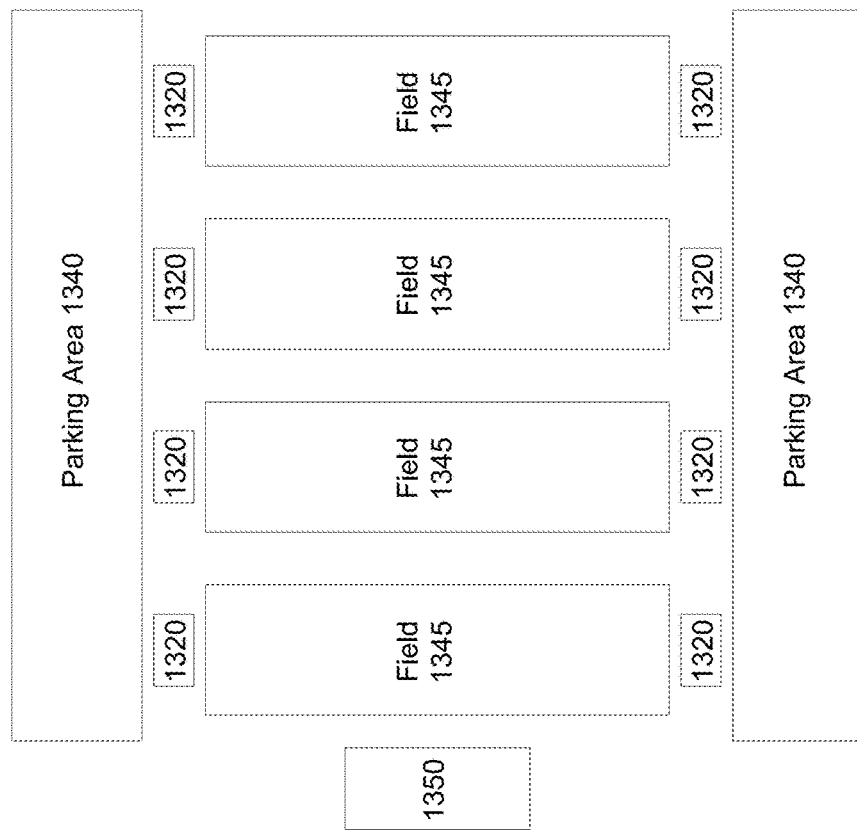

FIGS. 13A and 13B illustrates placements of intelligent shading charging systems in outdoor locations according to embodiments. Placement of intelligent shading charging systems are described in detail in non-provisional patent application Ser. No. 15/212,173, filed Jul. 15, 2016, entitled "Intelligent Charging Shading Systems," which is hereby incorporated by reference.

FIG. 13 is a block diagram of multiple components within a shading object. In embodiments, multiple components of a shading object and/or intelligent umbrella are described in detail in U.S. non-provisional patent application Ser. No. 15/160,856, filed May 20, 2016, entitled "Automated Intelligent Shading Objects and Computer-Readable Instructions for Interfacing With, Communicating With and Controlling a Shading Object," and U.S. non-provisional patent application Ser. No. 15/160,822, filed May 20, 2016, entitled "Intelligent Shading Objects with Integrated Computing Device," both of which are hereby incorporated by reference.

Figure 14:
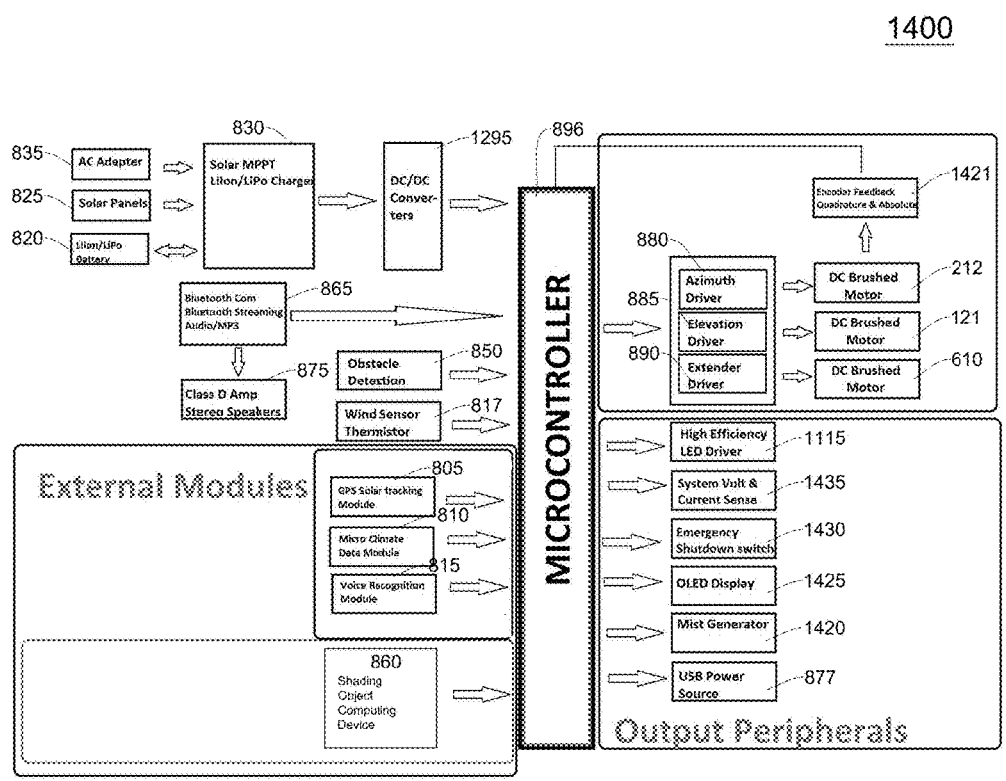
FIG. 14 is a block diagram of multiple assemblies and components or a shading object, intelligent umbrella, or intelligent shading charging system according to embodiments.

FIG. 14 is a block diagram and a flow diagram of a shading object according to embodiments. In embodiments, a shading object 1400 comprises a microcontroller 896, a GPS solar tracking module 805, a micro climate data module 810, and a voice recognition module and/or engine 815. In embodiments, a shading object includes a Bluetooth transceiver 865, class D amplifier and stereo speakers 875, an AC adapter 835, arrays of solar panels 825, a LiIon/LiPo rechargeable battery 820, a solar MPPT LiIon/LiPo Charger or Charging Assembly 830, and DC-to-DC converters 1295. In embodiments, a shading object comprises an obstacle detection module 850 and a wind sensor thermistor 817. In embodiments, a microcontroller 896 may be coupled to an azimuth driver or motor controller 880, an elevation driver or motor controller 885, an extender driver or motor controller 890, each of which are respectively coupled to a respective DC Brushed motor 212, 121 and 610. In embodiments, one or more of the DC brushed motors 212, 121 and 610 are coupled and/or connected to an encoder feedback quadrature and absolute module 1421. In embodiments, an encoder feedback quadrature and absolute module 1421 provides positioning and/or location information about how far a DC brushed motor 212 and/or gearbox assemblies or linear actuators have moved in response to commands, instructions, and/or signals from, for example, the azimuth driver 880. This location and/or position information may be feedback to a microcontroller or processor 896 and the microcontroller/processor 896 may adjust the commands, instructions and/or signals directed to, for example, the azimuth driver 880.

In embodiments, a shading object and/or umbrella may comprise a high efficiency LED driver 1115 and LED lights, a system volt and current sense module and/or circuit 1435, an emergency shutdown switch 1430, a display (e.g., OLED display) 1425, a mist generator system 1420, and/or a USB power source. In embodiments, a user may depress an emergency shutdown switch 1430 to kill or top operations of a shading object. In embodiments, an emergency shutdown switch and/or an on/off switch may be pressed or depressed to resume and/or restart operation. This allows an operator and/or individual to stop movement and/or operation of a shading object in emergency situations, such as when electrical mechanical components and/or computing systems are not operating.

In embodiments, a shading object and/or umbrella may comprise a system volt & current sense circuit 1435 to determine if a shading object is operating outside recommended settings, which may result in dangerous operations. If an out-of-threshold condition is detected by a volt and current sense circuit 1435, a shading object controller may send a shutdown or minimize operation command, instruction and/or signal. This feature may be beneficial if a power source is experiencing spikes and/or surges and may protect components and/or assemblies of a shading object. In addition, a volt and current sense circuit 1435 may sense if components and/or assemblies are drawing too much power (and thus causing dangerous conditions) and may cause commands to be sent from the motion control PCB 895 to stop and/or minimize operations. In addition, a voltage and current sense circuit 1435 may communicate, e.g., via the motion control PCB 895 or directly, alert commands, signals, instructions and/or messages to a sound reproduction system (amplifier and or speaker 875) and/or a display device (e.g., OLED display 1425).

In embodiments, an AC adapter 835 and one or more arrays of solar panels 825 may connect and/or plug-in to a charging assembly 830. In embodiments, a charging assembly 830 may comprise a MPPT LiIon/LiPo Charging Assembly or Charger. In embodiments, a charging assembly 830 may provide power to and/or charge a rechargeable battery. In embodiments, a rechargeable battery 820 may be a LiIon/LiPro rechargeable battery 820. In embodiments, an AC adapter 830 and one or more arrays of solar panels 825 may charge a rechargeable battery 820 (either directly or indirectly). In some circumstances, a power draw (e.g., a voltage and/or current draw) may be too great for only one of the AC adapter 830 or one or more arrays of solar panels 825 to provide power. For example, if one or more assemblies of the intelligent shading object is moving, a large amount of current is needed to power the motor and/or assemblies and neither the AC adapter nor array of solar panels may provide this power. In embodiments, a charging assembly 830 may provide power to one or more DC-to-DC converters 1295. In embodiments, a rechargeable battery may provide power to one or more DC-to-DC converters 1295. In embodiments, DC-to-DC converters 1295 may provide power (e.g., voltage and/or current) to other assemblies and/or components in the intelligent shading object or umbrella. For example, the DC-to-DC converter 1296 may provide power to a motion control PCB 895, any of the motor assemblies, a computing device 860, and/or a sensor module 805 housing telemetry sensors and/or weather variable sensors. In embodiments, some other components may be self-powered, e.g., include and/or integrate batteries. In embodiments, an intelligent shading object may also include power storage components, e.g., capacitors. In embodiments with power storage components, an AC adapter and/or one or more solar arrays may provide power to a power storage components and the power storage components may provide power to a rechargeable batteries 820. In embodiments, anan AC adapter 835 and/or arrays of solar panels 825 may provide power to a rechargeable battery 820, and a rechargeable battery 820 may provide power to power storage components. Continuing with this illustrative embodiment, power storage components may be coupled and/or connected to DC-to-DC converters 1295 to provide power to intelligent shading objects assemblies and components. This provides benefit of an intelligent shading object being able to compensate for high current flow during operations and not having to deal with charge/discharge cycles of a rechargeable battery. In embodiments, a charging assembly 830 may monitor power input (e.g., amount of current flow) from a power source (e.g., AC adapter and/or one or more array of solar cells. In embodiments, a charging assembly may communicate a value and/or measurement (in response to a request or command asking for current level) indicating an amount of charge remaining in a rechargeable battery 820 (e.g., a current level). In embodiments, a charging assembly 830 may also monitor solar panel array output and/or efficiency as well as AC power quality.

Some discussions may be focused on single shading objects, intelligent umbrellas, and/or intelligent shading charging systems. However, descriptions included herein may be applicable to multiple shading objects, intelligent umbrellas and/or intelligent shading charging systems. In addition, while discussions may be directed to a software application or process executing on a computing device of a shading object, intelligent umbrella and/or intelligent shading charging system and controlling one shading object, intelligent umbrella and/or intelligent shading charging system, the descriptions also apply to controlling and/or communicating with multiple shading objects, intelligent umbrellas and/or intelligent charging systems.

A computing device may be a server, a computer, a laptop computer, a mobile computing device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable computing device may be a cellular phone, a wireless phone, a smart phone, a tablet, a network computer, a wearable computing device, a handheld computer, and a laptop computer. A mobile computing device may also be a cellular phone, a wireless phone, a smart phone, a tablet, a network computer, a wearable computing device, a handheld computer, and a laptop computer. In this application, a portable computing device may also be referred to as a portable communications device, a mobile computing device, a mobile communications device, a wireless computing device, and/or a wireless communications device, and these terms may be used interchangeably.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually.

Memory, in a computing device and/or an intelligent shading object system, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, e.g., memory, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Persistent storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, a motor driver, a monitor driver, a cellular and/or WiFi transceiver driver, a Bluetooth driver, an audio or radio transceiver driver, a USB driver, memory controllers, disk driver controllers, scanner driver, or other device drivers, web pages, content files, metadata, playlists and other files. Persistent storage medium/media can further include program modules/program logic in accordance with embodiments described herein and data files used to implement one or more embodiments of the present disclosure.

A computing device or a processor or controller may include or may execute a variety of operating systems, including a personal computer operating system, such as a Windows, iOS or Linux, an embedded operating system, or a mobile operating system, such as iOS, Android, or Windows Mobile, or the like. A computing device, or a processor or controller in an intelligent shading object controller may include or may execute a variety of possible applications, such as a software applications enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A computing device or a processor or controller in an intelligent shading object may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing an optical device (e.g., camera, scanner, optical reader) within a mobile computing device.

Network link typically provides information communication using transmission media through one or more networks to other devices that use or process the information. For example, network link may provide a connection through a network (LAN, WAN, Internet, packet-based or circuit-switched network) to a server, which may be operated by a third party housing and/or hosting service. For example, the server may be the server described in detail above. The server hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computer, in computer readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

The invention claimed is:

1. A mobile computing device to control one or more umbrellas, comprising:
 a user interface component configured to output stimuli and receive inputs;
 a wireless transceiver configured to communicate commands and/or messages to one or more wireless transceivers of the one or more umbrellas;
 one or more processors coupled to the user interface component and the wireless transceiver; and
 a computer-readable storage medium containing computer-readable instructions, that, when executed by the one or more processors, cause the one or more processors to perform actions including:
 receive input corresponding to a selected azimuth movement of an umbrella and a selected tilting movement of the umbrella;
 communicate messages and/or commands, based on the selected azimuth movement and the selected tilting movement to the umbrella to cause a support assembly to rotate with respect to a base about an azimuth axis and to cause an upper support assembly to tilt with respect to a lower assembly about an elevation axis; and
 generate and communicate messages and/or commands to the user interface component to present stimuli indicating a representation of the selected azimuth movement and the selected tilting movement of the umbrella.

2. The mobile computing device of claim 1, further comprising a display, wherein the stimuli is a visual representation communicated to the display of the selected azimuth movement and the selected tilting movement of the umbrella.

3. The mobile computing device of claim 1, further comprising an audio receiver and speaker, wherein the stimuli is an audible representation communicated to an audio receiver and a speaker of the selected azimuth movement and the selected tilted movement of the umbrella.

4. The mobile computing device of claim 1, further comprising computer-readable instructions, that, when executed by the one or more processors, cause the one or more processors to further perform actions including:
 receive input corresponding to a deployment movement of the umbrella;
 communicate messages and/or commands, based on the selected deployment movement, to the umbrella to cause one or more arm support assemblies to deploy to an open position or to retract to a closed position; and
 generate and communicate messages to the user interface component to present stimuli indicating a representation of the selected deployment movement.

5. The mobile computing device of claim 1, further comprise a display to present visual output stimuli and wherein the input is tactile input from a touchscreen.

6. The mobile computing device of claim 1, further comprising a display, and further comprising computer-readable instructions, that, when executed by the one or more processors, cause the one or more processors to further perform actions including: generate visual output stimuli representative of the umbrella via the user interface component and communicate the visual output stimuli representative of the umbrella to the display.

7. The mobile computing device of claim 6, wherein the display further comprises a touch screen and the touch screen receives tactile input at locations corresponding to assemblies of the umbrella, communicates the tactile input to the user interface component, and
 further comprising computer-readable instructions, that, when executed by the one or more processors, cause the one or more processors to further perform actions including: translate, at the user interface component, the tactile input to generate instructions and/or messages corresponding to the received tactile input; and communicate the generated instructions and/or messages to the umbrella to cause the umbrella to move according to the assemblies of the umbrella identified by the tactile input.

8. The mobile computing device of claim 7, further comprising computer-readable instructions, that, when executed by the one or more processors, cause the one or more processors to further perform actions including: generate visual output stimuli representative of movement of the intelligent umbrella via the user interface component and communicate the visual output stimuli representative of the umbrella movement to the display.

9. The mobile computing device of claim 1, wherein the mobile computing device is a smart phone, a tablet, a laptop, a personal digital assistant, a wearable computing device; a wireless phone, or an iPad.

10. The mobile computing device of claim 1, further comprising computer-readable instructions, that, when executed by the one or more processors, cause the one or more processors to: receive input indicative of activation or deactivation of one or more lighting assemblies, generate messages and/or instructions identifying activation or deactivation of the one or more lighting assemblies of the umbrella and communicate the generated messages and/or instructions to the umbrella to cause the umbrella to activate or deactivate the one or more lighting assemblies.

11. The mobile computing device of claim 1, wherein the wireless transceiver is a personal area network (PAN) transceiver (e.g., Bluetooth) and the instructions and/or messages are communicated directly to a PAN transceiver of the umbrella.

12. The mobile computing device of claim 1, further comprising a display, and further comprising computer-readable instructions, that, when executed by the one or more processors, cause the one or more processors to receive input indicative of activation of one or more cameras, generate messages and/or instructions identifying activation of the one or more cameras of the umbrella, communicate the generated messages and/or instructions to the umbrella to cause the umbrella to activate the one or more cameras and capture video or images of an umbrella environment, receive captured video or images from the umbrella, and present captured video on the display of the mobile computing device via the user interface component.

13. The mobile computing device of claim 1, further comprising a display, and further comprising computer-readable instructions, that, when executed by the one or more processors, cause the one or more processors to receive input indicative of activation of initiation of a social media application, generate instructions initiating the social media application, receive commands and messages generated by the social media application corresponding to assemblies and/or components of the umbrella to be activated and/or utilized, and communicate the generate commands and messages transferred from the social media application to the umbrella to cause activation of the identified assemblies and/or components.

14. The mobile computing device of claim 1, further comprising a display and further comprising computer-readable instructions, that, when executed by the one or more processors, cause the one or more processors to receive input indicative of activation of initiation of a facial recognition process, generate instructions initiating the facial recognition process, generate instructions initiating capture of an image of a user, receive one or more captured images, determine if the one or more captured images matches an image stored in the memory, and if a match is determined, retrieve umbrella settings associated with the matched image, and communicate the retrieved umbrella settings to the intelligent umbrella to cause the intelligent umbrella to instruct identified assemblies to conform to the retrieved umbrella settings.

15. The mobile computing device of claim 1, further comprising a display, and further comprising computer-readable instructions, that, when executed by the one or more processors, cause the one or more processors to receive input indicative of activation of initiation of an artificial intelligence (AI) process, generate instructions initiating the AI process, initiate a speech recognition process, receive voice commands or instructions, convert the received voice commands or instructions to commands and/or messages, execute the AI process based, at least in part, on the converted commands and/or messages, receive commands and/or messages from the AI process, generate audible stimuli from the received AI commands and/or messages, and play the audible stimuli via a speaker of the mobile computing device.

16. The mobile computing device of claim 1, further comprising computer-readable instructions, that, when executed by the one or more processors, cause the one or more processors to receive input indicative of one or more alert thresholds and an alert notification method, store the alert thresholds and the alert notification method in a memory, communicate the alert thresholds to the umbrella; receive alert notifications from the umbrella when umbrella assemblies experience out-of-tolerance conditions; and communicate alert notifications via the alert notification method.

17. The mobile computing device of claim 1, further comprising a display, and further comprising computer-readable instructions, that, when executed by the one or more processors, cause the one or more processors to receive input indicative of activation of initiation of a digital music software application, generate instructions initiating the digital music software application, receive input indicative of a digital music song selection, retrieve at least one digital music file from a memory, communicate the at least one retrieved digital music file, via the wireless transceiver, to the umbrella to cause a speaker of the intelligent umbrella to audibly reproduce the at least one digital music file.

18. The mobile computing device of claim 1, further comprising a display, further comprising computer-readable instructions, that, when executed by the one or more processors, cause the one or more processors to receive input indicative of activation of a motion detector, a proximity detector, or an infrared sensor; generate messages and/or instructions to activate one or more of the motion detector, the proximity detector, or the infrared sensor; and communicate generated messages and/or instructions to the umbrella to cause activation of the motion detector, the proximity detector or the infrared sensor, receive alerts that the motion detector, the proximity detector, or the infrared sensor has been activated, receive alerts and/or captured video or images from the umbrella, and present alerts and/or captured video on a display of the mobile computing device via the user interface component.

19. The mobile computing device of claim 1, further comprising computer-readable instructions, that, when executed by the one or more processors, cause the one or more processors to receive input indicative of activation of initiation of an e-commerce application, generate instructions initiating the e-commerce application, receive input indicative of an e-commerce transaction, generate e-commerce transaction messages based at least in part of the received e-commerce transaction input, communicate the generated e-commerce transaction messages to an e-commerce application server and receive e-commerce transaction messages from the e-commerce application server.

20. The mobile computing device of claim 1, further comprising computer-readable instructions, that, when executed by the one or more processors, cause the one or more processors to receive input indicative of an autonomous mode selection for the umbrella, communicate automatic operation commands and/or messages to the umbrella;

and generate visual stimuli indicative of the umbrella being in the autonomous mode, and present the visual stimuli via a display of the mobile computing device.

\* \* \* \* \*